United States Patent
Suzuki et al.

(10) Patent No.: US 7,930,633 B2
(45) Date of Patent: Apr. 19, 2011

(54) DEVICE THAT PERMITS A USER TO SELECT A POSITION IN A DISPLAY OF IMAGES FOR INSERTION OF A USER COMMENT AND WARNS THE USER IF THE INSERTION OF THE USER COMMENT AT THE SELECTED POSITION IS NOT POSSIBLE

(75) Inventors: Kenji Suzuki, Kawasaki (JP); Hitoshi Onoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 11/364,372

(22) Filed: Feb. 28, 2006

(65) Prior Publication Data

US 2006/0150091 A1    Jul. 6, 2006

Related U.S. Application Data

(62) Division of application No. 08/777,424, filed on Dec. 30, 1996, now Pat. No. 7,124,359.

(30) Foreign Application Priority Data

Jan. 11, 1996 (JP) ........................................ 8-019314
Jan. 11, 1996 (JP) ........................................ 8-019315

(51) Int. Cl.
    *G06F 17/00* (2006.01)
(52) U.S. Cl. .......... 715/253; 715/762; 715/763; 715/765
(58) Field of Classification Search ................... 715/243, 715/244–247, 225, 788
    See application file for complete search history.

(56) References Cited

U.S. PATENT DOCUMENTS

| 5,459,589 A | * | 10/1995 | Ohnishi et al. ................ 358/518 |
| 5,563,722 A | * | 10/1996 | Norris ............................ 358/453 |
| 5,796,428 A | * | 8/1998 | Matsumoto et al. ..... 348/207.99 |
| 6,249,644 B1 | * | 6/2001 | Inoue et al. .................... 386/130 |

\* cited by examiner

*Primary Examiner* — Doug Hutton
*Assistant Examiner* — Quoc A Tran
(74) *Attorney, Agent, or Firm* — Cowan, Liebowitz & Latman, P.C.

(57) ABSTRACT

An image edit device comprises a layout unit for selecting a specific layout example from a plurality of layout examples in accordance with a predetermined criterion, and laying out a plurality of image data using said specific layout example, a manual input unit, and a correction unit for correcting said specific layout example selected by said layout unit on the basis of an input from said manual input unit.

6 Claims, 37 Drawing Sheets

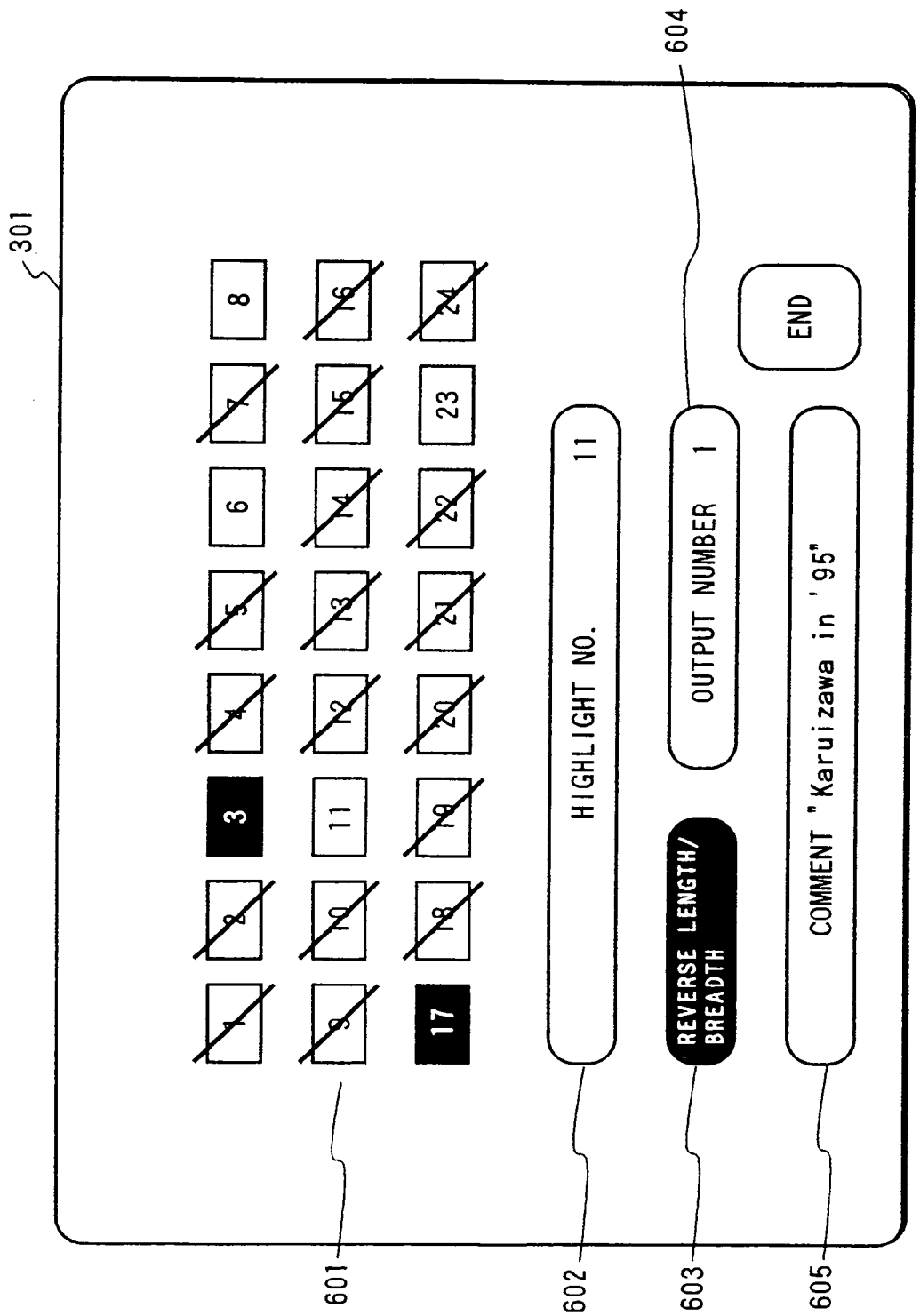

FIG. 8A

| L\M | 0 | 1 | 2 | 3 | 4 | 5 | 6 | 7 | 8 | 9 |
|---|---|---|---|---|---|---|---|---|---|---|
| 0 | n | y | y | y | y | Y | Y | (Y) | (Y) | (Y) |
| 1 | y | y | y | y | Y | (Y) | (Y) | (y) | n | n |
| 2 | y | y | Y | (Y) | (y) | (y) | n | n | n | n |
| 3 | Y | (Y) | (Y) | (y) | n | n | n | n | n | n |
| 4 | (Y) | (y) | n | n | n | n | n | n | n | n |

FIG. 8B

| M\S | 0 | 4 | 8 | 12 | 16 | 20 | 24 | 28 | 32 | 36 |
|---|---|---|---|---|---|---|---|---|---|---|
| 0 | n | y | y | y | y | Y | Y | (Y) | (Y) | (Y) |
| 1 | y | y | y | y | Y | Y | (Y) | (Y) | (y) | n |
| 2 | y | y | y | Y | Y | (Y) | (Y) | (y) | n | n |
| 3 | y | y | Y | Y | (Y) | (Y) | (y) | n | n | n |
| 4 | y | y | Y | (Y) | (Y) | (y) | n | n | n | n |
| 5 | y | y | (Y) | (Y) | (y) | n | n | n | n | n |
| 6 | y | (y) | (Y) | (y) | n | n | n | n | n | n |
| 7 | (y) | (y) | (y) | n | n | n | n | n | n | n |
| 8 | (y) | (y) | n | n | n | n | n | n | n | n |
| 9 | (Y) | n | n | n | n | n | n | n | n | n |

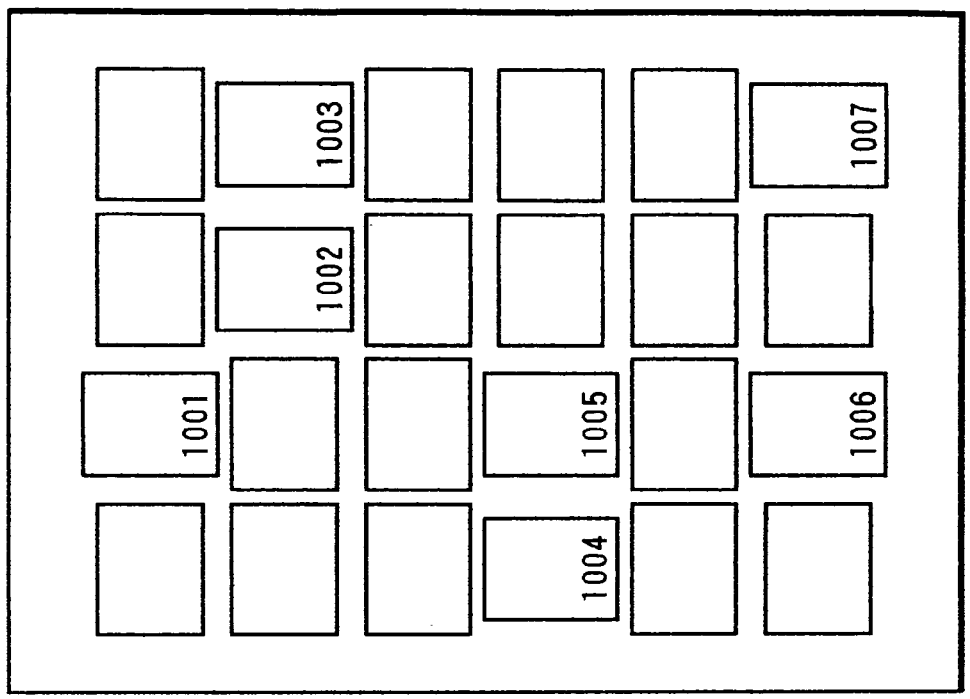
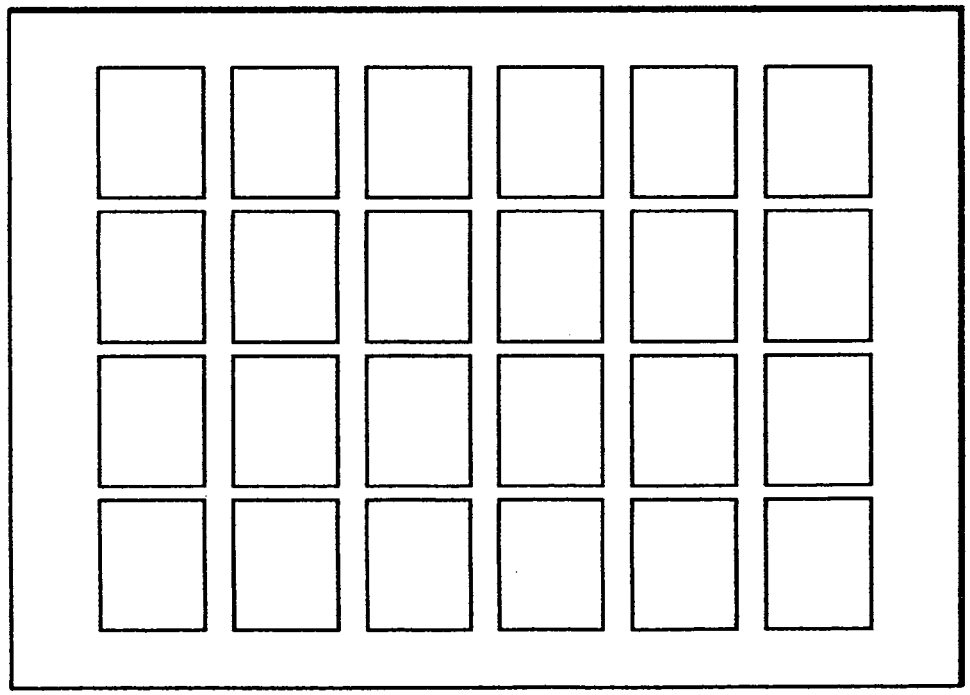

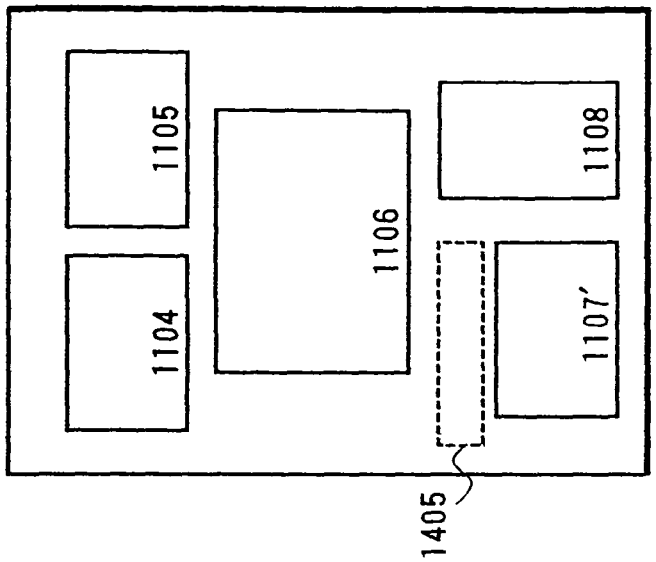
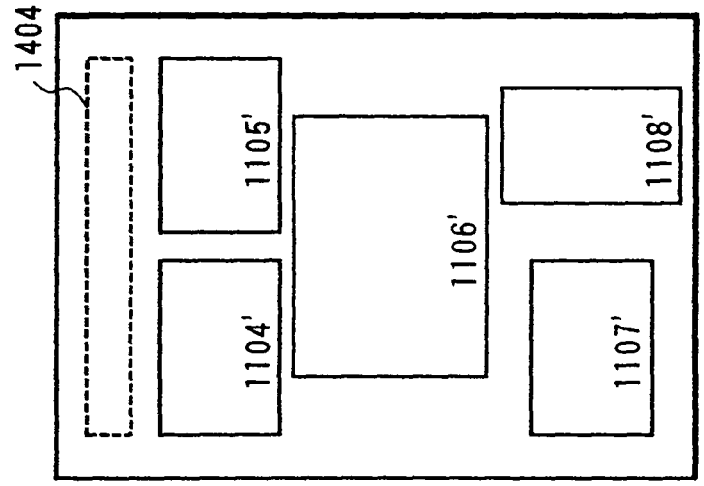
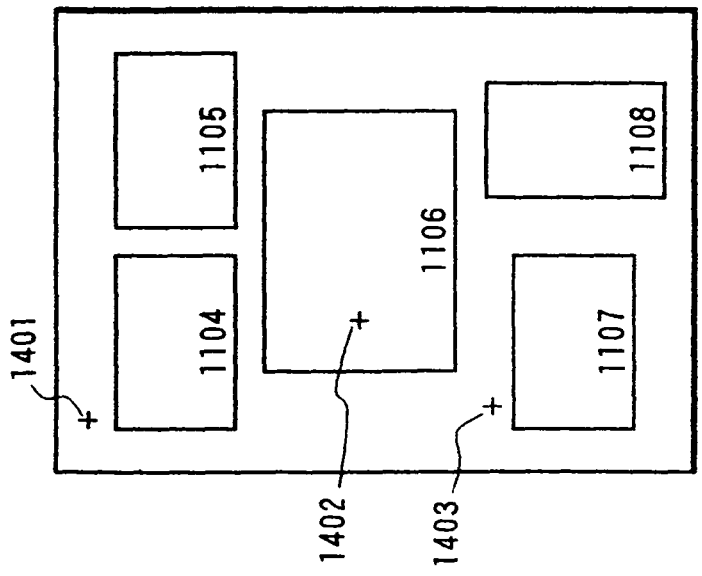

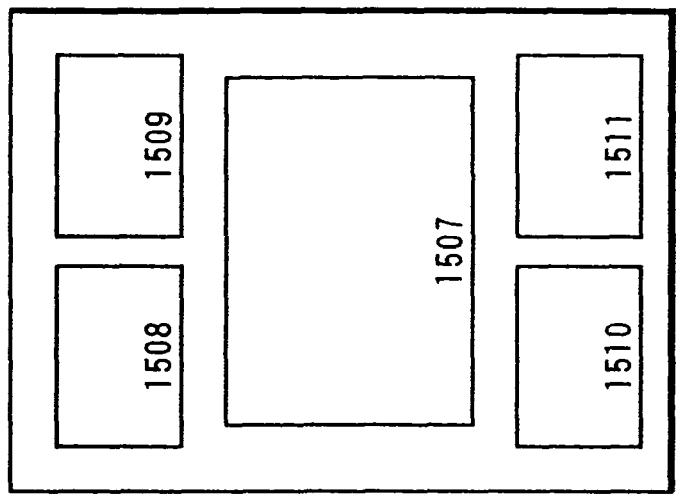
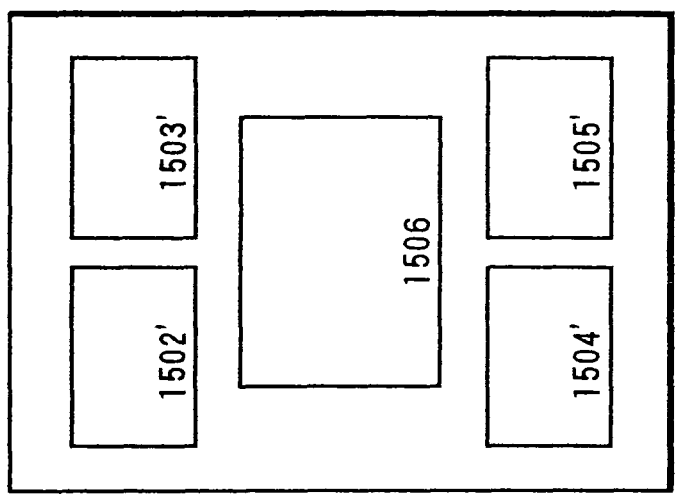
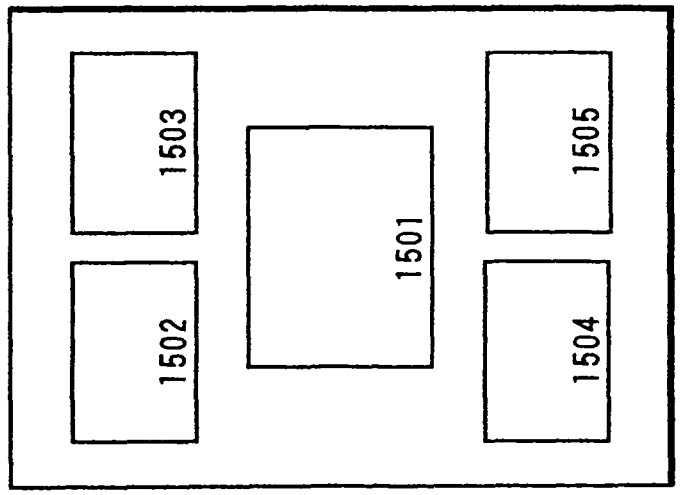

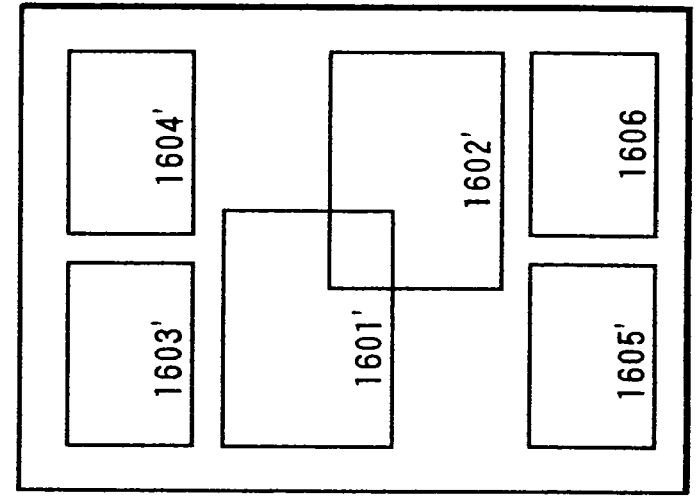
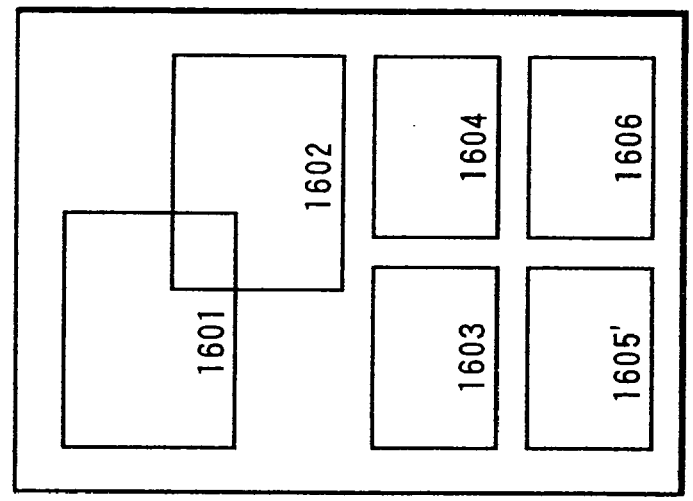
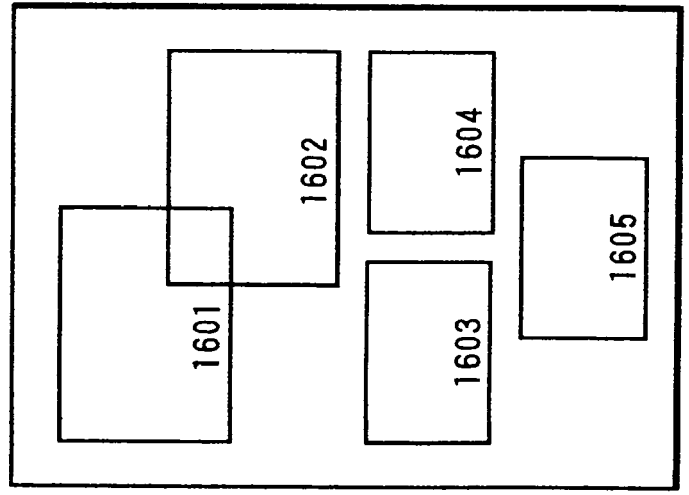

$m_0$: PREDETERMINED VALUE EXCEEDING 0 (MARGIN)

$m$: DISTANCE TO THE EDGE OF PRINTABLE AREA AFTER ASSIGNMENT (PRIOR TO CHANGE OF LAYOUT)

(AFTER CHANGE OF LAYOUT FOR ONE FRAME)

(PRIOR TO CHANGE OF LAYOUT)

(AFTER CHANGE OF LAYOUT FOR ONE FRAME)

(PRIOR TO CHANGE OF LAYOUT)

(AFTER LAYOUT CHANGE FOR ALL FRAMES)

(PRIOR TO CHANGE OF LAYOUT)

(AFTER LAYOUT CHANGE FOR ALL FRAMES)

DEVICE THAT PERMITS A USER TO SELECT A POSITION IN A DISPLAY OF IMAGES FOR INSERTION OF A USER COMMENT AND WARNS THE USER IF THE INSERTION OF THE USER COMMENT AT THE SELECTED POSITION IS NOT POSSIBLE

CROSS-REFERENCE TO RELATED APPLICATIONS

This application is a divisional of application Ser. No. 08/777,424, filed Dec. 30, 1996 now U.S. Pat. No. 7,124,359, the entire disclosure of which is hereby incorporated by reference.

BACKGROUND OF THE INVENTION

Field of the Invention

An album that binds, in the form of a file, mounts on each of the photograph prints printed on silver halide photographic paper sheets are laid out is a conventional filing form of photographs for appreciation later on. However, such method of using photographs exerts a heavy load on the user, and a new filing method for future appreciation purposes is demanded.

Since the cost of color photographs has lowered very much with recent technical advances, and everyone can easily take photographs with high image quality owing to greatly improved camera performance, the amount of photographs taken by general users is increasing largely. In particular, the services for developing a film and simultaneously forming prints of all the frames in a standard size is often used since it can be easily automated and a cost reduction can be attained. As a consequence, general users have a large number of non-filed photograph prints. Since it is cumbersome to lay out and adhere photograph prints on mounts, and to add required comments, it is often the case that the number of non-filed prints becomes too large to file as the amount of photographs taken increases. In fact, for average users, before prints previously printed by a photo processing shop are filed, photographing of all the frames of the next film is finished, and non-filed prints are piled up. Since the memories of the photographing situations of photographs are lost several years after, such non-filed photographs lose their significance as important records of one's life.

In other words, the photographic technical innovation has made great progress in terms of taking, developing, and printing photographs, but has made little progress in terms of appreciating, filing, and preserving them. Since the significance of photographs is to be able to preserve high-quality images for a long period of time, the current technical imbalance necessitates a heavy load on users.

As an effective means for solving such problems, a silver halide printer that prints a series of photograph images in the layout state is proposed by, e.g., Japanese Laid-Open Patent Application No. 60-35723. This patent application discloses a silver halide printer characterized by comprising designation means such as a print magnification designation means, direction change designation means, print frame designation means, and the like, a two-dimensional moving means of a print system, and a character printing means. The object of this printer is to print a plurality of photograph images on a relatively large (e.g., A4 size) photographic paper sheet in the layout state. The operation principle of this printer is as follows.

Before exposure onto the photographic paper, the presence/absence of printing of frames on a film, the print positions, the print sizes, and the contents and positions of comments to be inserted are input to a control computer. The developed film is fed frame by frame, and images are printed while controlling their sizes and positions according to the designations in units of frames by varying the optical system and the mechanical system of the print system with reference to the pre-input print control data in units of frames.

As a non-silver halide technique, Japanese Laid-Open Patent Application No. 3-274047 is known. According to this patent application, when a plurality of frames are to be arranged using digital image data of photographs and to be output to a print device, and such photographs include those having the vertically elongated composition, the user can select one of a plurality of appropriate layouts prepared in advance in correspondence with the number of such photographs.

However, such conventional techniques leave some basic problems unsolved, and it is not a common practice to appreciate and preserve photographs in the output form that includes a plurality of photographs in the layout state.

First, the contents that require complicated operations such as layout/edit operations are not suitable for silver halide processing. The automated processes of the standard-size service have greatly contributed to the current low cost and large consumption amount of photographs. Optimal processing for the layout/edit operations is determined depending on the contents of photographs to be processed, and the user's intention must be reflected by inserting comments, setting the magnifications of frames, and so on. When such operations are to be realized using the silver halide system by controlling the mechanical system and the optical system, a very complicated device and an operator skilled in operations are required and, hence, it is difficult to realize such system at sufficiently low cost that general photograph users can use. Such use methods of photographs can assume general practical use only on the premises that digital image data, a digital image processing technique, and a digital control printer are used. Japanese Laid-Open Patent Application No. 3-274047 above basically complies with such arrangement, but lacks many important factors required for realizing practical use.

In this way, the first objective of the present invention is to provide the basic arrangement that can realize the above-mentioned photograph output method.

Second, according to the examinations of the present inventors, solutions for the following conflicting problems need to be provided to realize general use of the layout of personal photographs. More specifically, the layout method is not suitable for automatic processing since the way of layout largely depends on the contents of photographs and the user's favor, and must be individually processed. On the other hand, a low-cost method is required to attain the photograph output format that can be used personally. The cost includes the prime cost of mechanical equipment, expendables, and the like, and the personnel expenses of expert operators who can meet individual needs. The latter cost is large particularly in the conventional methods disclosed so far, and the techniques have not reached a practical use level yet.

On the other hand, the following method is known. As shown in FIG. 38, a plurality of frames 1 to 5 are laid out within a printable area 6 of a paper sheet 7, and photographs are assigned to these frames, so that a plurality of photographs can be laid out on a single paper sheet, thus obtaining an attractive print. However, when this method is applied to conventional silver halide photograph prints, a high-grade technique is required to print a plurality of photographed frames onto a single photographic paper sheet, and such application is difficult to attain.

Nowadays, along with the development of the digital image processing technique and its peripheral devices, photographs are converted into digital data, and the digital data are subjected to layout processing on the computer screen. Thereafter, these digital data are printed out using a color printer, thus easily obtaining the above-mentioned print.

In order to provide a service for printing a plurality of photographed frames on a single paper sheet using such digital processing, the following procedure may be used.

1) A plurality of pieces of layout information (to be referred to as templates hereinafter) in each of which the positions and sizes of a plurality of photographs are registered and prepared in advance so as to facilitate order reception.

2) The user selects a desired template, and designates photographed frames to be assigned to the frames of the selected template.

3) In the development laboratory, a printer lays out and prints out the photographs on the basis of the selected template.

As described above, a plurality of layout patterns called templates are prepared in advance, and after a desired template is selected, photographs are assigned to the frames of the template, thus allowing easy layout of the photographs.

However, photographed frames have length (vertical) and breadth (horizontal) positions, and photographs taken recently have not only a normal 35-mm photographic film size, i.e., a length/breadth ratio (to be referred to as an aspect ratio hereinafter) of 3 (breadth):2 (length) (36 mm: 24 mm), but also have a so-called panorama size, hi-vision size, and the like, i.e., are trimmed to 3 (breadth):1 (length) (36 mm 12 mm) and 16 (breadth):9 (length) (36 mm:20 mm).

Therefore, when a photograph having an aspect ratio different from that set by the template is assigned to a predetermined frame in the layout print service, an unwanted blank area is formed, or layout imbalance occurs, resulting in an unattractive print.

A photograph having, e.g., the panorama size is normally magnified to twice the normal magnifying ratio to obtain a wide print. When a photograph having the panorama size is assigned to a frame, the magnifying ratio is increased to be larger than the normal one, and the magnified photograph is assigned. In such case, not only layout imbalance occurs, but also the photograph may extend beyond the printable area of the paper sheet.

Also, when a photograph taken at the length position is assigned to a frame for a photograph taken at the breadth position, it may extend beyond the printable area of the paper sheet.

In view of the above problems, templates corresponding to different combinations of photographs of every aspect ratios may be prepared. However, the number of combined patterns becomes huge, and it is troublesome to select an appropriate template from them.

SUMMARY OF THE INVENTION

One aspect of the invention is to provide an image edit device which lays out a plurality of image data by selecting a specific one of a plurality of layout examples on the basis of a predetermined criterion, and can edit the plurality of laid-out images.

Other aspects will become apparent from the following detailed description.

BRIEF DESCRIPTION OF THE DRAWINGS

FIG. 7 is a view for explaining the procedure for designating the length and breadth of each frame in the first embodiment of the present invention;

FIGS. 8A and 8B are views for explaining an example of the image sizes of frames in the first embodiment of the present invention;

FIGS. 12A and 12B are views showing the fourth example of layout templates prepared in advance in the first embodiment of the present invention;

FIGS. 18A, 18B and 18C are views for explaining the case wherein characters are inserted in the layout screen in the first embodiment of the present invention;

FIGS. 19A, 19B and 19C are views showing an example of the layout of a highlight frame and other frames in the second embodiment of the present invention;

FIGS. 20A, 20B and 20C are views showing another example of the layout of a highlight frame and other frames in the second embodiment of the present invention;

DETAILED DESCRIPTION OF THE PREFERRED EMBODIMENTS

The present invention will be described in detail hereinafter on the basis of the illustrated embodiments.

First Embodiment

Figure 1:
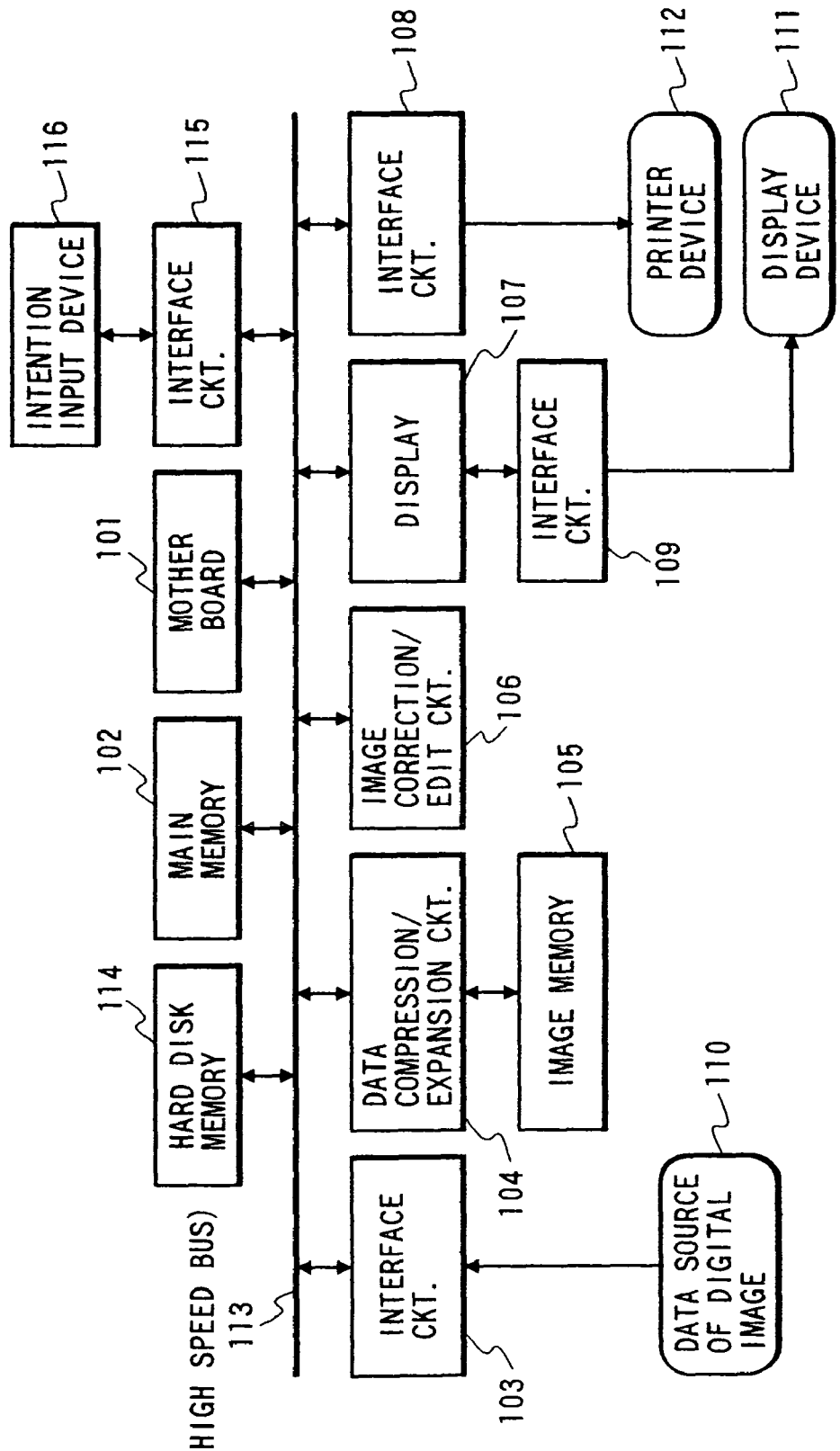
FIG. 1 is a block diagram showing the arrangement of principal part of an automatic image edit device according to the first embodiment of the present invention.

FIG. 1 shows an example of the hardware arrangement that realizes an automatic image edit device according to the first embodiment of the present invention. This arrangement itself is realized by adding some image processing hardware components to a versatile computer, and is not a special one. The arrangement of the respective blocks will be explained below.

Various circuit blocks are connected to a high-speed bus 113. More specifically, the device has versatile blocks such as a mother board 101 including a CPU and a cache memory, a main memory 102, a hard disk memory 114, and the like, and circuit elements such as an interface circuit 103 for interfacing with a digital image data source 110, a data compression/expansion circuit 104 for compressing/expanding input image data having a large information amount, an image memory 105 for storing the compressed data, an image correction/edit circuit 106 for performing high-speed image correction and edit operations, a display resolution matching/storage circuit 107 for thinning out input image data to match the display resolution of a display device 111, and storing the thinned-out data, an interface circuit 108 for interfacing with a printer device 112, an interface circuit 115 for interfacing with an intention input device 116, and the like.

As the digital image data source 110, other data sources such as a CD-ROM may be used in place of a scanner. The resolution of an electrical display device such as a CRT is normally far behind the information amount of a high-resolution printout. In view of this fact, in this embodiment, mechanisms for reducing the data amount are independently provided for hard copy print data and display data to optimize the corresponding processing operations. The print data compression/expansion circuit 104 must compress data at a high compression ratio without losing high-resolution information of an image. The circuit 104 preferably adopts a circuit that quantizes/encodes conversion coefficients on the basis of orthogonal function transformation utilizing the statistical nature of natural images such as photographs, e.g., JPEG which uses discrete cosine transformation. The arrangement shown in FIG. 1 is not preferable in terms of bus efficiency since non-compressed, large-amount image data always flow on the bus 113 and occupy it for a long period of time. In order to greatly improve the bus efficiency, compression/expansion circuits are added to the bus interfacing sides of all the circuit blocks that process and input/output print image data.

On the other hand, the circuit 107 for temporarily displaying an image on a display such as a CRT is required to perform high-speed processing and to have a simple arrangement since a large information amount is not required owing to the resolution limit of the display device. In the simplest way, thin-out processing for picking up data from successive pixel data at predetermined intervals and discarding other data can be used. Since the horizontal display resolutions of most of CRT displays fall within the range from 500 lines to 1,000 lines, high-resolution print data need only be picked up once per three to five pixels. Of course, since data can also be thinned out in the vertical direction at the same rate as in the horizontal direction, the image data amount can be greatly reduced. Since such computer system functions by linking many software modules via a versatile operating system, but is the state-of-the-art technique and does not relate to the gist of the present invention, a detailed description thereof will be omitted.

The operation flow will be described in detail below with reference to FIG. 2. In the following description, assume that the digital image data source 110 comprises a film scanner, and a plurality of image data are input by successively image-scanning a developed, elongated negative film.

In step (201), a predetermined initial setting operation is performed. In the initial setting operation, information indicating the necessities of the respective frames is input if it is available when a plurality of digital image data are successively input. Also, the way of automatic layout (to be described later) can be determined in advance, and the index display pattern to be displayed on the CRT screen, the relative relationship between the index display and the layout display, and the like can be defined. An input member used in setting of this embodiment is assumed to comprise a touch panel or mouse for specifying images or their ID marks displayed on the CRT screen, a keyboard (of course, the touch panel can replace it) for specifying specific functions, and a keyboard used for inputting characters.

The initial setting operation will be described in more detail with reference to FIGS. 6 and 7.

Figure 6:
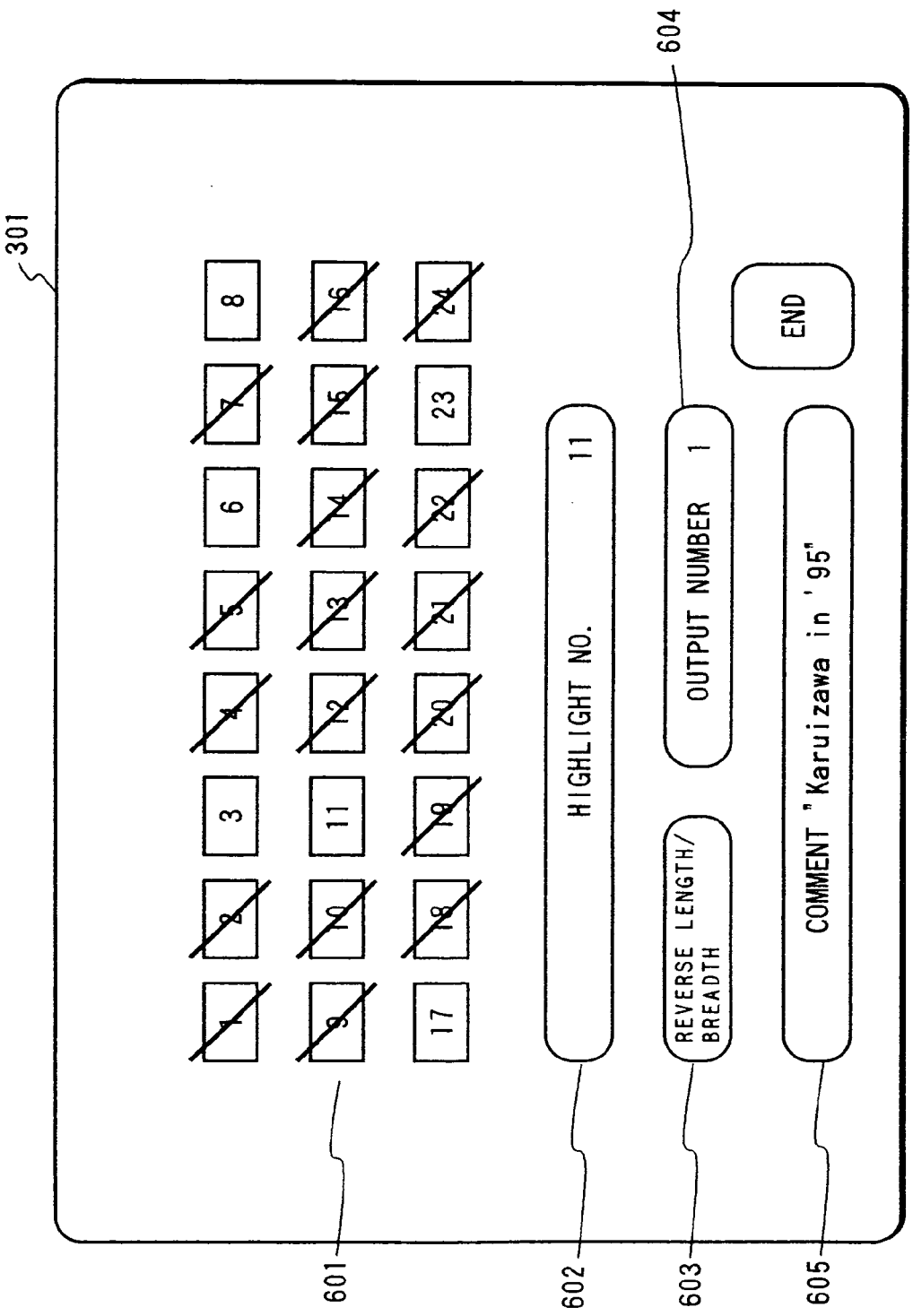
FIG. 6 is a view showing an example of a pattern displayed on the CRT screen in the initial setting mode in the first embodiment of the present invention.

FIG. 6 shows an example of the pattern displayed on a CRT screen 301 in the initial setting mode. The pattern includes a display portion 601 for displaying the ID numbers of 24 frames for a roll of film, an input section 602 for inputting and displaying the ID number of a frame to be especially emphasized on the layout, a function key 603 for designating the length or breadth photographing position, and the like of each frame, an input section 604 for designating the number of sheets on which the final layout is to be divisionally output, and an input section 605 for inputting comments.

Figure 2:
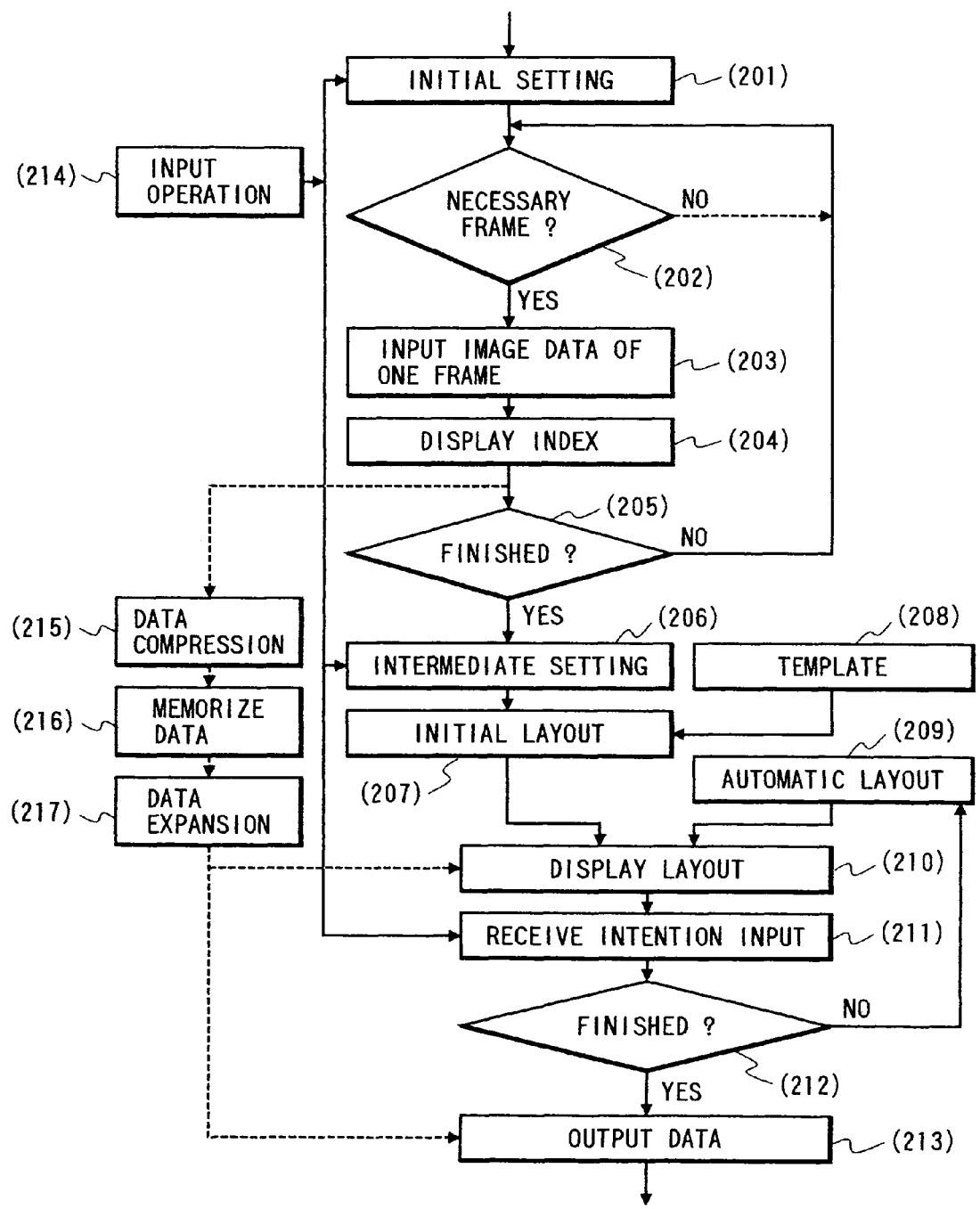
FIG. 2 is a flow chart showing a series of operations of the device shown in FIG. 1.

As shown in step (214) in FIG. 2, those to be input of these items displayed on the CRT screen can be specified using a known touch panel, mouse, joystick, or the like. When frames to be used in the layout are known using the ID numbers or the like of the respective frames of the film, information indicating them is input while observing the display portion 601. Normally, since the number of frames to be used in the layout is half or less the total number of frames, all the frames may be initially set not to be used, and then required frames may be designated later to facilitate the designating operation. Each frame can be designated by simply pressing the frame ID number with a finger if the touch panel is used, or by moving the cursor to the position of the frame ID number to be designated and turning on a momentary switch if the mouse or joystick is used. In the display state of the display portion 601 in FIG. 6, the frame ID numbers "3", "6", "8", "11", "17", and "23" are set to be used in the layout. Of course, if the number of frames to be used is larger than half of the total number of frames, all the frames are initially set to be used, and unnecessary ones are designated to facilitate the designating operation.

FIG. 7 shows the procedure for designating the length/breadth position of each frame.

When the function key 603 is turned on (e.g., the key 603 is pressed if the touch panel is used), the key display state is reversed, and a length/breadth setting mode is selected. In this state, when frames, the length/breadth positions of which are to be changed, are turned on (on the display portion 601), the display states of the ON frames are changed like frames "3" and "17" in FIG. 7. Since 80% of photographs are taken at the breadth positions, the initial setting positions of all the frames are set to be the breadth positions, and the positions of required frames are changed to the length positions, thus facilitating the designating operation.

In this case, since length position photographing is indefinite about its top and bottom positions, a means for, e.g., vertically reversing the frame designated at the length position if it is turned on again is required. In this case, when the frame is turned on once again, its position is restored to the breadth position. Also, a means for rotating the frame position through 90° every time the frame is turned on may be used.

As for the input sections 602, 604, and 605, the section to be input is selected, and an input value is then input using the character keyboard. Such initial setting sequence need not always be performed manually. A photographic film which has a magnetic recording layer or a film cartridge including a memory member is the state-of-the-art arrangement, and if the above-mentioned information is written in such memory, the information may be read and used. On the other hand, the initial setting sequence may be omitted, and after all the frames are scanned, required setting may be performed.

Referring back to FIG. 2, the processing in step (202) and the subsequent steps will be described below.

In step (202), the necessity/non-necessity is discriminated for the respective frames based on the initial setting data. In this case, this information is used as follows. If the film scanner connected is a low-speed device, and a certain frame is not necessary, a control signal is supplied to the film scanner to skip the frame. If the frame is necessary, the flow advances to step (203), image data for one frame is actually scanned and is fetched into the computer system via the interface circuit 103. Such operation is performed to omit a series of scanner operations for finally unnecessary images since most of film scanners require considerably long time for scanning images on a film and transmitting image data. Accordingly, if a sufficiently high-speed film scanner and interface are available, all the film images are scanned, and unnecessary image data are also temporarily held while appending an attribute "unnecessary" thereto. This processing is superior to the former one in terms of the simplicity, throughput, and degree of freedom in post-processing of the system. The following explanation will be given based on the later processing.

Figure 3A:
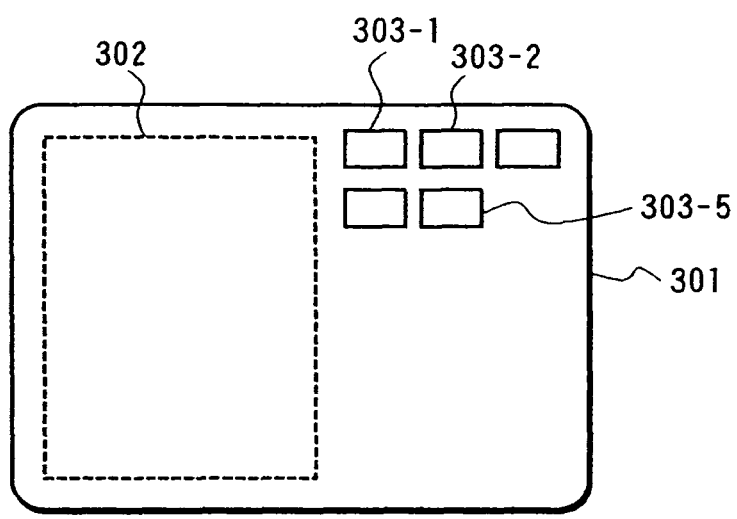
FIGS. 3A and 3B are views showing an example wherein fetched images are displayed as indices on the CRT screen in the first embodiment of the present invention.
Figure 3B:
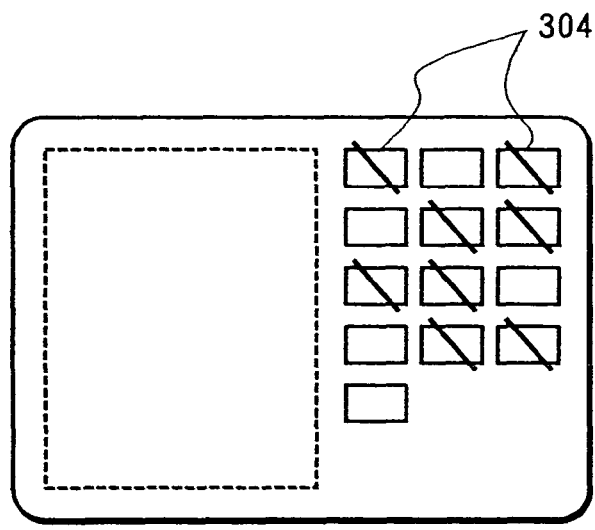

In step (204), fetched images are displayed as indices on the CRT screen in turn. FIGS. 3A and 3B show this state.

In an example shown in FIG. 3A, frames 303-1, 303-2, and the like required for the layout are sequentially arranged and displayed on the CRT screen 301. FIG. 3A shows the state wherein the input operation has been finished up to a frame 303-5. Note that a dotted frame 302 indicates a space where images are displayed in the layout state, and is not completely displayed while the data are being input. For example, if a certain layout pattern is determined in advance based on the initial setting information, an operation for inserting corresponding image data in the pattern in the scanning order may be performed.

On the other hand, according to an example shown in FIG. 3B, all the successive frames are sequentially scanned and displayed on the CRT screen 301 independently of the necessity/non-necessity of the frames in association with the layout based on the initial setting information. Based on the initial setting information, unnecessary frames are displayed with marks such as slash marks or the like to be distinguished from necessary ones. The gist of the present invention to correct the layout automatically generated based on the input user's intention, and the object to be corrected includes changing of necessity of each frame. In consideration of operability for such purpose, a higher-speed film scanner is required, and the display pattern shown in FIG. 3B is preferred. After the above-mentioned input/display operation continues, if it is determined in step (205) that a series of input operations have been completed, the flow advances to the next operation.

In any case, since data to be displayed on the CRT screen 301 does not require an information amount as large as that of print data, a data reduction is performed. In order to attain high-resolution printing, the scanning resolution of a film is preferably as high as about "4,000×6,000". However, the resolution of data to be displayed on the CRT can be as low as about "600×800" in the case of a normal full-color CRT display, or about "1,000×1,500" even in the case of a high-resolution CRT display. In this way, data to be displayed on the CRT is preferably held in a memory in a unique format different from that of print information since it has a small information amount and is accessed frequently while editing the layout. As a data reduction method, a simple method of thinning out data at predetermined periods or averaging a predetermined number of neighboring pixels is quite effective. When the thinned-out data is further compressed by an appropriate method, the memory efficiency can be improved very much.

On the other hand, as for the print image information, it is not economical to store all the pieces of information in a main memory since the data size of each image input to the system is considerably large. For example, if the scanning resolution per frame is "4,000×6,000" for each of three, R, G, and B colors, and sampling is performed based on 8-bit gradation, the information amount per image is as large as 72 Mbytes. If 24 frames of images are recorded on one film, a total of 1.728 Gbytes are required. It is not economical to store such image data in a RAM, and if such data are stored in an auxiliary storage device such as a hard disk, the access speed to the respective images considerably lowers, and the operability is impaired. The best way to attain both the economy and operability requirements is to compress image data and then to hold the compressed image data in a high-speed memory such as a semiconductor memory.

Each image data input in FIG. 2 is compressed in step (215), and is stored in step (216). The compressed and stored data is expanded in step (217) in correspondence with its purpose of use when it is reused. Many compression algorithms of image data are known, and for a natural image such as a photograph, a method based on cosine transformation such as JPEG can obtain a high compression ratio while maintaining high image quality. As is known, the information amount of a natural image scanned at the above-mentioned resolution can be compressed to a fraction of several tens without causing serious deterioration of image quality.

Upon completion of film scanning, step (206) is executed if necessary, as shown in FIG. 2, and intermediate setting is performed. This setting is performed to compensate for the initial setting contents or to correct the initial setting contents and to set parameters required for the layout. In the initial setting, since no film image data are present, it is often difficult to satisfactorily determine parameters. At the time of step (206), since all the film images are scanned and are displayed on the CRT screen as indices to allow confirmation, the user can easily imagine a proper layout image. Images for setting may be the same as those in FIG. 6. In the initial setting, since no film image data are available, the ID numbers of the respective frames are displayed on the display portion 601. However, in step (206), since the images of the respective frames have been scanned, images themselves can be displayed, and this operation is preferable, as a matter of course. When images which are not used are skipped since a low-speed film scanner is used, the images of only the scanned frames may be displayed. In the case of step (206), since the scanned values of the respective images have already been displayed on the CRT screen as a result of the display operation in step (204) above, they may be used.

Figure 4:
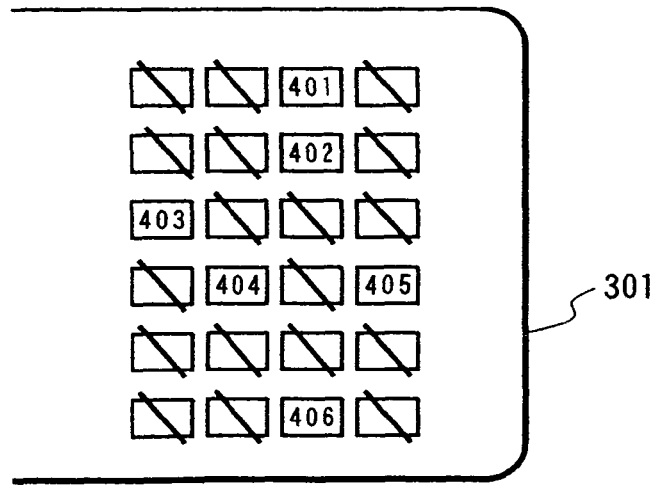
FIG. 4 is a view showing a display example in the state wherein the scanning operation of all the films and the display operation for one film have been completed.
Figure 5:
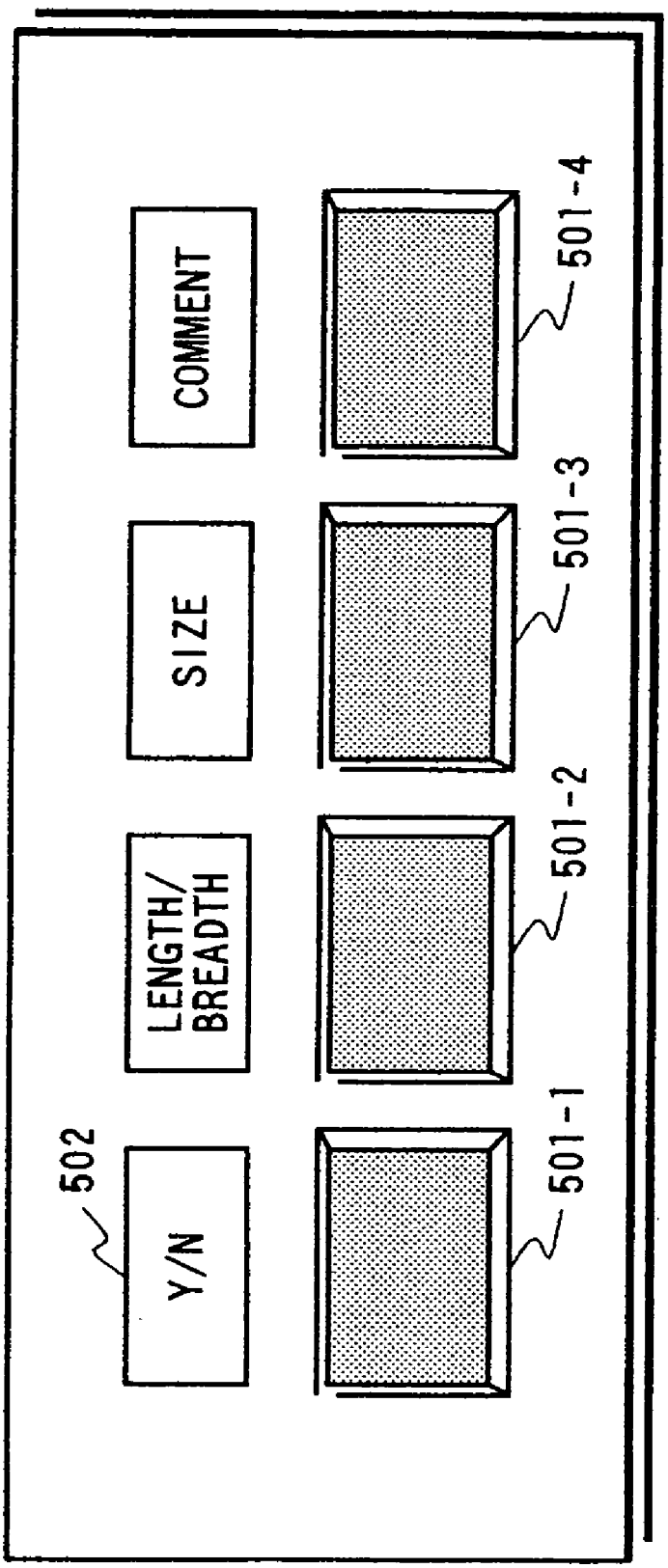
FIG. 5 is a view showing the arrangement of parameter input function keys in the first embodiment of the present invention.

FIGS. 4 and 5 show an example of the display and input states at that time. FIG. 4 shows the state wherein scanning of all the films and display for one film in FIG. 3B have been completed. FIG. 5 shows the arrangement of function keys used for inputting parameters. In FIG. 5, key pads 501 (501-1 to 501-4) are arranged above liquid crystal displays 502, which display functions of the corresponding keys. The functions assigned to the respective keys can be changed.

For example, in the example in FIG. 5, the key 501-1 is used for inputting or changing the necessity of each frame on the layout. If this key is pressed, a light source (LED or the like) inside the key emits light to indicate that the function indicated by the key is in the input state. In this state, when the display position of a certain frame in FIG. 4 is touched with a finger, since the screen serves as a touch panel, the use or non-use attribute of the frame is reversed. The key 501-2 is used in the same manner as the function key 603 in FIG. 6. The key 501-3 is used for changing the layout size of each frame. When a specific frame display is touched while this key is selected, the frame size can be increased by a predetermined magnification (e.g., 25%) every touching. The key 501-3 also serves as a reduction key when it is pressed twice consecutively, and at that time, the corresponding liquid crystal display displays "reduction".

In step (207) in FIG. 2, the first automatic layout is performed. The method of automatically laying out a plurality of photographs is roughly classified into two methods.

In the first method, fine classification is made on the basis of parameters such as the number of images to be laid out, and layout patterns clearly defined in correspondence with the respective cases are prepared in advance. Upon generating a layout pattern, since one of a large number of patterns need only be specified, such processing is technically easy and the obtained result is satisfactory. However, in this method, when too large a number of parameters are used, the number of layout patterns corresponding to combinations of all these values becomes too huge in a practical application.

In the second method, a layout pattern is individually generated by calculations on the basis of information of images to be laid out. This method is good since it can cope with every requirements to some extent. However, formulas describing the problem of optimization and its solution method are required, and the obtained result has large algorithm dependence. Also, this method often results in a nonlinear problem, and it is difficult to predict the result.

As described above, since both these two methods have merits and demerits, they are selectively used depending on cases, and more preferably, they are used in combination. For example, when the automatic layout is processed as a nonlinear problem of optimization, the way of giving an initial value largely influences the result. However, a standard pattern is specified using a small number of patterns, and thereafter, calculations are performed using the remaining parameters which are not taken into consideration yet, thus obtaining a stable result. As the initial layout of step (207), it is efficient to place an importance on selecting one of a plurality of standard templates (208).

The types of templates to be prepared in advance can be considered as follows.

Basic parameters used for classifying templates include the types and number of images having different sizes and shapes. For the sake of simplicity, assume that three different sizes, "large (L)", "middle (M)", and "small (S)" are available. "M" is the basic layout size, "L" is the size of a highlight frame to be especially emphasized, and "S" is the size used when a large number of frames are arranged in the index pattern. Also, assume that one layout is not allowed to include both "L" and "S". This is because inserting an especially large highlight frame into an array of S size images in the index pattern results in poor balance, and such layout is not in demand. Furthermore, the area of "L" is twice that of "M", and the area of "M" is four times that of "S". In addition, the number of images that can be arranged in a single layout is 24 when overlapping between adjacent images is not permitted, and is 36 when overlapping between adjacent images is permitted.

FIGS. 8A and 8B basically show the possible combinations of the types and number of images based on the above-mentioned rules.

FIG. 8A shows the combinations including L and M size images, and FIG. 8B shows the combinations including M and S size images. FIG. 8A shows all the possible combinations based on the above-mentioned rules, but FIG. 8B shows the combinations in which the number of S size images is limited to a multiple of 4, for the sake of simplicity. The case wherein the number of S size images is other than multiples of 4 is equivalent to that of the smallest value larger than the number of S size images. In FIGS. 8A and 8B, Y indicates a combination which is permitted according to the rules and is preferred in design, (Y) indicates a combination which is permitted according to the rules and is preferred in design but requires overlapping between adjacent images, y indicates a combination which is permitted according to the rules but is not preferred in design, (y) indicates a combination which is permitted according to the rules but is not preferred in design and requires overlapping between adjacent images, and n indicates a combination against the rules.

The combination which is permitted according to the rules but is not preferred in design is one that has an enough area for displaying the image contents, but gives an unbalance impression due to too crowded or sparse a layout.

Templates that have predetermined image layouts in advance in correspondence with all the cases except for n in FIGS. 8A and 8B are prepared. For example, layouts including one L size image and four M size images will be exemplified below.

Figure 9B:
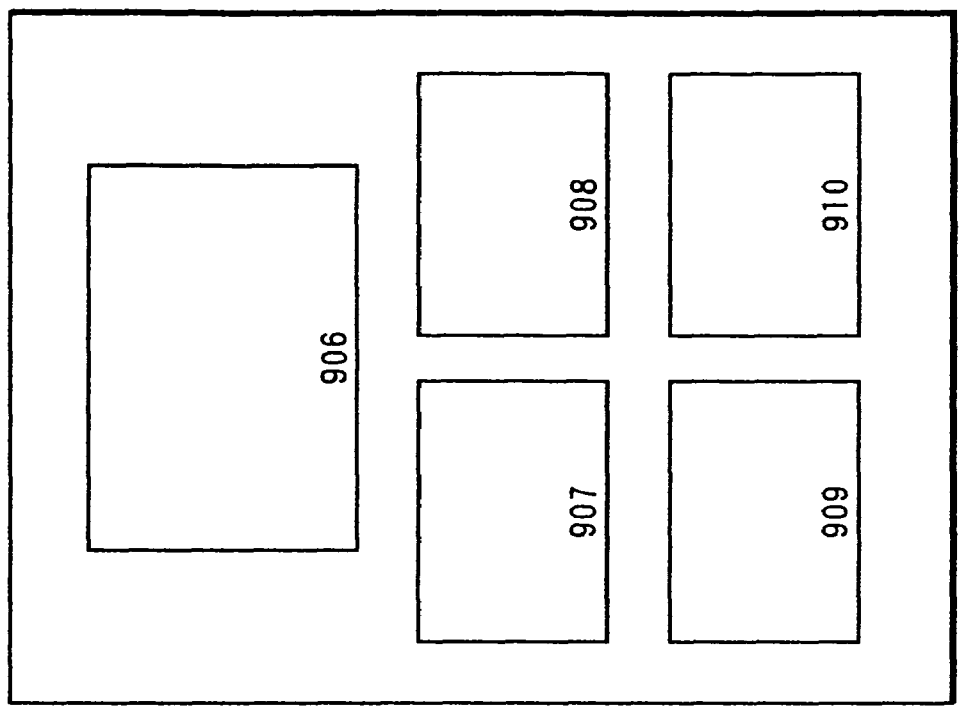
FIGS. 9A and 9B are views showing the first example of layout templates prepared in advance in the first embodiment of the present invention.
Figure 9A:
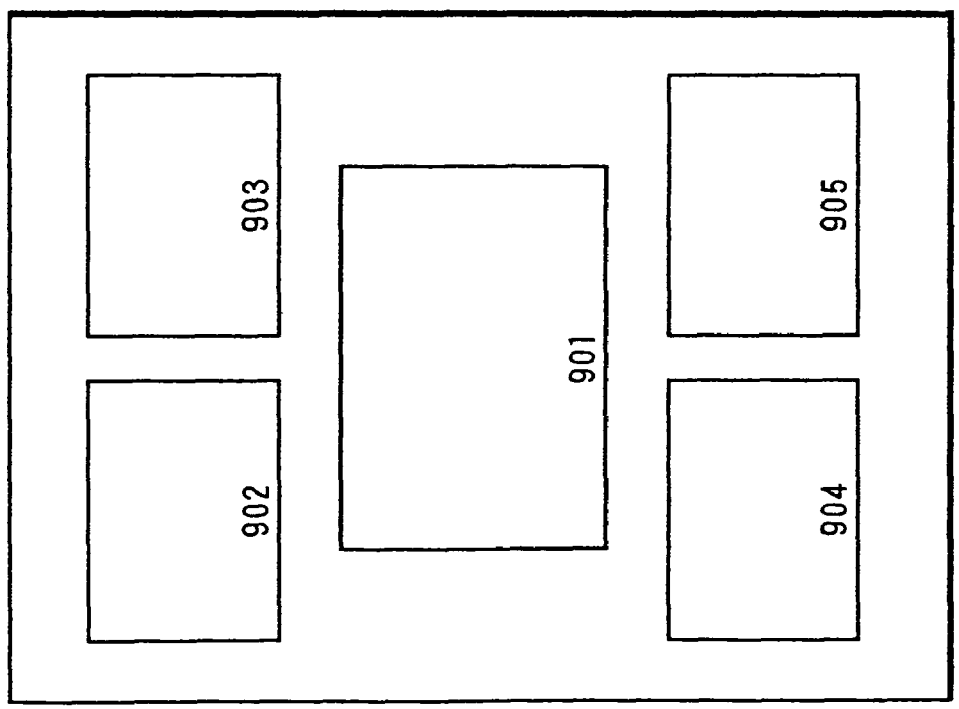

FIGS. 9A and 9B show the layouts when all the frames are horizontally elongated ones. FIG. 9A shows the first priority layout in which an L size frame 901 is set at the center. This layout has the highest symmetry, and is likely to be preferred most. FIG. 9B shows the layout in which an L size frame 906 is set in the uppermost portion to emphasize this frame.

In this manner, since a plurality of standard templates can be defined even based on a parameter indicating the same number of images, the system is designed so that corresponding templates may be displayed on the CRT to select one of them, or a template to be displayed may be switched in turn in response to some input operation.

Figure 10B:
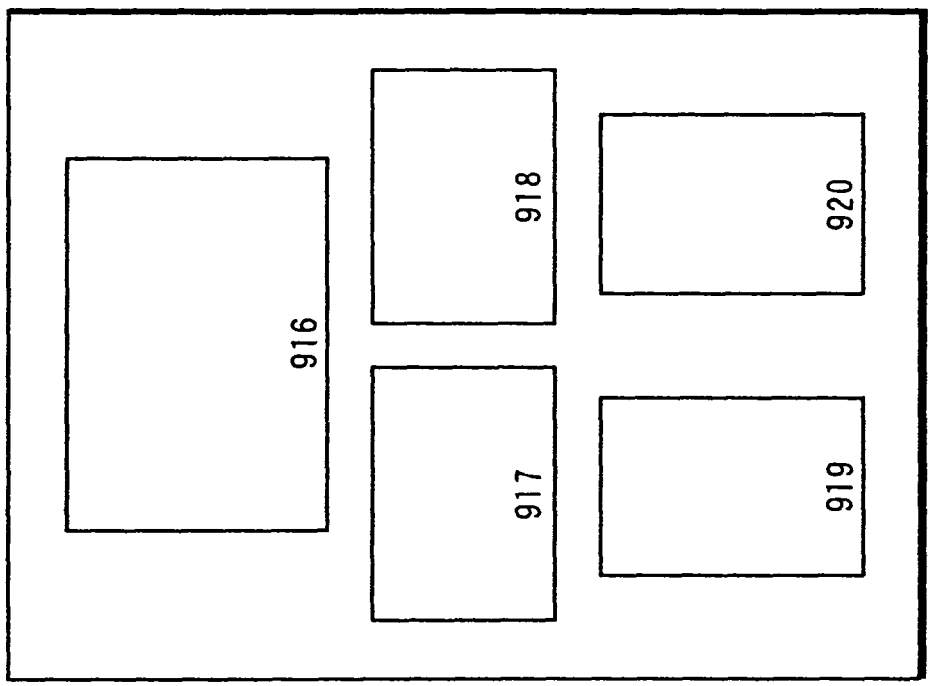
FIGS. 10A and 10B are views showing the second example of layout templates prepared in advance in the first embodiment of the present invention.
Figure 10A:
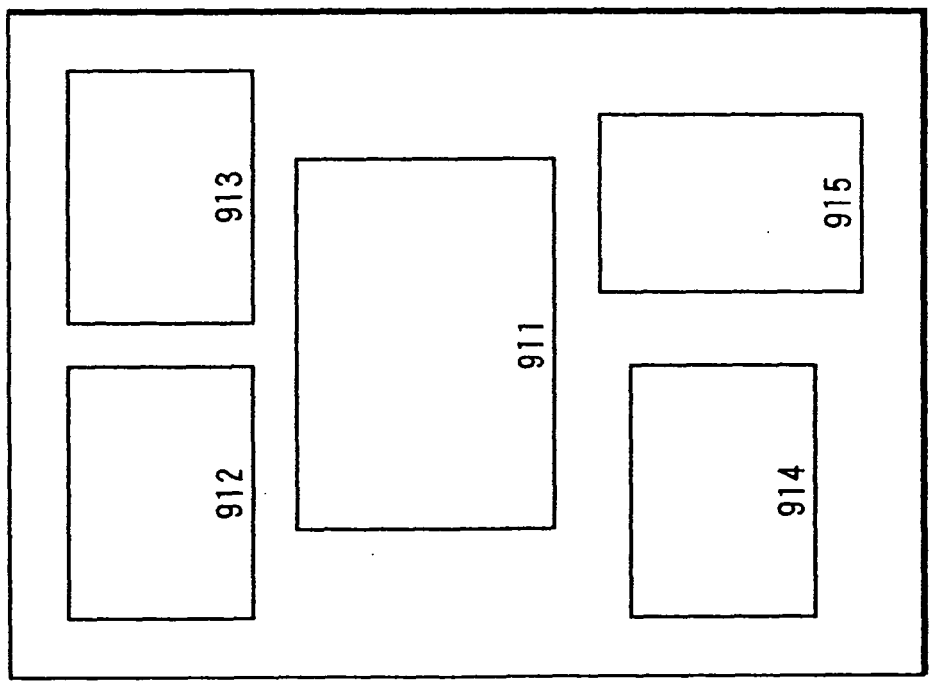

FIGS. 10A and 10B show an example of templates when the frames include vertically elongated ones. In FIG. 10A, a frame 915 is a vertically elongated frame, and in FIG. 10B, frames 919 and 920 are vertically elongated frames. Of course, in order to allow selection of such templates, the system need be informed of the sizes and number of vertically elongated frames in one of setting steps (201), (206), (209), and the like.

Figure 11B:
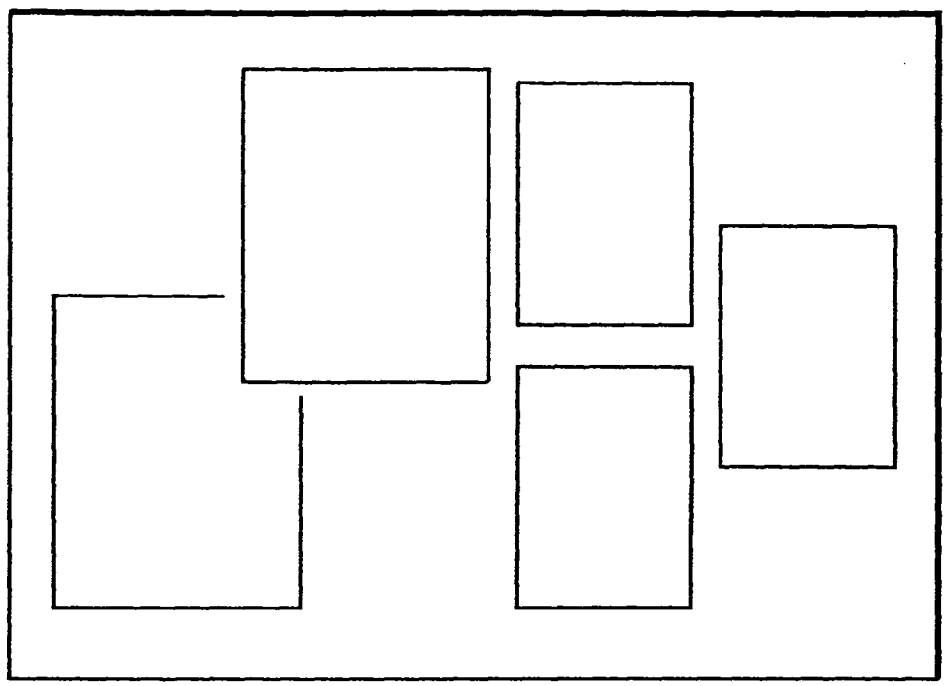
FIGS. 11A and 11B are views showing the third example of layout templates prepared in advance in the first embodiment of the present invention.
Figure 11A:
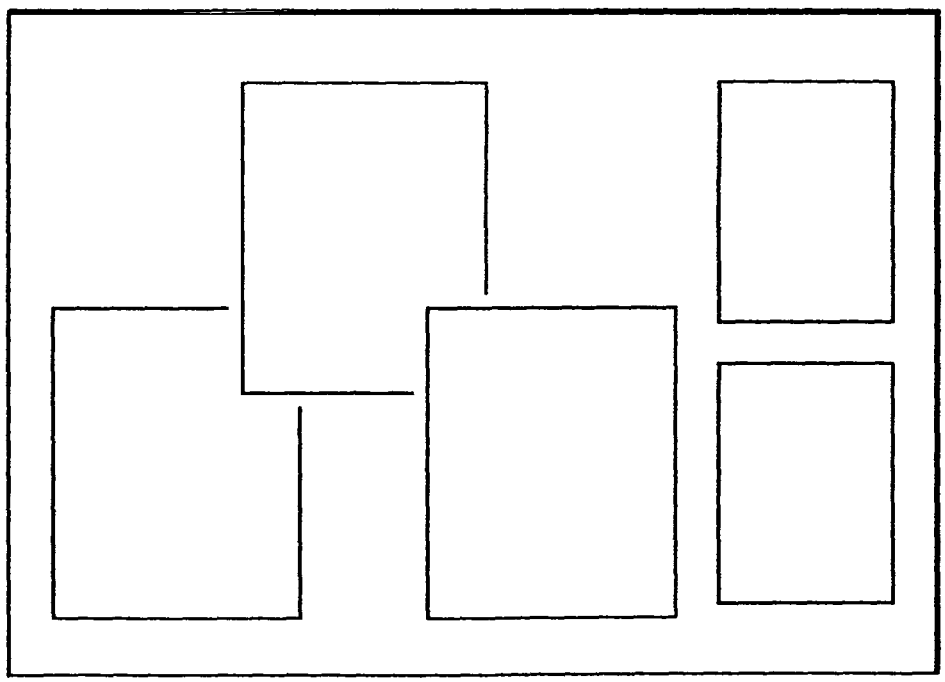

When the number of images to be laid out on a single sheet is large or when the number of L size frames is large, all the images cannot be laid out unless at least some images overlap each other. FIGS. 11A and 11B show an example of such layout. FIG. 11A shows the layout example including three L size frames and two M size frames, and FIG. 11B shows the layout example including two L size frames and three M size frames. According to the data shown in FIG. 8A above, both the templates require overlapping of images, but allow layout of images and belong to recommended combinations. In general, since important objects are rarely present on the four corners of a photograph image, images can be appreciated well by overlaying the four corner portions of the photograph images.

Examples of templates as layouts including S size images will be described below with reference to FIGS. 12A, 12B, 13A and 13B.

Figure 13B:
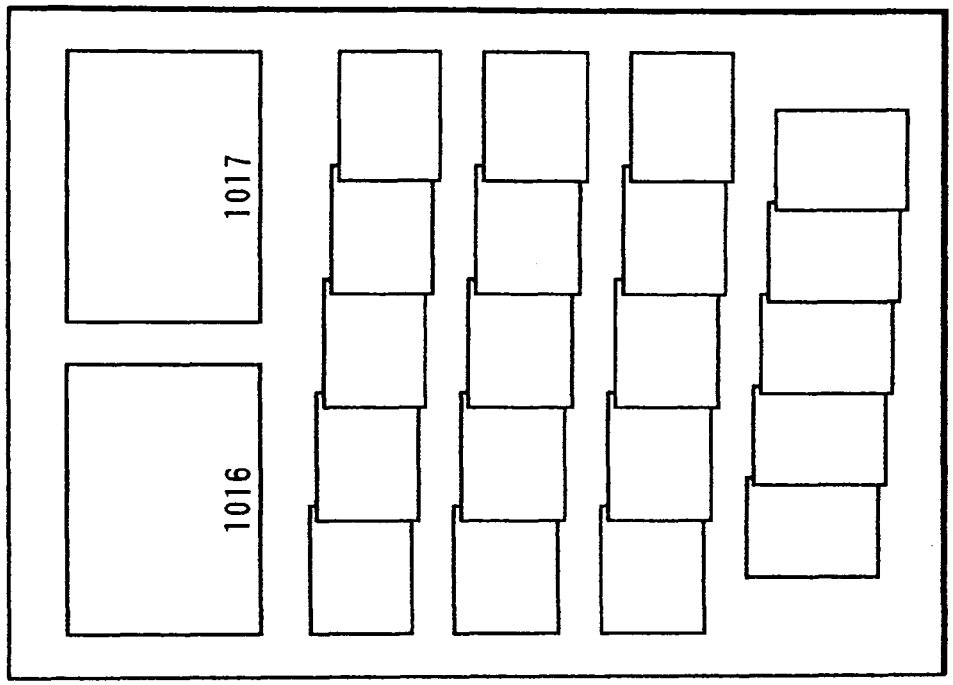
FIGS. 13A and 13B are views showing the fifth example of layout templates prepared in advance in the first embodiment of the present invention.
Figure 13A:
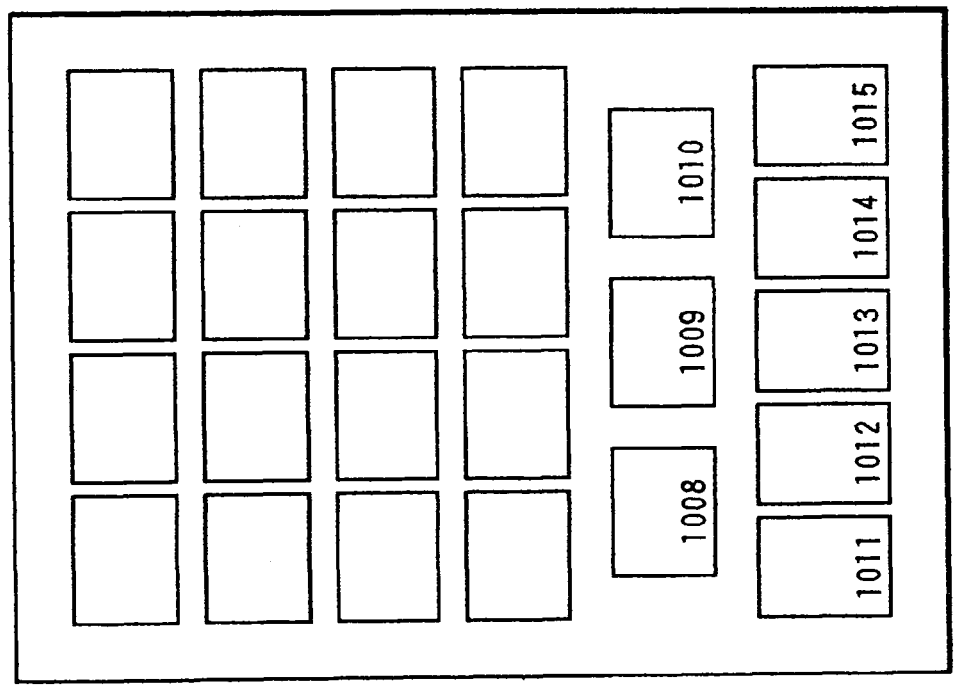

A template shown in each of FIGS. 12A, 12B, 13A and 13B displays images for one 24-frame film, which is most popularly used in recent years, on a single sheet as indices. FIG. 12A shows the layout in which all the frames are simply arranged in the same direction, and FIG. 12B shows the layout in which vertically elongated photographs 1001 to 1007 are rotated according to their designation inputs. Since a layout randomly including horizontally and vertically elongated compositions is not always preferable, images having the horizontally and vertically elongated compositions may be separately arranged, as shown in FIG. 13A. In this case, since the order of frames is different from the recording order on the film, given numbers, marks, and the like must be appended to images to specify the frames on the film.

Since the appropriate number of vertically elongated images to be assigned to one row is different from that of horizontally elongated images, as indicated by images 1011 to 1015, another layout template is required. In this example, in order to adjust the layout of horizontally elongated images, a row of images 1008 to 1010 is added. The simplest method is to prepare different templates in correspondence with combinations of the numbers of all the frames to be displayed and the numbers of vertically elongated frames therein.

FIG. 13B shows an example wherein two images of those shown in FIG. 13A are magnified to the M size as highlight frames, and the remaining 22 frames are displayed on the reduced layout space to overlap each other. The area of each of highlight frames 1016 and 1017 is four times that of the S size image. The initial layout processing can include not only the operation for selecting a standard template but also a means such as calculations and the like. Such means will be described in detail later in the paragraphs of the automatic layout calculation method.

Upon completion of the initial layout processing, the flow advances to step (210), and the layout is displayed. Images are laid out according to the selected or calculated layout, and are displayed as a whole. As a display pattern, the layout images and the indices of the frames may be simultaneously displayed, or only the layout images may be displayed on a displayable area in a magnified scale.

The former display pattern allows easy correction and edit operations later, but images are not easy to see since the respective images are displayed in a reduced scale. On the other hand, with the latter display pattern, the respective images are displayed in a magnified scale and are easy to see. However, since a series of original images are not displayed except for those used in the layout, the layout correction may become difficult to perform depending on the correction contents. For example, such problem occurs when a frame to be used in the layout is replaced by another frame which is not used currently.

As image data used in the layout display in step (210), it is not proper to directly use data read from the digital data source in terms of the system configuration. As described above, CRT display data need only have an information amount much smaller than that of print data, and low-resolution data can be sufficiently used. Even when a compression/expansion technique is used, an optimal method differs. In any case, some processed image data must be used.

The flow advances to step (211), and an intention input associated with correction or changes of the layout images is received. The contents of intentions to be inputs are various, but the following contents are typical.

(1) The length/breadth position of each image is changed.
(2) The size and shape ratio of each image are changed.
(3) An image is trimmed.
(4) An image to be highlighted is input or changed.
(5) A new frame is added to the layout.
(6) An unnecessary frame is deleted from the layout.
(7) A frame used in the layout is replaced by another frame which is not currently used.
(8) The positions of the respective images are changed.
(9) The type of artificial image to be synthesized with a photograph image is selected.
(10) The insertion position of a comment is input.
(11) A comment is inserted.
(12) The basic pattern of the layout is changed.
(13) The generated layout is approved.

On the other hand, step (214) for performing the input operation for inputting such edit intentions is attained using a mouse, joystick, keyboard, screen touch panel, and the like, as has been described above in the initial and intermediate setting steps. A basic combination mainly includes a pointing device for indicating a specific position on the screen and an on/off switch for transmitting an intention, in addition to a keyboard for inputting characters. The input keyboard and the CRT screen display shown in FIGS. 5, 6, and 7 can attain operations to some extent, but the user interface is preferably re-built to an optimal one to cope with various correction menu items.

Figure 14:
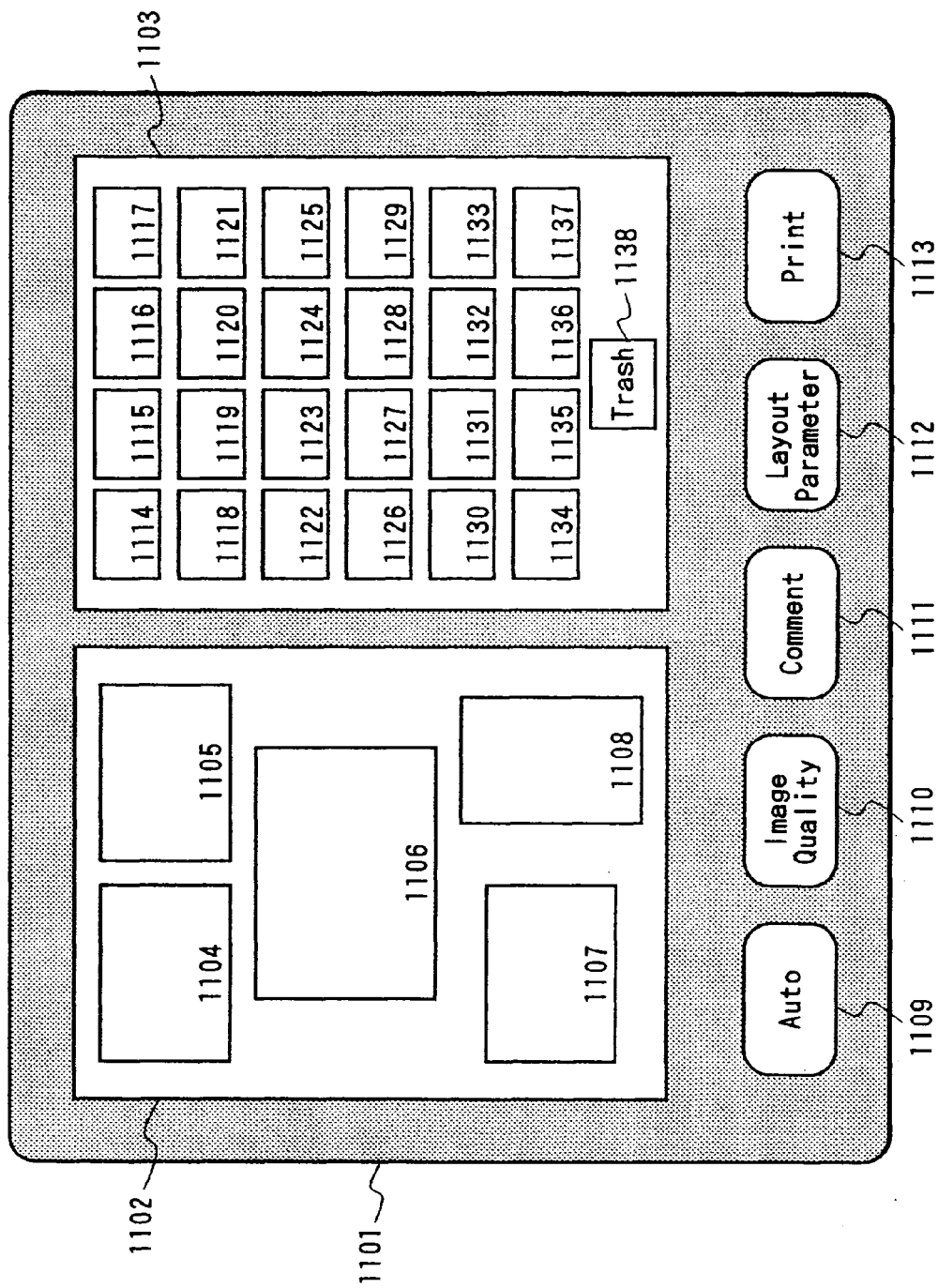
FIG. 14 is a view showing a display example on the CRT screen suitably used in step (211) in FIG. 2.

FIG. 14 shows the CRT screen display preferably used in step (211). The operator operates the mouse or touch panel while observing this display.

The contents displayed on a CRT screen 1101 in FIG. 14 roughly include a layout display portion 1102, an index display portion 1103, and function keys 1109 to 1113.

The layout display portion 1102 displays the layout generated based on parameters set in the initial and intermediate setting operations or the layout at that time as a result of correcting the generated layout. The index display portion 1103 displays all the images for, e.g., one film. In principle, this portion displays all the images input to the system and associated with the layout operation. Since the balance of selected frames may be taken into consideration, all the images including those which are not used in the current layout but may be used after correction are displayed. When the system has no corresponding image information, e.g., when the film scanner skips scanning, since the contents of an image itself cannot be displayed, only its frame number may be displayed.

In this embodiment, the basic layout operations such as image magnification/reduction, replacement, addition, deletion, and the like can be executed without operating any function keys. Such simple arrangement of the basic operations is important to improve productivity and to reduce working cost.

Figure 16A:
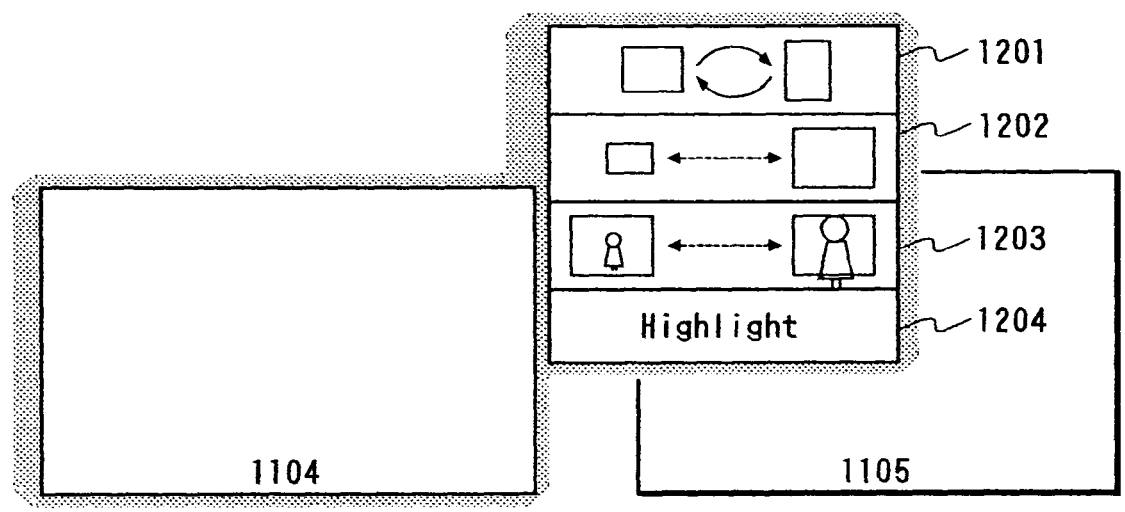
FIGS. 16A and 16B are views showing a display example upon accepting the edit contents associated with the display of a specific frame when the frame in the layout image is designated in the first embodiment of the present invention.
Figure 16B:
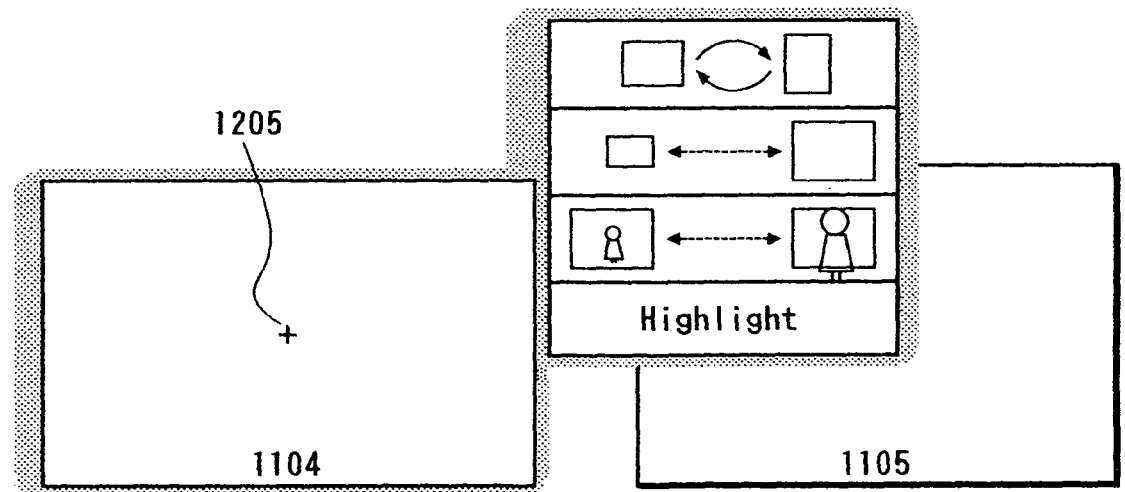

FIGS. 16A and 16B show the state on the screen that accepts the correction contents associated with the display of one designated frame (e.g., a frame 1104) in the layout images. Note that the frame can be selected by simply pressing the frame 1104 displayed on the screen with a finger when, e.g., the touch panel is used. To cancel this selection, the same frame is selected again, another frame is selected, a special input operation for canceling the selection is performed, and so on. When the frame 1104 is designated, display portions 1201 to 1204 used for changing the attributes of the image of this frame appear. Parameters associated with the overall layout are designated or input using the function keys 1109 to 1113 displayed on the lower portion of the screen, and parameters associated with an individual frame are designated or input in the vicinity of the corresponding image, thus allowing easy operations.

The display portion 1201 is used for changing the length/breadth direction of the frame. Every time this display portion is selected, an image is rotated through 90°. The display portion 1202 is used for magnifying/reducing the image size. Every time a larger rectangle displayed on the display portion 1202 is selected, the image is magnified by one step; every time a smaller rectangle is selected, the image is reduced by one step. The width of the conversion step can be arbitrarily determined in correspondence with the application of the system. The display portion 1203 is used for trimming an image. Upon selecting this portion, the magnification of the image is changed while maintaining the image frame size. When the left icon in FIG. 16A is selected, the image is reduced (wide side); when the right icon is selected, the image is magnified (telephoto side). The width of the magnification/reduction step can be arbitrarily determined in correspondence with the application of the system.

Upon trimming an image, the central point of magnification/reduction must be determined, and in this case, the central point is determined by designating one point in the image 1104 using a pointing device. The designated position is displayed using a marker 1205 or the like, as shown in FIG. 16B. As the designation timing, the designation operation for selecting the frame 1104 can be used as an initial value, the pointing operation in the frame during selection of the frame or the pointing operation in the frame during selection of the display portion 1203 can be used as an initial value or the setting change value. If no pointing operation is made, the center of the frame at that time is determined as the center of magnification/reduction.

In addition to setting the central position of trimming, an image itself, which has been magnified/reduced to an appropriate magnification may be moved with respect to the image frame of the frame 1104. In this case, it is proper to move the indication point while selecting the image of the frame 1104 using a pointing device.

The display portion 1204 is used for giving an attribute of a highlight frame to the selected frame. When the frame is already designated as a highlight frame, the given attribute is removed. Since a few highlight frames are preferentially processed in terms of their display sizes and display positions, the best ones of a series of layout images are selected. When a certain frame is designated as a highlight frame, such layout is automatically obtained.

Figure 17A:
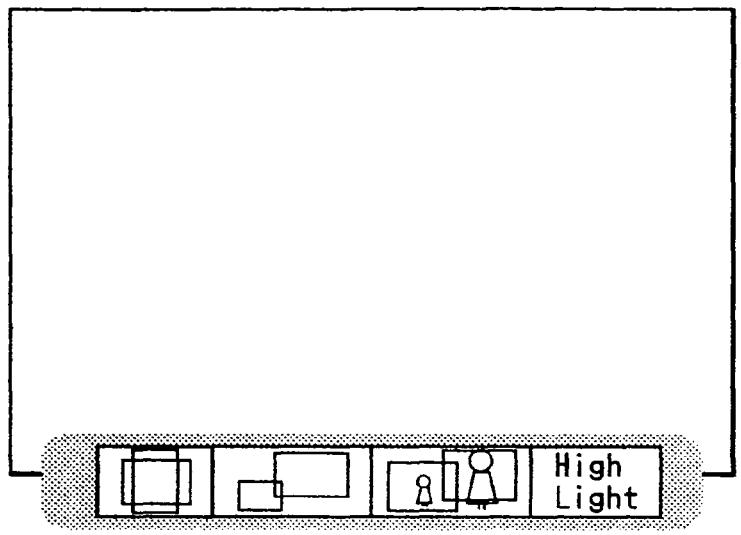
FIGS. 17A, 17B and 17C are views showing another display format for performing individual operations of frames in the first embodiment of the present invention.
Figure 17B:
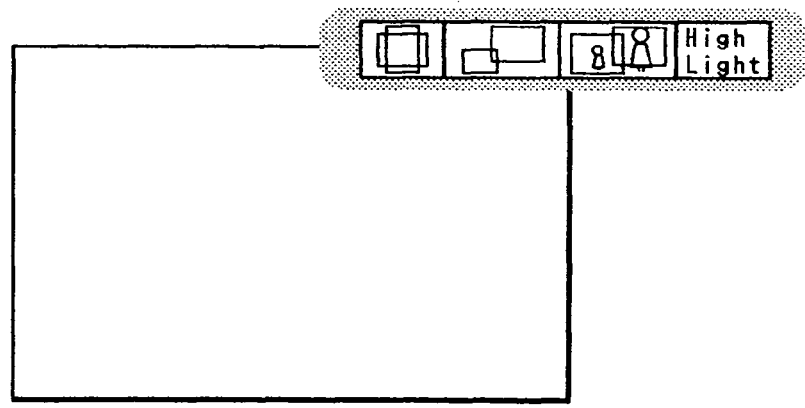
Figure 17C:
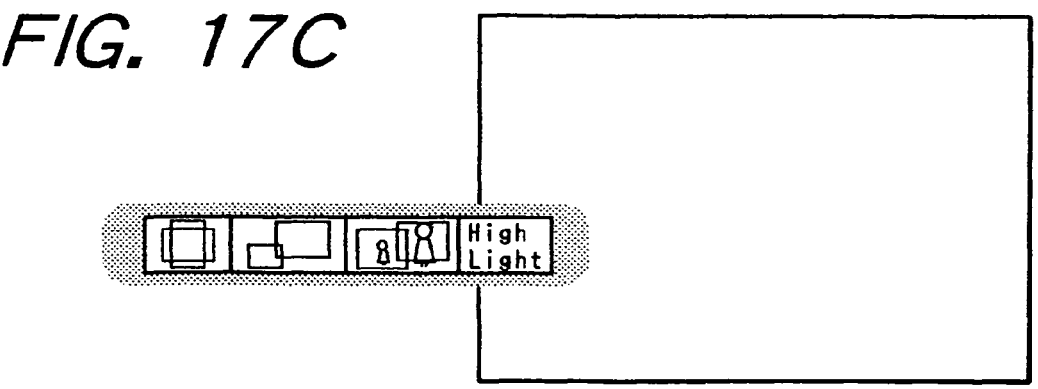

FIGS. 17A to 17C show another display pattern used for performing the operations of individual frames. The type shown in FIGS. 16A and 16B above assures a large operation display, and conceals the non-selected neighboring frames. As a consequence, the entire layout is not easy to see. The operation display shown in FIGS. 17A to 17C arranges the same functions as those in FIGS. 16A and 16B on a more compact window, and this window can be moved to a desired position in the vicinity of the selected frame, as shown in FIGS. 17B and 17C.

Referring back to FIG. 14, another layout operation method will be explained below.

An image to be used in the layout is replaced as follows. For example, when the contents of a layout image 1104 are to be replaced by an image 1114 displayed as an index, the image 1104 is selected, and thereafter, the image 1114 is selected. Also, these images may be selected in the order opposite to that described above. With this operation, the contents of the frame 1114 in the index display are laid out at the position of the image 1104. On the other hand, the image displayed so far at the position of the image 1104 is originally displayed in indices 1114 to 1137, and can be re-selected if necessary.

A new image is added to the layout by the following operation. For example, when the image of the frame 1114 is to be added to the display portion 1102 of the layout screen, the frame 1114 is selected, and then, a blank portion of the display portion 1102 is pointed. As a result of adding one image, this layout includes a combination of one L size image and five M size images. According to the data shown in FIG. 8A, this combination is possible, but is not recommended. Since layout templates for all possible combinations are available, the images are laid out again in accordance with the new template.

An image is deleted from the layout by the following operation. For example, when an image 1107 is to be deleted from the display portion 1102 on the layout screen, the image 1107 is selected using a pointing device, and then, a trash display portion 1138 is selected. When a certain image has already been selected, and the operation mode accumulates the selected state of an image, image deletion by selecting the display portion 1138 requires a cumbersome operation, and is likely to cause operation errors.

As another effective operation procedure, a method of requesting concurrence of selection of an image and selection of the trash display portion 1138 is available. For example, in the above-mentioned example, when the pointing device is a touch panel, the display portion 1138 is pointed while pointing the image 1107 with a finger. When the touch panel cannot simultaneously detect the pointing operations at the two points, an alternative operation can be attained by pointing the image 1107 with the finger and dragging the image 1107 to the display portion 1138 by moving the finger without releasing it from the panel. This operation may be performed in the order opposite to that described above. Since one image is deleted, this layout consequently has a combination of one L size image and three M size images, which is a possible one according to the data shown in FIG. 8A. Since layout templates for all possible combinations are available, the images are laid out again in accordance with the new template.

The layout control on the entire screen using the function keys 1109 to 1113 in FIG. 14 will be described below.

Figure 15:
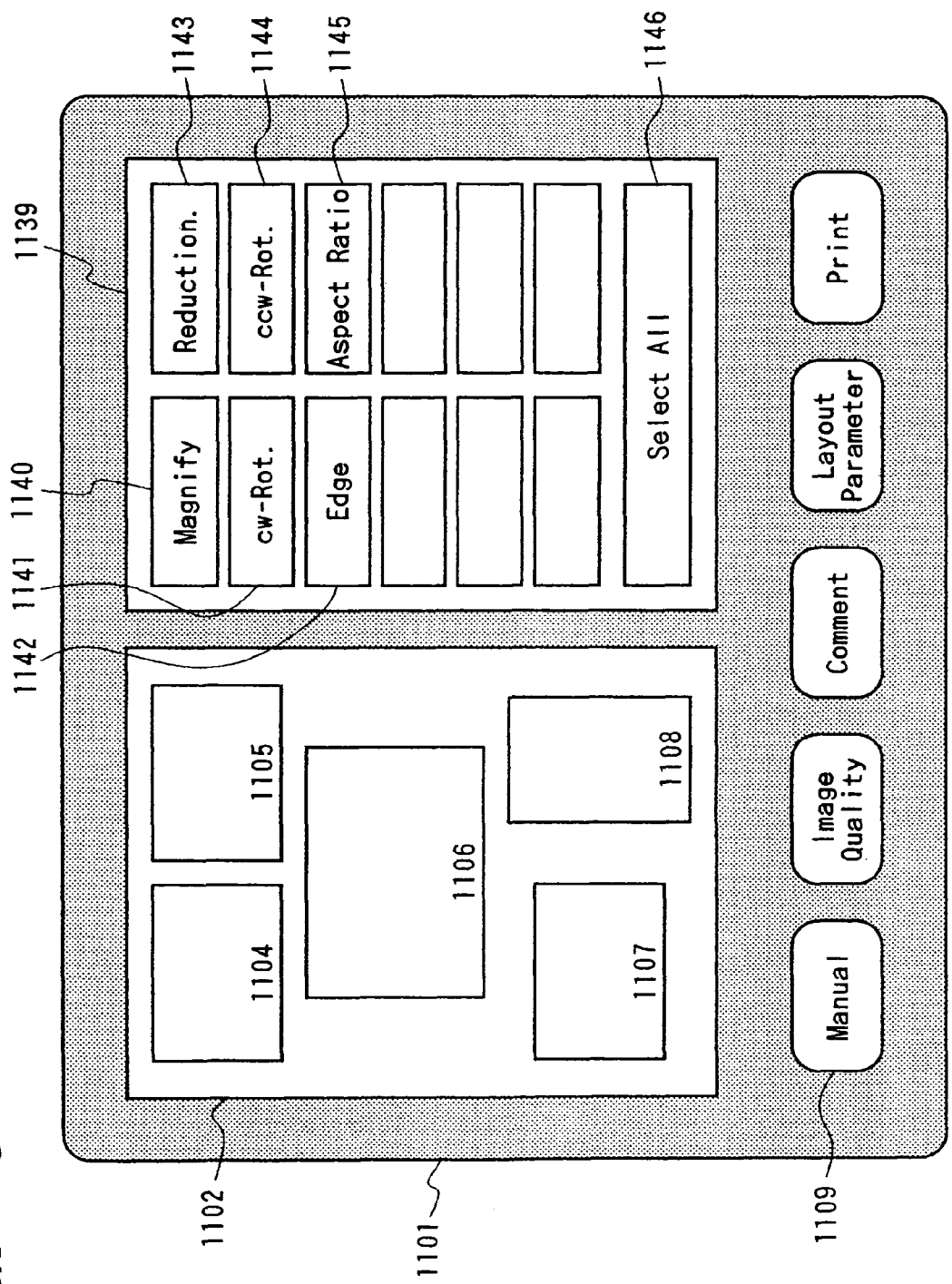
FIG. 15 is a view showing another display example on the CRT screen suitably used in step (211) in FIG. 2.

The key 1109 is used for switching between an automatic layout mode and a manual layout mode, and reverses the mode every time it is selected. In the manual mode, various fine operations can be performed. FIG. 15 shows the display state on the CRT screen when the manual mode is selected. The key 1109 indicates that the manual mode is selected, and a manual layout control display portion 1139 appears in place of the index display portion.

Keys 1140 to 1145 on the manual layout control display portion 1139 indicate the contents of layout operations. When each of these keys is selected, operation choices of the selected key are further displayed in detail. For example, in FIG. 15, the key 1140 is used for magnifying an image, the key 1141 is used for rotating an image clockwise, the key 1142 is used for expressing an image boundary portion, the key 1143 is used for reducing an image, the key 1144 is used for rotating an image counterclockwise, and the key 1145 is used for changing the aspect ratio. Note that the boundary portion expression to be attained by the key 1142 allows to select an expression format of the image edges, which contact the background, of each frame, and various expression formats are selectable. For example, the boundary between the edge of a frame and the background may be divided by a clear line or may be expressed by a gradation pattern.

In FIG. 15, in order to specify the frame to be operated, the frame can be simply selected by a pointing device. In this case, a plurality of frames may be simultaneously selected. In this case, all the selected frames are given selection indications or the like, and are operated according to the same contents. In order to remove some of already selected frames from the selection, the frames are selected again by the pointing device. When the same operation is to be performed for all the layout-displayed frames, a display portion 1146 can select all the frames as the objects to be operated. When all the frames are selected, and thereafter, some frames are selected individually, only the some selected frames can be removed from the objects to be operated. The selection operation by the pointing device which is normally used can clear the previous state by the next selection operation. In this embodiment, in order to allow arbitrary selections in a random order, the procedure for accumulating the individual selection operations and selecting or clearing all as needed is preferable.

Referring back to FIG. 14, the key 1110 is used for setting image quality control parameters. As the most basic image quality control parameters, the color conversion characteristics and gamma conversion characteristics are known. In addition, the resolution of the scanner, digital filtering, masking processing, and the like are also known, and are to be set.

When this key is selected, an image quality control parameter setting screen appears in place of the index display portion 1103 as in the above-mentioned example, but is not related to the gist of the present invention, and a detailed description thereof will be omitted.

The key 1111 is used for inserting characters into the layout. When one point on the layout display portion is selected while the key 1111 is being selected, all the images are laid out again to insert a character string at the selected position. FIG. 18A shows an example of the positions pointed in the layout screen while the key 1111 is being selected. For example, when an upper position 1401 in the layout screen is designated, it is estimated that the operator wants to insert a comment in the uppermost portion of the entire layout, and a comment section 1404 is arranged, as shown in FIG. 18B. At this time, since images 1104 to 1108 must be shifted downward as a while, they are shifted while slightly adjusting the distances between adjacent images and their magnifications. Of course, such layout adjustment is automatically made (see 1104' to 1108' in FIG. 18B). On the other hand, when a position 1402 is pointed, there is no appropriate re-layout for setting a comment insertion section at the center of the screen, and a warning message indicating this is generated. When a position 1403 is pointed, a comment section 1405 is set, as shown in FIG. 18C, and in this case, the position of only an image 1107 is adjusted.

The key 1112 is used for setting layout parameters. As will be described later, in order to automatically generate a layout, an adjustment must be made by calculations while adjusting the balance among a plurality of layout rules, and the generation result changes depending on the sets of a calculation evaluation system and rules and the weighting balance of the rules to be selected.

The key 1113 is used for finishing the layout processing, and instructing to start a print process. When this key is selected, an automatic layout parameter setting screen appears in place of the index display portion 1103 as in the above-mentioned example.

In this manner, the intention input in step (211) in FIG. 2 is made, and the flow then advances to step (212). When the layout processing is finished and the control enters the print process, the flow advances to step (213); when re-layout processing or the like is required, the automatic layout is performed in step (209) again. The result is displayed, and the intention input is received again. In this way, the processing is repeated in the above-mentioned loop.

The automatic layout method in step (209) will be explained below.

In order to automatically lay out a plurality of photograph images on a single sheet to have a good appearance, layout calculations using a predetermined algorithm is required. Various calculation methods are available. In this case, it is important to build a calculation system which can normally recognize parameters to be controlled consequently and can obtain evaluation results by calculations in correspondence with subjective visual evaluation results. According to the examinations of the present inventors, the parameters to be evaluated are as follows.

(1) The arranged states of the edges of a plurality of frames. Especially, when the lower edges are not arranged in line, the layout pattern has a very poor appearance.

(2) The symmetry, in the horizontal and vertical directions, of the layout. Although the symmetry of the layout is more or less a matter of personal preference, a higher subjective evaluation result is normally obtained as the symmetry is higher.

(3) The absolute values of the distances between adjacent frames and the balance. The optimal distance absolute value depends on the display size of each frame, and the distance between adjacent frames is preferably set to be larger to obtain good appearance as the display size becomes larger.

(4) The same distance between adjacent frames is set when three or more frames having the same size are arranged in line in the horizontal or vertical directions.

(5) When a specific frame is designated as a highlight frame and its size is set to be relatively larger than other frames, the frame is preferably set at substantially the central position in the horizontal direction and at the central portion or the upper portion in the vertically direction.

(6) When the highlight frame has an aspect ratio that defines a very horizontally elongated composition (e.g., a so-called panorama size), a stable layout is obtained by setting the frame at the central portion or lower portion in the vertical direction, irrespective of the above-mentioned rule.

(7) The layout imbalance occurs when the blank space between adjacent frames is concentrated on a specific place.

Various calculation methods that realize these rules with an appropriate balance are proposed. As the most analytic approach, the above-mentioned rules are formulated, and the formulas are solved in turn in the order of their priority.

In the above-mentioned method, since the rule with higher order absolutely has priority over other lower-order rules, there is often no room for satisfying lower-order rules. A calculation system that generates a layout while balancing a plurality of rules is desirable although the calculations become complicated. As such method, the offset from an ideal value of each rule is numerically expressed, the square sum of the offset is defined as an evaluation function, and the evaluation function is minimized. More specifically, the evaluation function given by equation (1) below need only be minimized:

$$Q = \Sigma k W k \times (Rk - Rk_0)^2 \quad (1)$$

where Wk is a weighting coefficient for each rule, Rk is a value obtained by numerically expressing a rule k, and $Rk_0$ is the ideal value of Rk. Rk, $Rk_0$, and the like are mathematically described by parameters that express in detail the contents of each rule, i.e., the distance between adjacent frames, the difference in distance between adjacent frames, the symmetry of the frame distribution, the distance between the lower edge of each frame and a common imaginary horizontal line, and the like.

Furthermore, the above parameters are described based on three basic factors, i.e., the central coordinate position, magnification, and aspect ratio of each frame. Since many mathematical schemes for optimizing the evaluation function that depend on a plurality of independent variables are known, a basic factor that minimizes the function Q can be obtained using these schemes. In a popular scheme, changes in evaluation function with respect to each independent variable are checked, and its dependence is considered to be locally linear, so as to reduce the problem of optimization into a solution for a sequential linear equation.

In the flow in FIG. 2, the calculation in step (209) can reflect the correction contents designated in step (211). In general, a solution for a nonlinear problem of optimization with many variables varies depending on the way of selecting the initial conditions, and it is hard to predict the solution. However, in this embodiment, since the initial layout in step (207) gives proper initial conditions, a behavior with very high convergence can be obtained.

Another effective method is fuzzy inference or neuro fuzzy inference. In this case as well, the method of building a calculation system is similar to equation (1) above, and a proper conclusion with good balance can be obtained by describing the respective layout rules by fuzzy inference and calculating them with appropriate weighting coefficients. A general technique of this calculation method is known to those who are skilled in the art, and a detailed description thereof will be omitted.

Second Embodiment

The second embodiment of the present invention will be described hereinafter.

As the embodiments of the present invention, many variations are available. The most basic requirements for an album-like layout are to allow efficient inputting of selection of photograph images to be used in the layout, designation of the length/breadth directions, and designation of the photograph image sizes, and to realize a new layout with good appearance on the basis of the input instructions without impairing the entire balance. Highlight processing as one of the most basic operations in this sense will be described in detail below as the second embodiment of the present invention.

Unlike the operation for normal frames, the operation for a highlight frame requires adjustment of not only a certain frame but also the entire layout to maintain good layout balance since the highlight frame is the important one of the layout and has a large display size. The processing upon increasing the size of a highlight frame 1501 will be explained below while taking as an example a layout consisting of five photograph images including the highlight frame 1501 and normal frames 1502 to 1505, as shown in FIG. 19A.

In the operation procedure, the frame 1501 is selected using a pointing device, and the right mark on the display portion 1203 is designated, as shown in FIG. 16A. As a consequence, the automatic layout loop in step (209) in FIG. 2 takes a round, and FIG. 19B is obtained. The highlight frame 1501 is magnified at a predetermined magnification to obtain a frame 1506, and other general frames are vertically shifted and set at the positions of frames 1502' to 1505' in FIG. 19B since the size of the highlight frame becomes large. When another magnifying processing of the highlight frame 1506 is performed, the layout shown in FIG. 19C is obtained. Since a highlight frame 1507 is emphasized very much and is large, no appropriate layout can be determined while maintaining the sizes of other general frames, and hence, the general frames are slightly reduced and set at the positions of frames 1508 to 1511, as shown in FIG. 19C.

In many cases, changes in highlight frame influence the entire layout in this manner. Since individual adjustment of the positions of the frames results in very low efficiency and poor operability, it is effective to perform systematic adjustment on the basis of the automatic layout algorithm.

FIGS. 20A to 20C show another example associated with the highlight processing.

A case will be examined below wherein a general frame 1502 is additionally highlighted in FIG. 19A. In the operation procedure, the frame 1502 is selected using a pointing device, and the display portion 1204 in FIG. 16A can be designated.

As a consequence of a round of the automatic layout loop, the layout shown in FIG. 20A is obtained. The frame 1501, which is originally designated as the highlight frame, is set at the position of a frame 1601, the frame 1502, which is designated as a new highlight frame is set at the position of a frame 1602, and the remaining general frames are set at the positions of frames 1603 to 1605. In this way, when the numbers of images, which make up the layout, of the respective sizes are basically changed, the control may return to template processing without performing automatic layout based on the algorithm processing. According to the data shown in FIG. 8A, this combination including two "L" size images and three "M" size images belongs to possible combinations, and a typical layout is prepared. In this case, a layout including some overlapping portions must be adopted. Since highlight designation is nonsense when the number of frames designated as highlight frames is too large, a predetermined reference value is set in advance, and when the highlight frame is additionally designated and the number of highlight frames exceeds the reference values, it is effective to generate a warning or to inhibit the processing based on the input.

Furthermore, when one general frame is additionally designated in the layout shown in FIG. 20A, the layout shown in FIG. 20B is obtained. The position of the frame 1605 is changed, and the newly added frame is set at the position of a frame 1606.

FIG. 20C shows another layout example. It is difficult to generate such large changes in layout by the algorithm processing, but such changes can be easily realized in combination with the template processing.

Figure 21:
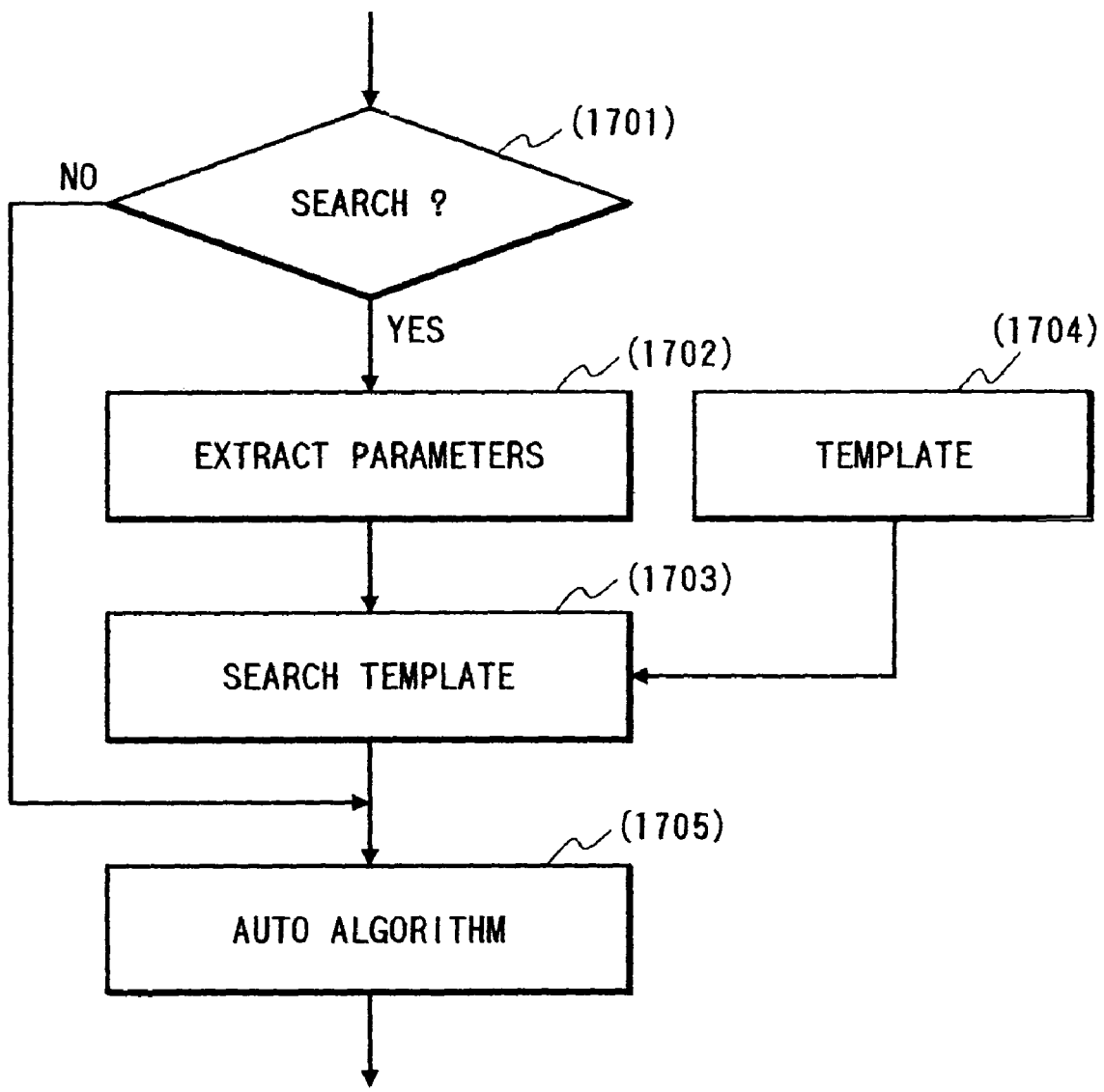
FIG. 21 is a flow chart partially showing the operation of automatic layout processing in the second embodiment of the present invention.

The processing flow in this case is one obtained by replacing the automatic layout processing in step (209) in FIG. 2 by the flow in FIG. 21. More specifically, it is checked in step (1701) if the basic parameters of the layout have changed. If N (NO) in step (1701), the flow advances to the algorithm processing in step (1705). However, if Y (YES) in step (1701), the basic parameters that define the layout, i.e., the numbers of images of the respective sizes, the numbers of images designated at the length and breadth positions, the presence/absence of frames designated as highlight frames, and the like, are accurately re-defined in step (1702), and a search for a template that can satisfy such conditions is performed in step (1703). Using the obtained template, fine adjustment of the layout is performed by the algorithm processing on the basis of the already input intention in step (1705). In this case, the number of templates obtained is not limited to one, but it is proper to prepare a plurality of templates in correspondence with a specific combination of parameters. These templates have a predetermined priority order, and it is desirable for the operator to be able to access these templates in turn using a function key.

Like the addition of a highlight frame, the replacement of a highlight frame is an important operation. The replacement can be attained by combining the above-mentioned operations. However, in consideration of the use frequency, a shortcut operation mode is preferably prepared. Referring to FIG. 14, when a frame 1106 already designated as a highlight frame is replaced by, e.g., a frame 1105, the frame 1106 is selected using a pointing device, and immediately thereafter, the frame 1105 is selected. In this case, the operation order may be reversed. The operation for selecting a frame which is not currently used in the layout from the index display portion 1103, and replacing it by the highlight frame can be attained by the same operation. Since such shortcut operation can improve operability but may also increase probability of operation errors, it is effective to display a confirmation message or the like before re-layout.

Third Embodiment

The third embodiment of the present invention will be described below.

Figure 22:
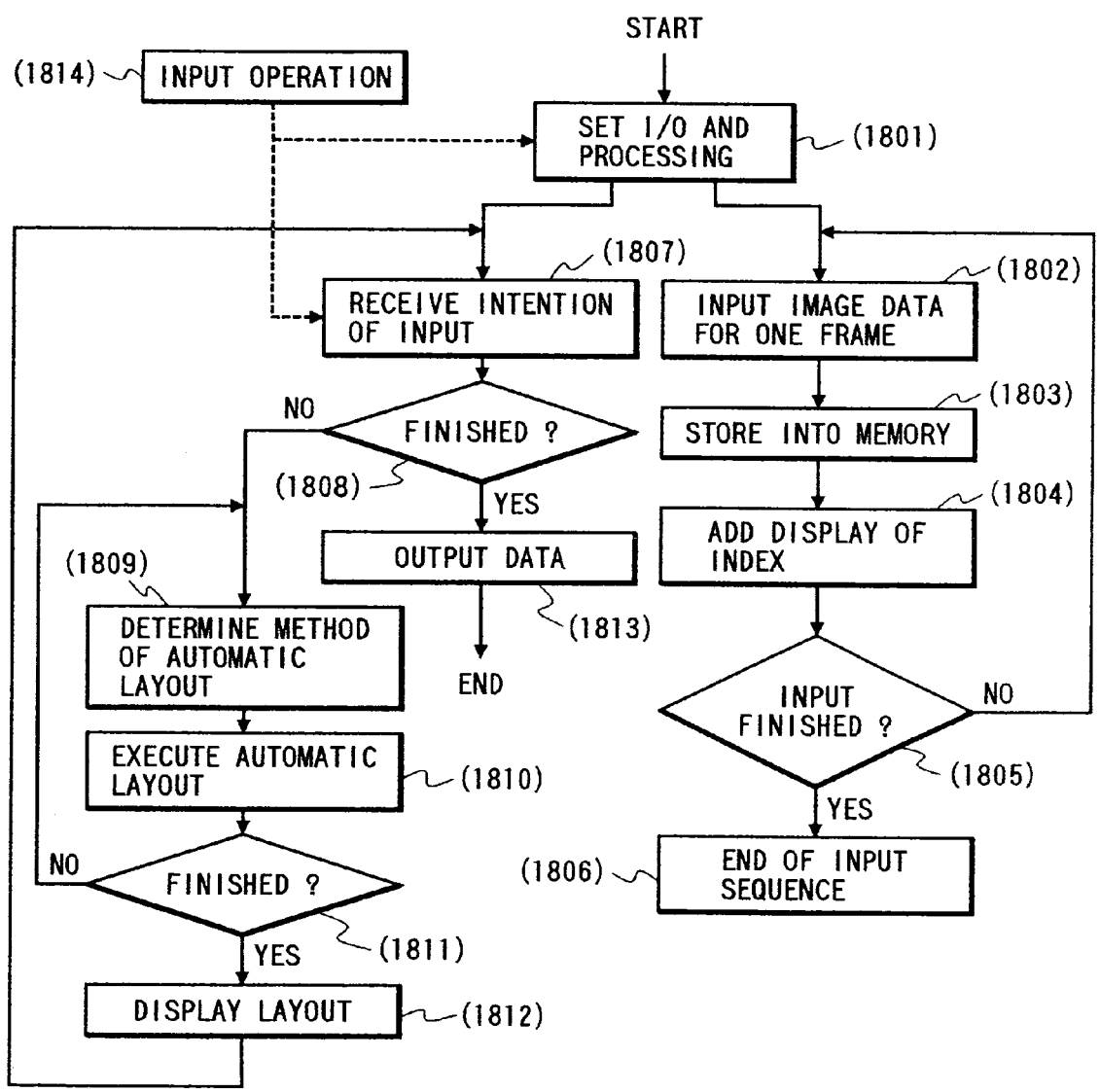
FIG. 22 is a flow chart showing the operation of principal part in the third embodiment of the present invention.
Figure 23:
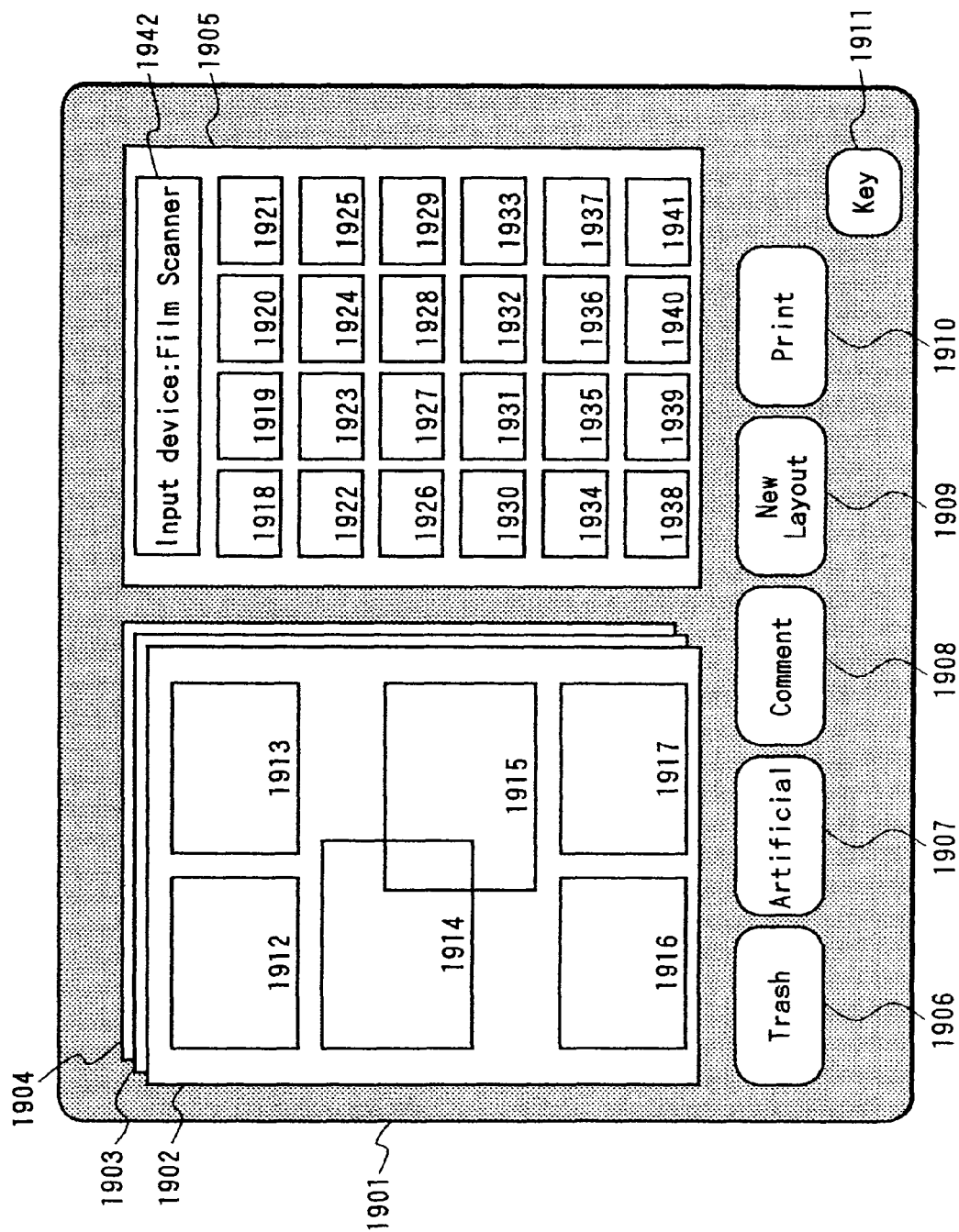
FIG. 23 is a view showing a display screen on the CRT screen in the third embodiment of the present invention.

The third embodiment is obtained by combining a high-speed calculation environment and a high-speed image data source. FIG. 22 is a flow chart showing the operation of the third embodiment, and FIG. 23 shows the display state on the CRT screen as an example of the user interface.

The operation flow shown in FIG. 22 is premised on the multitasking system environment, and the input job of image data and the layout job apparently independently operate. Of course, in a single-processor system, one processor executes a plurality of jobs by time sharing. In a recent high-speed computer system, an OS assigns the processor performance while discriminating the priority of these jobs at the respective timings, and these jobs can be considered as nearly independent ones in design of the layout system.

In FIG. 22, I/O devices and layout processing are basically set in step (1801). That is, setting of I/O devices such as designation of an image data source such as a scanner, CD-ROM, or the like, setting of an output printer, and the like is performed. Also, the basic pattern of the layout processing in units of purposes is designated. The layout processing includes some basic patterns such as those for indices, classification in units of themes, and the like in addition to an album-like layout, and the way of processing varies largely. Hence, the basic purpose is preferably set in advance.

Thereafter, the input flow in step (1802) and the subsequent steps, and the layout flow in step (1807) and the subsequent steps apparently concurrently progress. The input flow includes step (1802) of inputting image data for one frame, step (1803) of storing data in a memory, and step (1804) of displaying an index. Data is preferably stored in the memory after it is compressed by an arbitrary method. Image data stored in this step is repetitively used in the layout jobs in step (1807) and the subsequent steps although not shown in detail in the illustrated processing flow. In step (1804), an input image is additionally displayed in an index window. The above-mentioned operations are repeated until it is determined in step (1805) that the input operations of all the frames have been finished. After image data of all the required frames are input, the input flow ends, and is not executed thereafter.

The layout flow in step (1807) and the subsequent steps will be described below.

In step (1807), an intention input is received. The input display state in this case is that shown in FIG. 23. This display state is similar to that shown in FIG. 14, and only the differences will be explained.

First, there are a plurality of layout windows 1902, 1903, and 1904. These windows correspond to the fact that a plurality of layouts can be automatically generated on the basis of different criterion. Second, some function keys have different contents. These keys will be described later.

The operation will be described in turn below. It is checked in step (1808) if the input intention indicates to continue or finish the layout processing. If the layout processing is to be finished, the flow advances to step (1813); otherwise, the flow advances to step (1809). In step (1809), the method of automatic layout is determined in accordance with the input instruction contents. In step (1810), the processing is executed. As the method of automatic layout, a template search method, an algorithm calculation processing method, and the like are available, as has been described in the above embodiment. In step (1811), the automatically generated layout is evaluated. If another processing is required, the flow returns to step (1809); if it is determined that the layout processing has finished, the generated layout is displayed in step (1812), and the flow returns to step (1809).

In general, the template search method is easy and can obtain a satisfactory result. However, it is impossible to prepare all the templates corresponding to slight magnifying/reduction of each screen, comment insertion optimized for an arbitrary character size or the number of characters, and the like. For this reason, different layout methods need be used in combination. Of course, since the template processing can obtain more satisfactory results than the algorithm method, templates corresponding to as much cases as possible are preferably prepared. If many template data are available, every correction intention input in step (1807) can be realized by a layout prepared carefully in advance in the design process with high possibility, and even when the automatic layout based on the algorithm processing is required, only small changes in layout are generated, and a satisfactory result can be obtained.

Since the layout flow in step (1807) and the subsequent step premised on the multitasking environment can operate independently of the input flow, the layout operation may start before or during input of image data to the system. An index window 1905 in FIG. 23 initially displays the display frames and ID numbers of the respective frames, and also displays image contents in the order from the frames whose image data are input. If the frames to be used in the layout are predetermined based on, e.g., the ID numbers, the layout job itself can progress by designating individual images using a pointing device even when image data are not input yet. Thereafter, when the image data of the corresponding frames are input, images can be additionally displayed on both the index window 1905 and a layout window 1902.

The new function keys shown in FIG. 23 added in this embodiment will be described below.

An input key 1906 is the same as the trash display portion 1138 in FIG. 14. Also, a key 1908 is the same as the comment insertion key 1111 above, and a key 1910 is the same as the print instruction key 1113 above. Hence, a detailed description thereof will be omitted.

Figure 24:
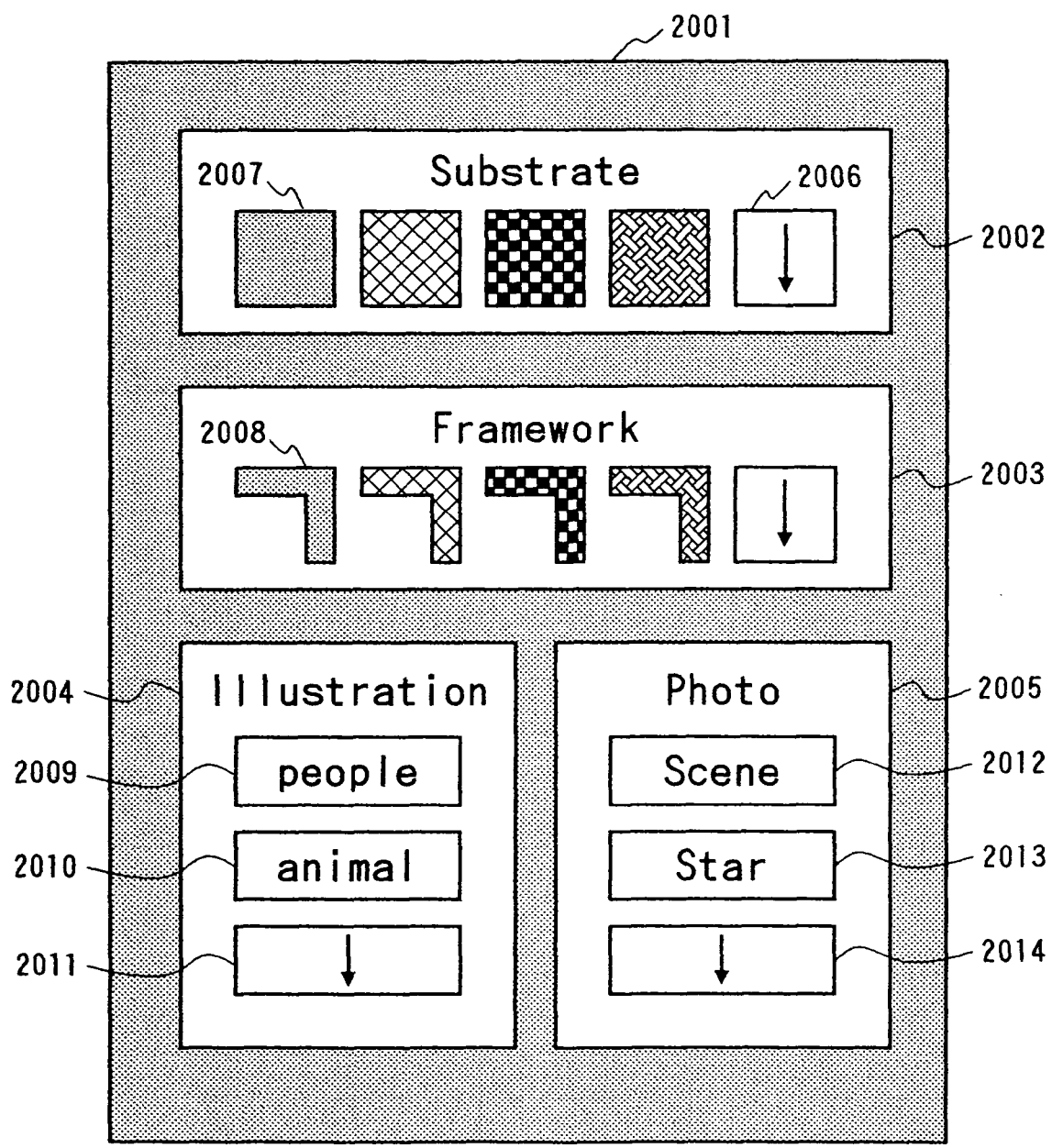
FIG. 24 is a view for explaining function keys and display states upon operating these keys in the third embodiment of the present invention.

A key 1907 is used for performing a setting operation associated with an artificial image used in the layout. When this key is selected, the index window 1905 is switched to an artificial image setting window 2001 shown in FIG. 24. The image setting contents are roughly classified into four types. A setting frame 2002 is used for designating a substrate pattern of the entire layout image. The frame 2002 displays a plurality of substrate patterns 2007, and the like, and when one of these patterns is selected, the selected pattern is used as a pattern for filling the blank portion of the layout. Unless otherwise specified, a white blank portion is normally left. Since the number of patterns that can be displayed inside the frame 2002 is limited, other substrate patterns can be read out by selecting a display portion 2006. In this case, other substrate patterns may replace the already displayed ones, or many choices of substrate patterns may be developed on the setting window 2001 while the setting display portion 2006 is ON. As substrate patterns, various kinds of patterns, e.g., patterns that imitate articles such as a caulk board, concrete wall surface, grain of wood, cloths, and the like, images of natural objects such as the water surface, cloud, turf, leaf, and the like, famous landscape images, and the like are prepared in addition to monochrome plain patterns, geometrical patterns, and the like.

A setting frame 2003 is used for decorating a photograph as if it were put in a framework, and one of selection patterns 2008 and the like is selected and used as in the substrate patterns.

Setting frames 2004 and 2005 are those for selecting illustrations and photographs already stored as data in the system. These frames are used for replacing one frame in the layout by a photograph taken by a famous photographer or putting a small illustration indicating the theme of the layout on the corner of the entire layout window.

For the former purpose, upon layout of a series of photographs of a travel, a photograph of a famous landscape of the district or a photograph of a specialty may be added to the layout. If photographs taken by professional photographers can be used as a database, the final result of the layout may become an excellent one.

For the latter purpose, when an illustration of the image character of the amusement park (e.g., Mickey Mouse of the Disneyland) is added to the corner of a series of photographs taken in an amusement park, a well-composed, attractive layout can be obtained. Since the numbers of such illustrations and photographs are very large, it is difficult to directly display individual illustrations and photographs on the setting frames 2004 and 2005 as the objects to be selected. For this reason, items 2009, 2010, 2012, 2013, and the like in units of types are displayed, and when one of these items is selected, a large number of illustrations or photographs to be selected are developed on the entire window 2001.

Referring back to FIG. 23, a key 1909 will be explained below.

As described above, the number of layouts corresponding to the number of combinations of images of the respective sizes is not always one. As shown in, e.g., FIGS. 9A and 9B, FIGS. 12A and 12B, and FIG. 13A, even after all of the types of display sizes, the numbers of images of the respective sizes, and designation of the length/breadth positions have been specified, there are some different possible layouts with different tastes in association with their appearances. In order to automatically generate these layouts in turn and to select the most preferable pattern, the key 1909 is used. Every time the key 1909 is pressed, a layout based on a different layout reference appears. The number of different layouts is indicated by the overlapping states of the layout windows 1902, 1903, 1904, and the like. These layouts may be either of those which are prepared in advance, are calculated up to final image data, and are displayed in turn upon operation of the key 1909, or those which are selected or calculated based on new layout references every time the key 1909 is operated, and include re-calculated image data.

A key 1911 is a key display for displaying and selecting other function keys which are not displayed. When this key 1911 is selected, all the settable function keys are displayed, and the function keys to be always displayed and used can be freely combined by selecting desired ones from the displayed keys.

According to the above-mentioned embodiments, since the automatic layout function of photograph images and the like are developed to provide various intention input patterns and contents, a new way of enjoying photographs that can meet various requirements can be realized by a simple operation.

As described above, according to the above embodiments, a device comprises input means for inputting digital data of a plurality of different images scanned or sensed by an image sensor, layout means for selecting a specific layout for the plurality of different images from a plurality of layout examples with reference to a predetermined reference, output means for outputting layout information or image data of the plurality of layout images, intention input means for inputting an intention for additionally correcting the automatically generated layout, and correction means for correcting the layout on the basis of the input intention. The automatically generated layout is corrected on the basis of the input intention, and the image state is displayed, so that the layout information or the data of the plurality of layout image are output.

Accordingly, the individual image edit operations according to the contents of individual photograph images and the user's intention can be realized by a simple equipment operation of a non-skilled user as needed while being basically supported by the automatic edit function.

The automatic layout processing is executed based on a specific combination of a plurality of rules having different weights or attributes, the automatic layout processing is executed by assigning different weights or attributes to a plurality of different images, or the layout is corrected by adding or removing the rules, changing the weights or attributes of the rules, or changing the weights or attributes to be assigned to the images.

In this way, a layout that matches the human's sense well can be generated very efficiently.

The device also comprises first and second data conversion means. The first data conversion means reduces the resolution of digital image data of an input image based on a predetermined rule and supplies the image data to display means, and the second data conversion means compresses or expands digital data of an input image by transformation and quantization based on a predetermined orthogonal function system, and supplies the data to the display means.

As a consequence, a high-resolution photograph image having a large data amount can be processed as the object to be edited by a very simple arrangement.

Fourth Embodiment

Figure 25:
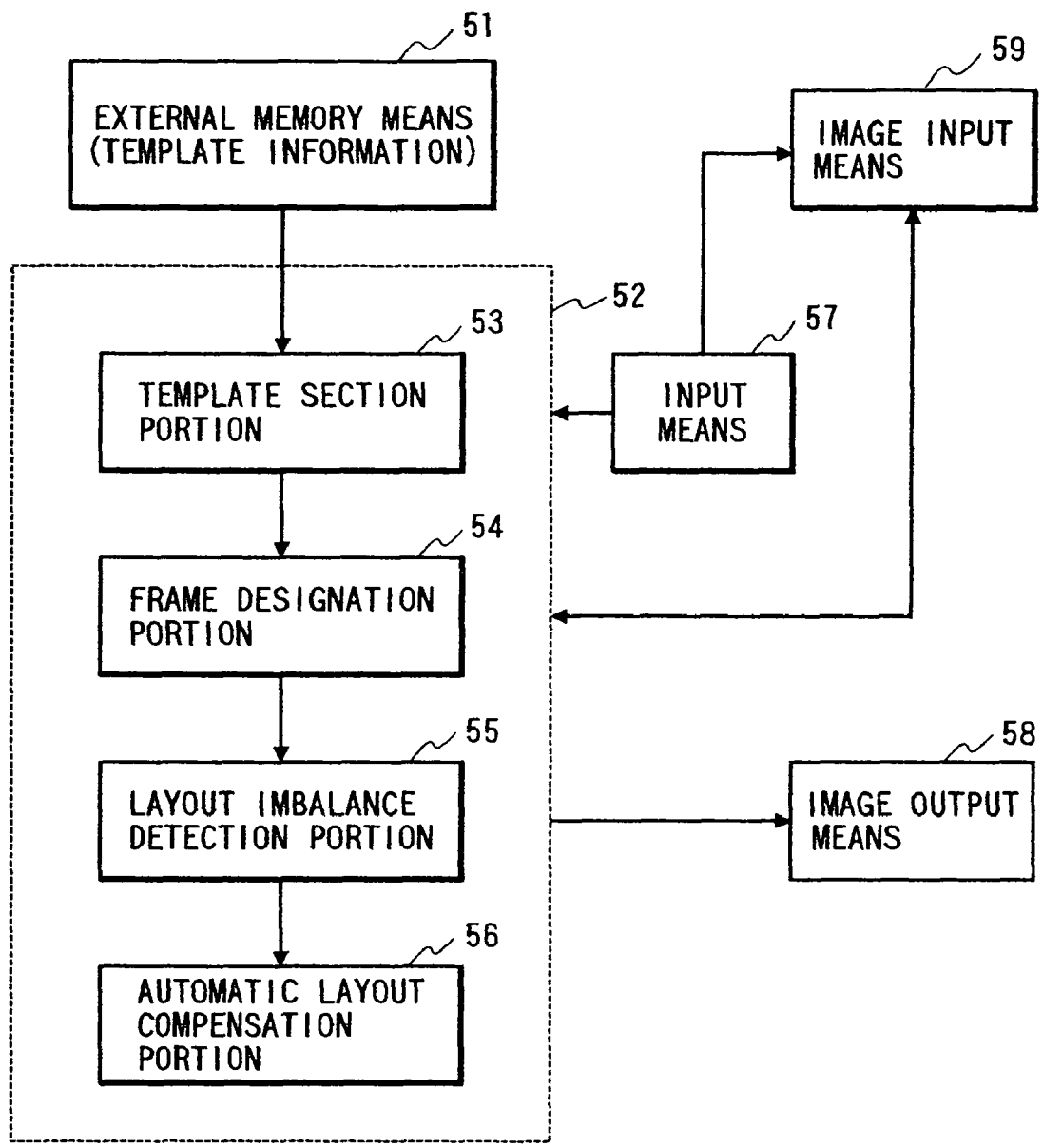
FIG. 25 is a schematic block diagram showing the arrangement of an automatic image edit device according to the fourth embodiment of the present invention.

FIG. 25 is a schematic block diagram showing the arrangement of an automatic image edit device according to the fourth embodiment of the present invention.

Figure 38:
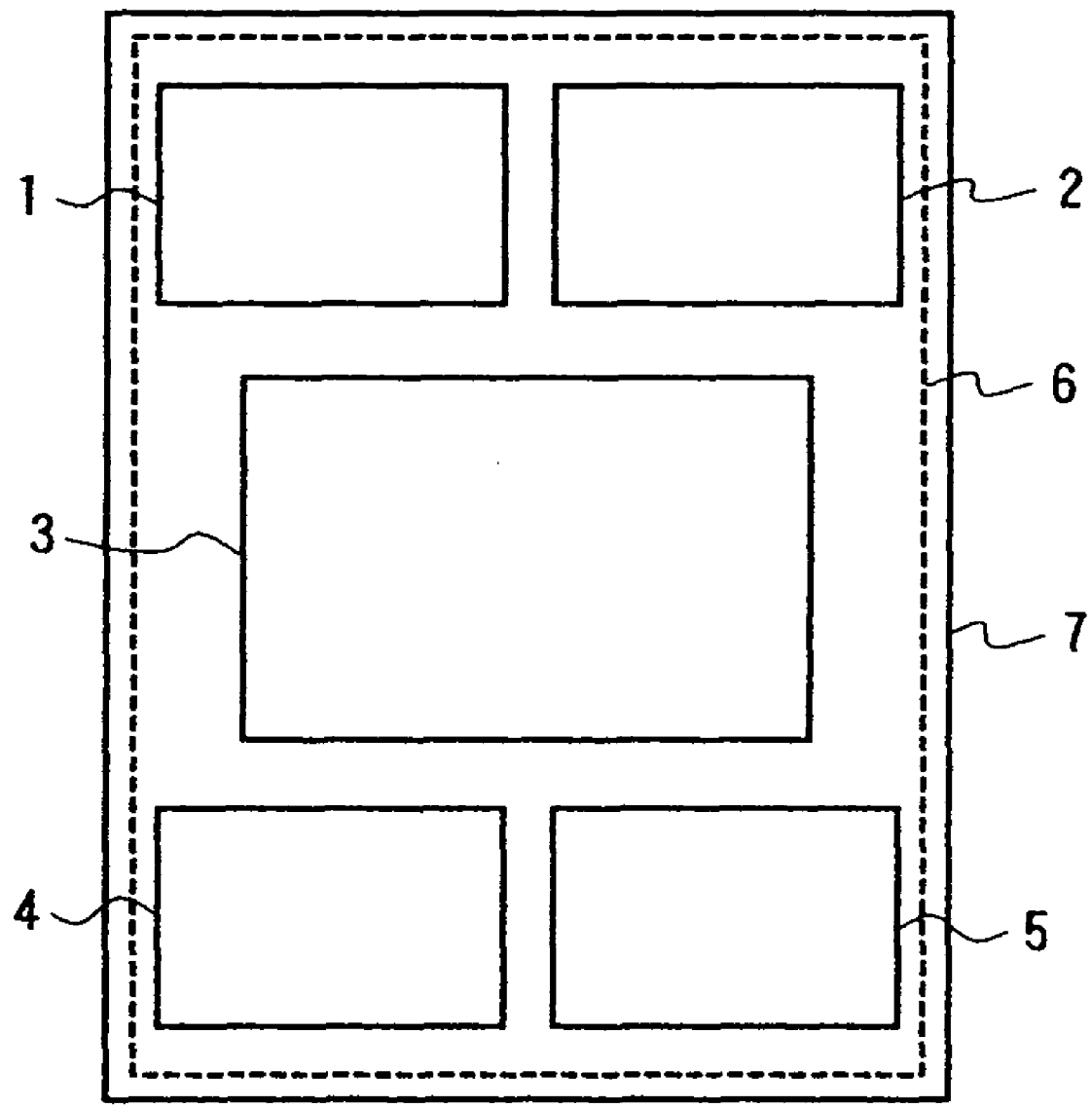
FIG. 38 is a view showing the state wherein a plurality of frames are laid out and printed on a single paper sheet.

Referring to FIG. 25, an external storage means 51 stores a plurality of pieces of template information for layouts, as shown in, e.g., FIG. 38. A computer 52 comprises a template selection portion 53 for selecting a designated template from a plurality of templates stored in the external storage means 51, a frame designation portion 54 for designating or assigning photographed frames to the frames of the selected template, a layout imbalance detection portion 55 for detecting imbalance of photographed frames assigned to the respective frames (e.g., whether or not the assigned photographed frames extend outside the upper, lower, right, or left edges of frames, and so on), an automatic layout compensation portion 56 for compensating the imbalance detected by the layout imbalance detection portion 55.

An input means 57 inputs template information selected by the user or frame information to be assigned to the frames. An image output means 58 serves as a printer for printing images in the layout according to the desired template onto a paper sheet. An image input means 59 comprises a film scanner which reads images of frames to be assigned to the frames of the template input by the input means 57, and inputs the read images to the frame designation portion 54.

The operation of the device with the above arrangement will be explained below.

Figure 26:
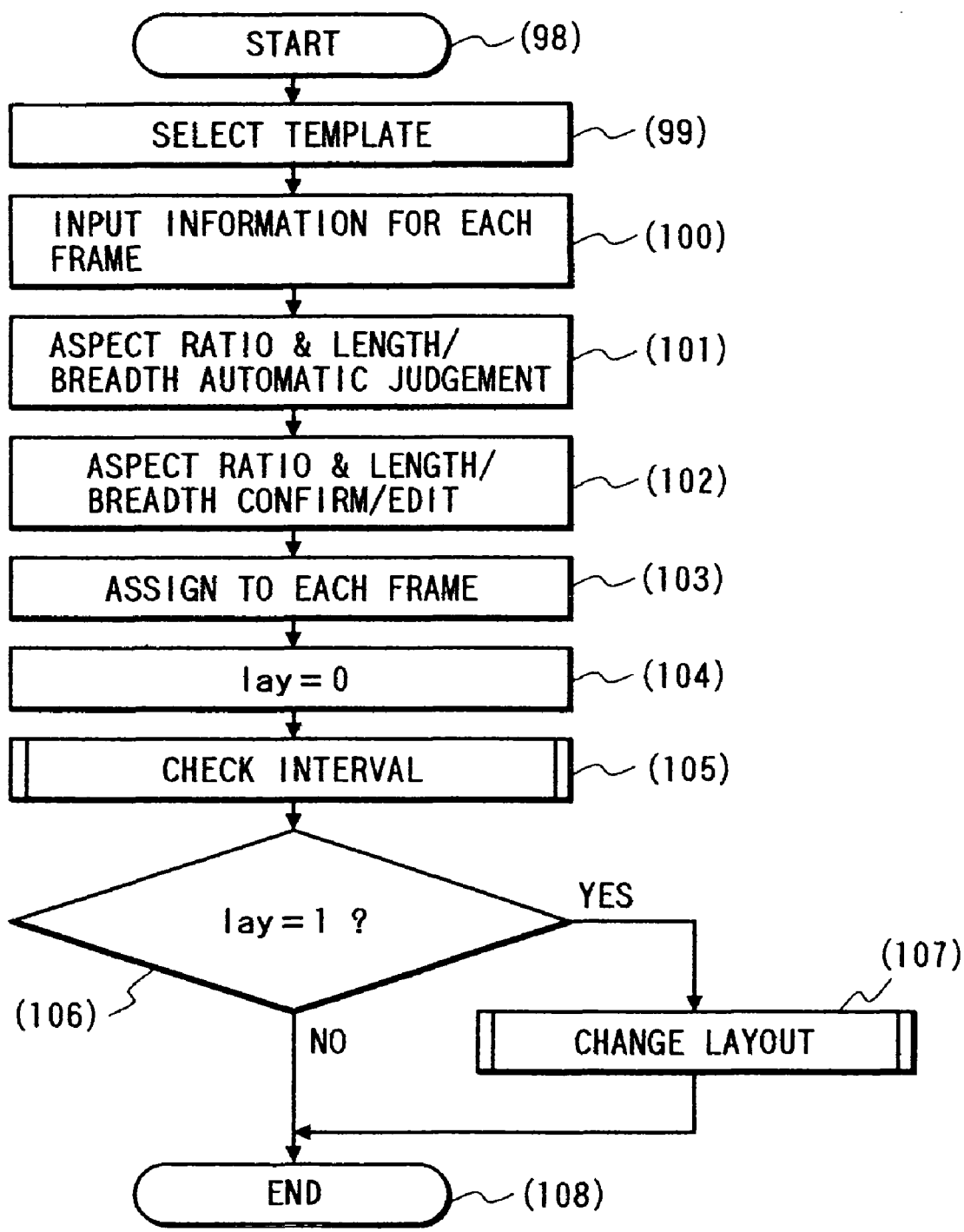
FIG. 26 is a flow chart showing the operation of principal part of the automatic image edit device according to the fourth embodiment of the present invention.

When information corresponding to a template selected by the user is input to the computer 52, the template selection portion 53, the frame designation portion 54, the layout imbalance detection portion 55, and the automatic layout compensation portion 56 in FIG. 25 execute the operations in step (99) and the subsequent steps via step (98) in FIG. 26.

In step (99), when template information is input, the corresponding template is selected from the external storage means 51. In step (100), photographed frames to be assigned to the frames of the selected template are input by the image input means 59. Note that the image input means 59 reads the photographed frames designated by the input means 57, and stores the read photograph information (image information) in its internal memory.

In step (101), the aspect ratio of the photograph to be assigned is automatically judged. For example, when a general 35-mm silver halide photographic film is the input source, the aspect ratio is judged based on the exposure state on the film surface.

Figure 27A:
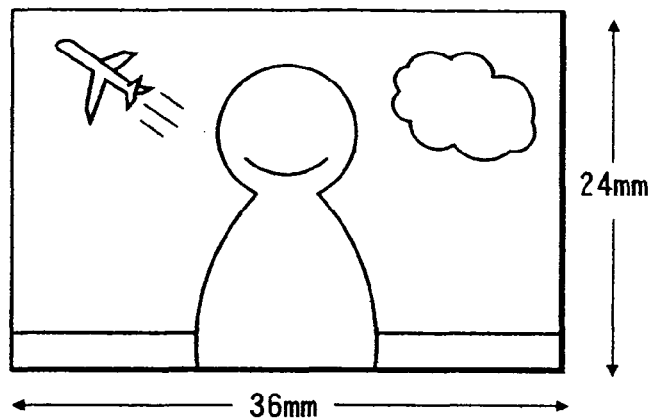
FIGS. 27A, 27B and 27C are views for explaining the automatic judgement of the aspect ratio in the fourth embodiment of the present invention.
Figure 27B:
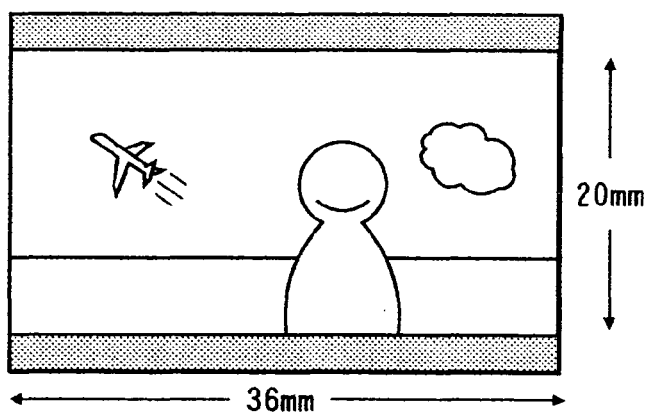
Figure 27C:
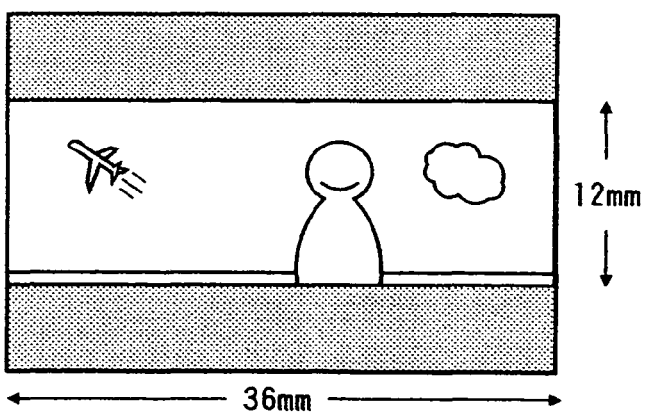

For example, when exposure is confirmed on the entire "36 mm×24 mm" exposure surface, as shown in FIG. 27A, the aspect ratio of "3:2" is determined. On the other hand, when exposure is not confirmed on an area other than "36 mm×20 mm", as shown in FIG. 27B, or when exposure is not confirmed on an area other than "36 mm×12 mm", as shown in FIG. 27C, the hi-vision size or panorama size is determined, respectively.

Of course, when the input source is digital image data or the aspect ratio information is magnetically recorded on the film, the aspect ratio may be determined based on such information, or may be input by the operator via the input means 57.

Subsequently, whether a photograph was taken at the breadth or length position is judged based on the state of the photographing scene. In this case, some judgement algorithms are available.

Figure 28A:
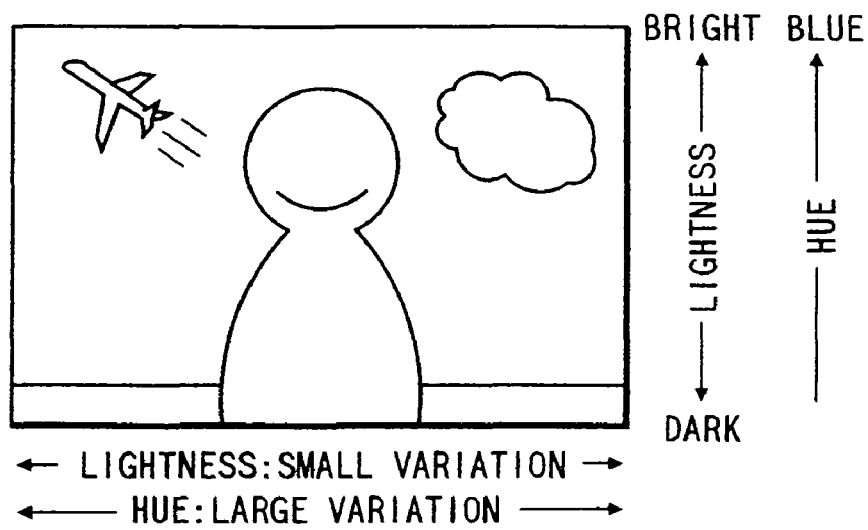
FIGS. 28A and 28B are views for explaining the automatic judgement of the length or breadth position in the fourth embodiment of the present invention.
Figure 28B:
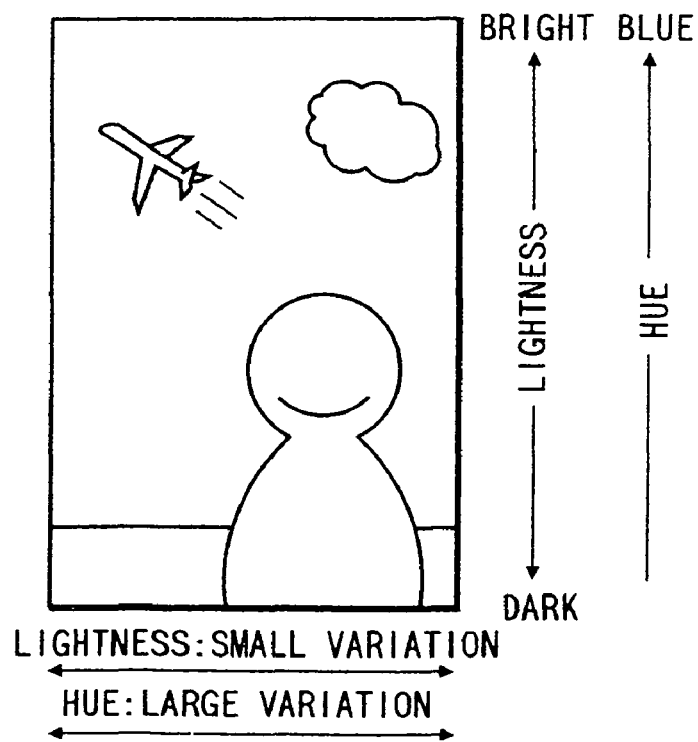

For example, as shown in FIGS. 28A and 28B by utilizing the nature that the length and breadth positions tend to have different hue or lightness distributions, when one side of an image is bright or has many nearly blue hue components, the direction is determined to be the upper direction, thereby judging the length or breadth position. Also, in another method, an object may be recognized by an image recognition technique that is extensively studied nowadays, and the length or breadth position may be judged based on the recognition result.

However, since the details of judgement of the photographing position departs from the gist of the present invention, a detailed description thereof will be omitted.

When information associated with the length/breadth photographing position is obtained by, e.g., photographing position information recorded on a magnetic sensitive member applied on the film surface, or the like, the above-mentioned automatic judgment is not required.

Since judgement errors may have occurred upon automatic judgement of the aspect ratio and the like in step (101), the automatically judged aspect ratio and the length/breadth position are displayed on a monitor (not shown) in step (102) so as to prompt the user to confirm them. If the automatic judgement results have caused errors, they are edited according to information input by the operator.

In step (103), photographs are assigned to the frames on the basis of the determined aspect ratio information and length/breadth photographing position information.

Figure 29A:
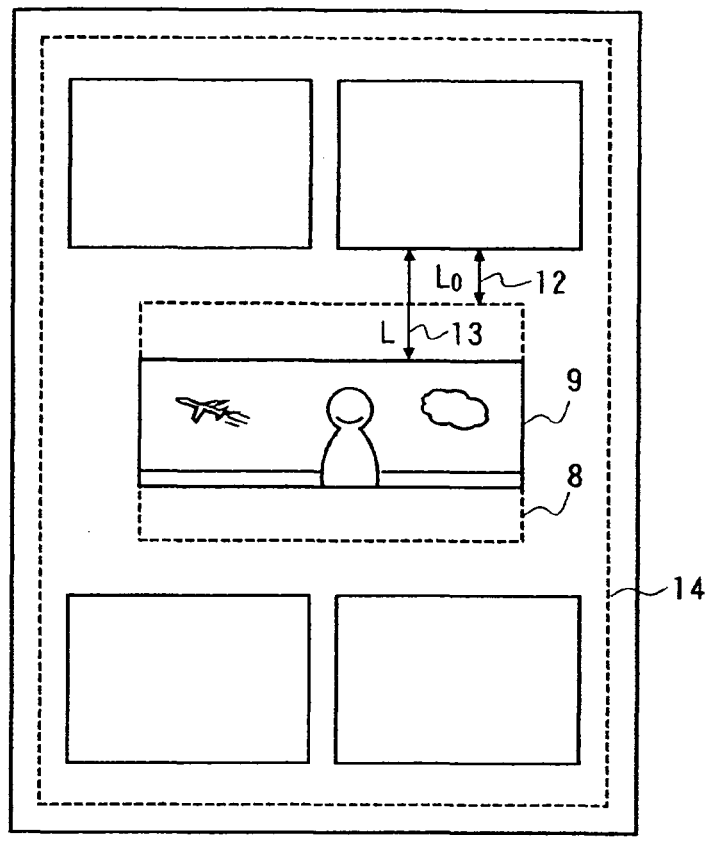
FIGS. 29A and 29B are views for explaining an example of the frame assignment and layout change judgement in the fourth embodiment of the present invention.

For example, when a photograph 9 having, e.g., the panorama size, from which upper and lower portions are cut, are to be assigned to a setting frame 9 indicated by a dotted line in FIG. 29A, blank portions are generated above and below the photograph, thus making the entire layout unbalanced.

In this case, prints having the panorama size and normal size are assigned to have the same magnification. However, a print having the panorama size is normally magnified at a magnification larger than the normal print to obtain a wide print. Hence, in the layout print as well, the following method is effective and generally used. That is, the magnification (e.g., 2×) for the panorama print is set in advance, and when a photographed frame having the panorama size is assigned to a normal frame, the photographed frame is magnified at the magnification corresponding to the panorama print, and the magnified frame is assigned.

Even when such assignment is performed, the same method of detecting layout imbalance and compensating the detected imbalance according to the present invention applies, and a description of the case wherein the magnification is set in correspondence with the aspect ratio will be omitted.

Figure 29B:
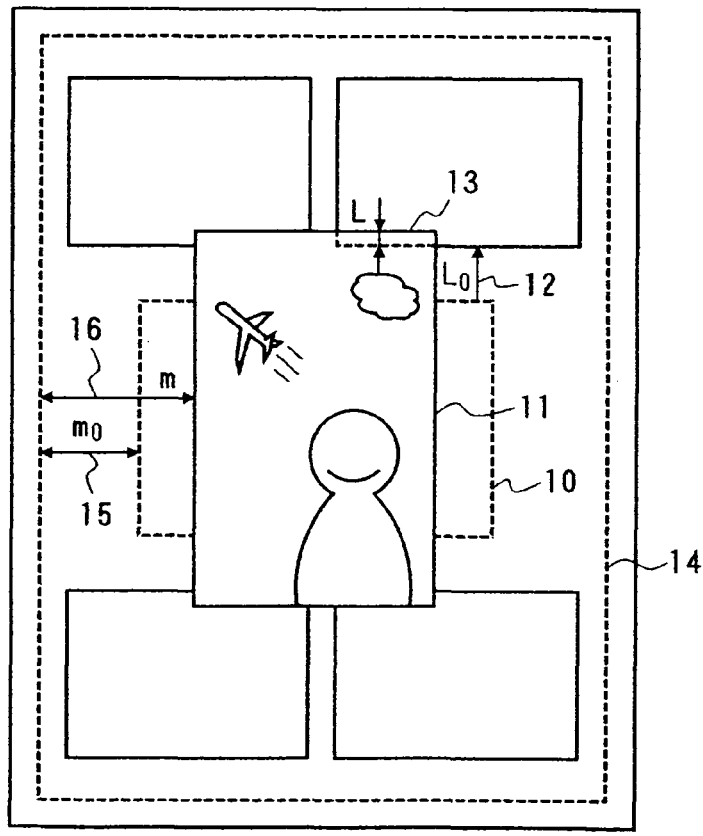

On the other hand, when a photograph 11 taken at the length position is assigned to a setting frame 10 indicated by a dotted line in FIG. 29B, the upper and lower edges of the photograph 11 extend outside the frame, and overlap other frames.

Also, a photograph may extend outside a printable area 14 depending on its length/breadth position.

Thus, the necessity of changes in layout is judged in step (104) and the subsequent steps.

In step (104), a layout change flag lay is reset to "0". In step (105), the upper, lower, right, and left intervals of the assigned frame are checked.

Figure 30:
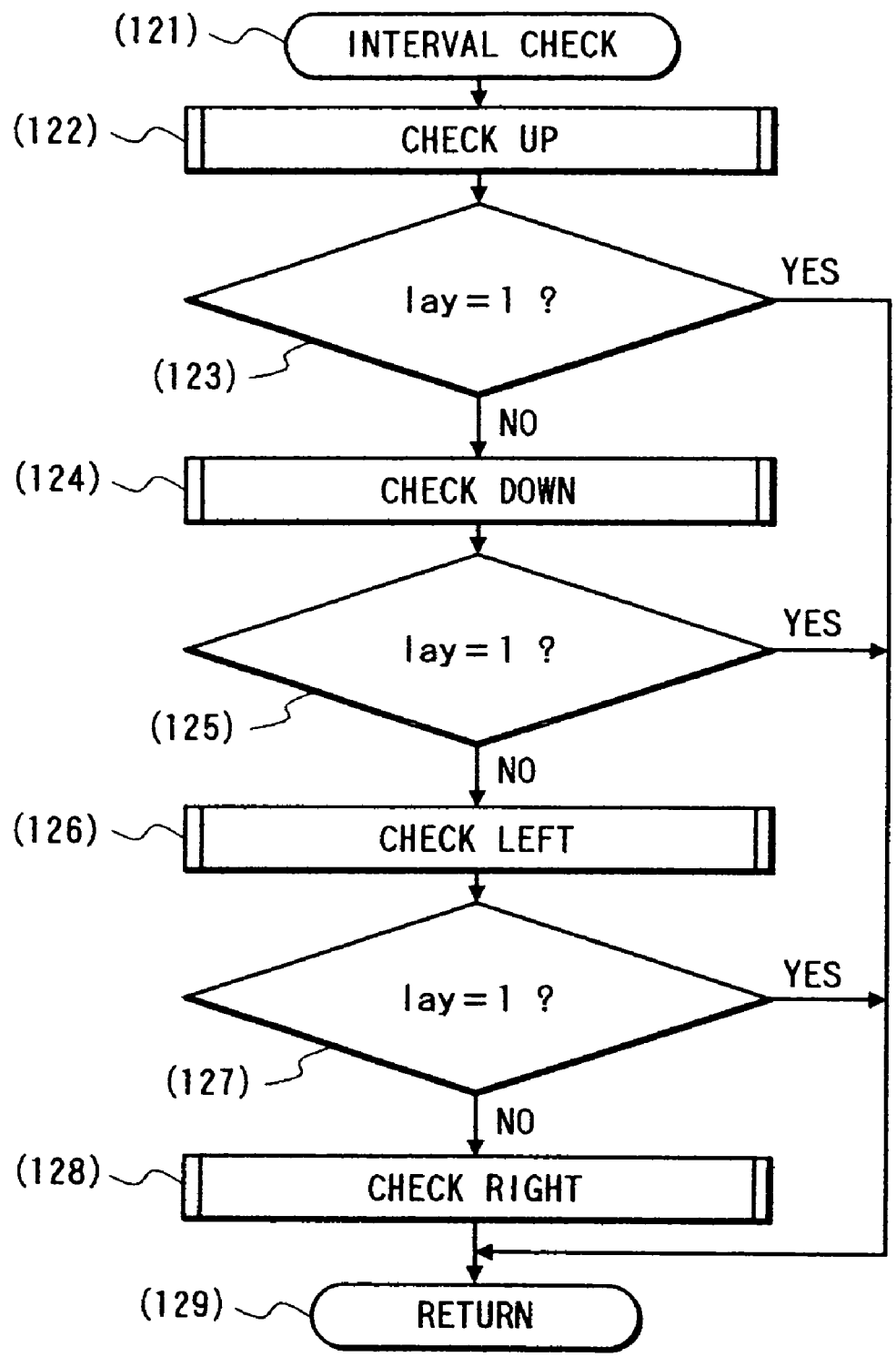
FIG. 30 is a flow chart showing in detail the operation in step (105) in FIG. 26.

FIG. 30 shows this "check interval" subroutine. When this subroutine is called, the operation starts from step (122) via step (121).

In step (122), the upper interval is checked. The operation in this step will be described in detail below using FIG. 29A with reference to the "check up" subroutine shown in FIG. 31. Note that an arrow 12 in FIG. 29A indicates an interval $L_0$ from the nearest neighboring frame in the upper direction set in the template, and an arrow 13 indicates an interval L when a frame is actually assigned.

In step (131), it is checked if "$L>L_0$", i.e., if the upper edge of the assigned frame extends outside the frame of the template. If "$L>L_0$" (if the upper edge does not extend), the flow advances to step (132), and the ratio "$L/L_0$" is compared with a predetermined value $k_1$ (for $k_1>1$). As a result, if "$L/L_0>k_1$", it is determined that the upper edge does not extend outside the frame but the interval to the nearest neighboring frame is too large, and the flow advances to step (133). In step (133), the layout change flag lay is set to be "1", and the flow returns to the subroutine in FIG. 30 via step (137).

On the other hand, if it is determined in step (132) that "$L/L_0 \leq k_1$", since the layout need not be changed, the flow immediately returns to the subroutine in FIG. 30 via step (137).

Also, if it is determined in step (131) that "$L>L_0$" does not hold, i.e., the upper edge of the assigned frame matches or extends outside the frame of the template, the flow advances to step (134) to, in turn, check if "$L=L_0$". if "$L=L_0$", it is determined that the upper edge matches the frame of the template (does not extend therefrom), and the layout need not be changed. Then, the flow immediately returns to the subroutine in FIG. 30 via step (137).

If it is determined in step (134) that "$L=L_0$" does not hold, the flow advances to step (135), and the ratio "$L/L_0$" is compared with a predetermined value $k_2$ (for $k_2<1$). As a result, if "$L/L_0<k_2$", it is determined that the upper edge extends outside the frame by a large amount (the extension amount does not fall within the allowable range) and the interval to the nearest neighboring frame is too small, and the flow advances to step (133). In step (133), the layout change flag lay is set to be "1", and the flow returns to the subroutine in FIG. 30 via step (137).

On the other hand, if it is determined in step (135) that "$L/L_0>k_2$", it is determined that the upper edge extends outside the frame but the layout need not be changed, and the flow immediately returns to the subroutine in FIG. 30 via step (137).

Figure 31:
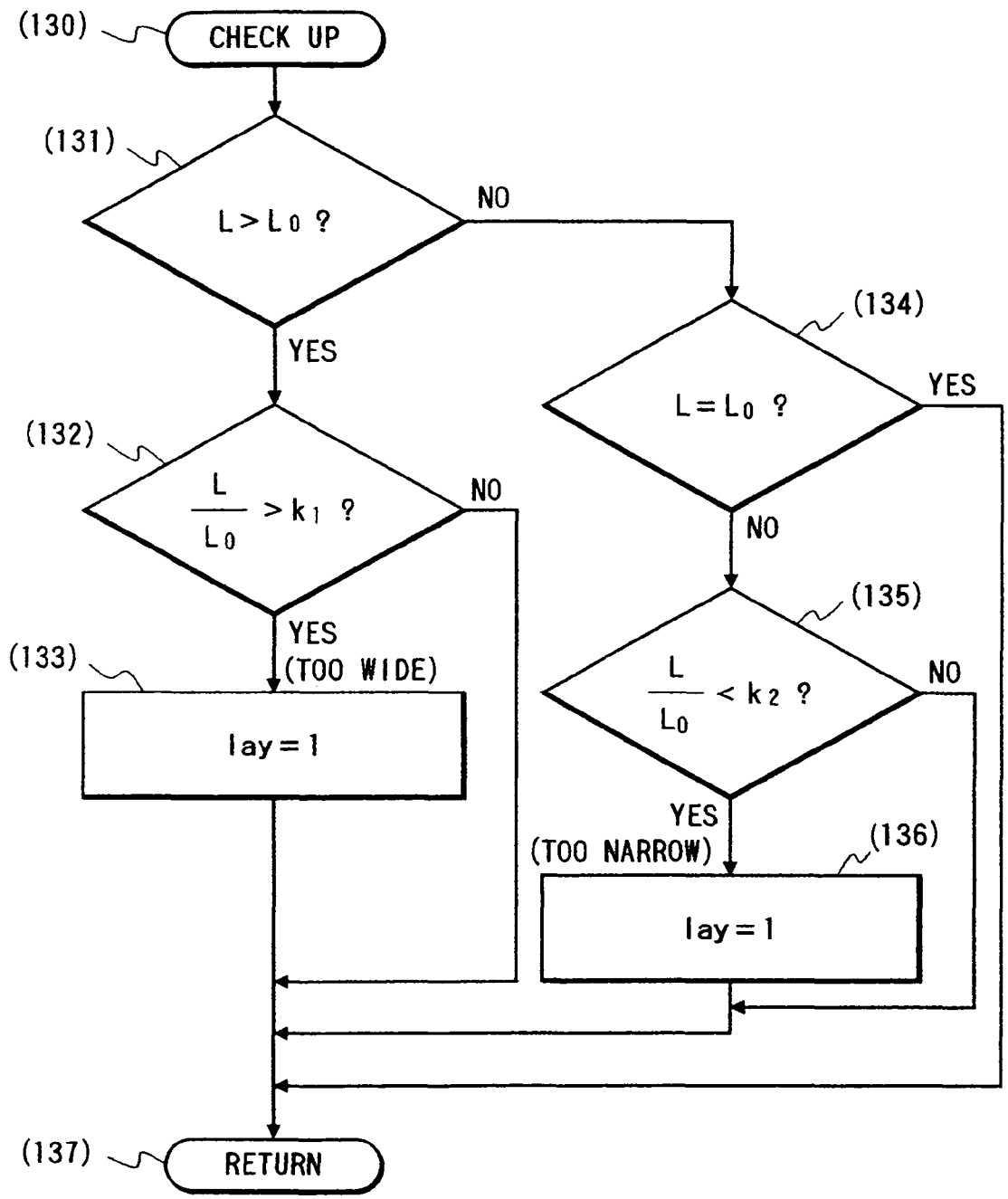
FIG. 31 is a flow chart showing in detail the operation in step (122) in FIG. 30.

Upon completion of the operation in FIG. 31, the flow advances to step (123) in FIG. 30 to check if the layout change flag lay is "1". If the layout change flag lay is "1", the flow returns to the main routine via step (129).

On the other hand, if it is determined in step (123) that the layout change flag lay is "0", the flow advances to step (124) to execute a "check down" subroutine. That is, the interval between the lower edge of the photographed frame with respect to a predetermined frame is checked. Since the operation in this subroutine is the same as the "check up" subroutine described above with reference to FIG. 31, a detailed description thereof will be omitted.

If it is determined in step (125) that the layout change flag lay is set to be "1" in the "check down" subroutine, the flow returns to the main routine via step (129), as in the above description.

However, if it is determined in step (125) that the layout change flag lay is "0", the flow advances to step (126) to check, in turn, the interval between the left edge of the photographed frame with respect to a predetermined frame.

Figure 32:
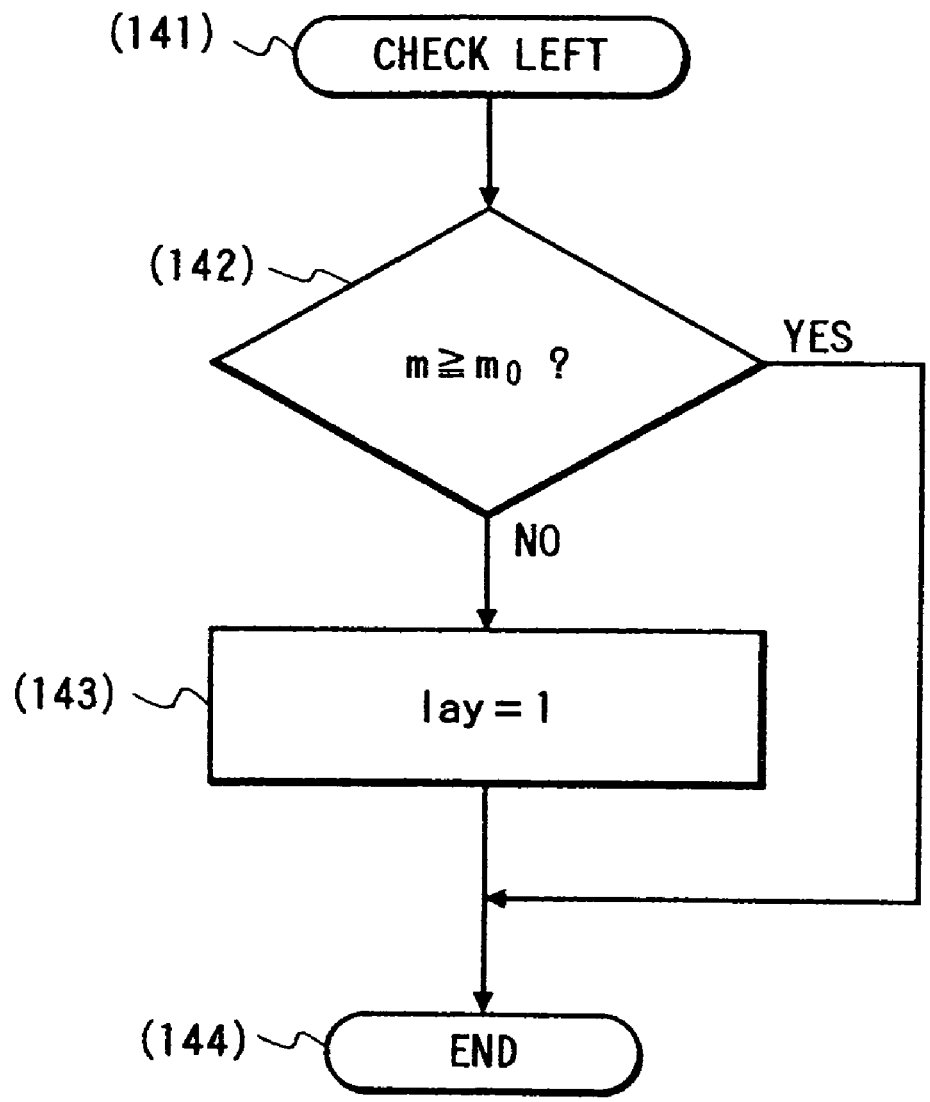
FIG. 32 is a flow chart showing in detail the operation in step (126) in FIG. 30.

The "check left" operation will be described below using FIG. 29B with reference to the flow chart in FIG. 32. Note that an arrow 15 in FIG. 29B indicates an interval $m_0$ (a predetermined value equal to or larger than 0) between the left edge and the edge of the printable area 14 set in the template, and an arrow 16 indicates an interval m to the printable area 14 when a frame is actually assigned.

In step (142), it is checked if "$m \geq m_0$", i.e., if the left edge of the assigned frame extends outside the printable area 14. If "$m \geq m_0$", since the left edge does not extend outside the printable area 14, the flow returns to the subroutine in FIG. 30 via step (144).

On the other hand, if "$m<m_0$", since the left edge extends outside the printable area 14, the flow advances to step (143) to set the layout change flag lay to be "1". Then, the flow returns to the subroutine in FIG. 30 via step (step 144).

In this case, if a neighboring frame is present, checking is performed in the same manner as in the "check up" subroutine described above with reference to FIG. 31.

If it is determined in step (127) that the layout change flag lay is set to be "1" in the "check left" subroutine, the flow returns to the main routine step (129), as in the above description.

On the other hand, if it is determined in step (127) that the layout change flag lay is "0", the flow advances to step (128) to check, in turn, the interval between the right edge of the photographed frame and the edge of the printable area 14. Since this operation is performed in the same manner as in the "check left" subroutine described above with reference to FIG. 32, a detailed description thereof will be omitted.

In this case, if a neighboring frame is present, checking is performed in the same manner as in the "check up" subroutine described above with reference to FIG. 31.

With the above-mentioned processing, the "check interval" subroutine ends. The operation in this subroutine will be briefly described below. When a neighboring frame is present in the upper, lower, right, or left area of the assigned frame, the interval to the nearest neighboring frame in the direction of interest and the ratio between the interval and a default interval set in the template are calculated, and the ratio is compared with a setting value to check if the layout is to be changed. On the other hand, if no neighboring frame is present, the interval between the frame of interest and the edge of the printable area is compared with a default interval to check if the layout is to be changed.

When the upper and lower intervals may be slightly decreased but relatively large right and left intervals are to be assured, the predetermined values $k_1$, $k_2$, and $m_0$ are set to have optimal values in the upper, lower, right, and left directions, thus easily meeting the above requirement.

Referring back to FIG. 26, it is checked in step (106) if the layout change flag is set to be "1". If YES in step (106), the flow advances to step (109) to perform the "layout change" operation.

The "layout change" algorithm will be described below with reference to the flow chart in FIG. 33.

Upon automatically changing the layout, various methods may be used. In this embodiment, the layout is changed by changing the magnification.

In step (201), it is checked if the change mode is a one-frame adjusting mode or all-frame adjusting mode. If the change mode is the one-frame adjusting mode, the flow advances to step (202); otherwise, the flow advances to step (203).

Figure 34A:
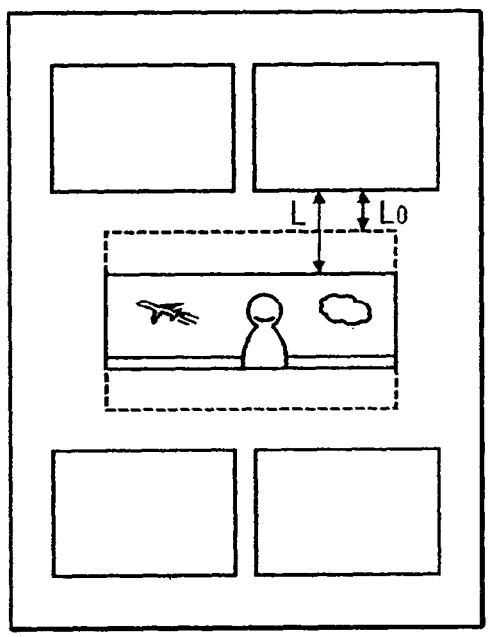
FIGS. 34A, 34B, 34C and 34D are views for helping understanding the layout change operation in FIG. 33.
Figure 34B:
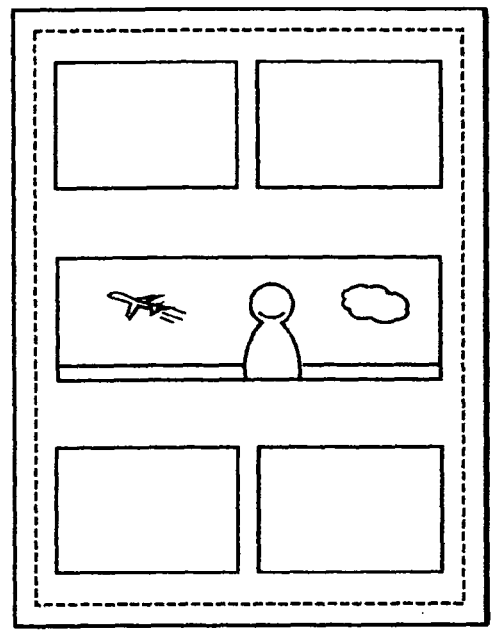

In the one-frame adjusting mode in step (202), the size of only the assigned frame is adjusted to change the layout. For example, in the case of "$L/L_0 > k_1$", as shown in FIG. 34A, the frame size of the assigned frame is magnified. The size is magnified until the interval to the neighboring frame has reached $k_1 L_0$ (or the layout default interval) or has reached a predetermined value with respect to the edge of the printable area 14, as shown in FIG. 34B.

Figure 34C:
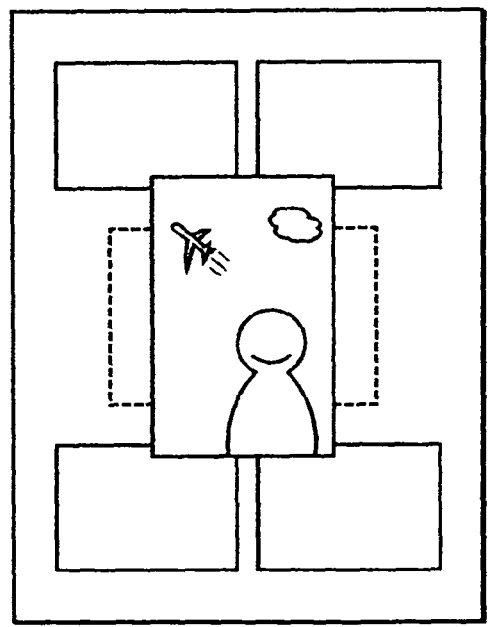
Figure 34D:
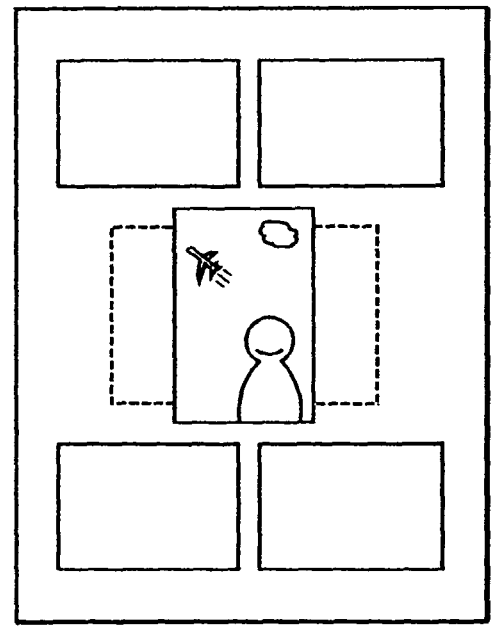

On the other hand, in the case of "$L/L_0 < k_2$", as shown in FIG. 34C, the frame size of the assigned frame is reduced. The size is reduced until the interval to the neighboring frame becomes equal to or lager than $k_2 L_0$ (or the layout default interval) or until a printable area is assured without overlapping the neighboring frame, as shown in FIG. 34D.

In the all-frame adjusting mode in step (203), the layout is changed by changing the sizes of all the frames. For example, in the case of "$L/L_0 > k_1$", as shown in FIG. 34A, all the frame sizes are magnified. Each size is magnified until the interval to the neighboring frame has reached $k_1 L_0$ (or the layout default interval) or has reached a predetermined value with respect to the edge of the printable area 14, as shown in FIG. 34B.

On the other hand, in the case of "$L/L_0 < k_2$", as shown in FIG. 34C, the frame size of the assigned frame is reduced. The size is reduced until the interval to the neighboring frame becomes equal to or smaller than $k_2 L_0$ (or the layout default interval) or until a printable area is assured without overlapping the neighboring frame.

In step (204), whether or not the automatically changed layout is satisfactory is inquired of the operator via the monitor or the like. When a signal "OK" is input via the input means 57, the "layout change" operation ends in step (206), and thereafter, the result is printed out by the image output means 58 in FIG. 25.

When the automatically changed layout includes an undesired portion, the flow advances to step (205), and the operator manually edits the layout. In step (206), the "layout change" operation ends, and thereafter, the result is printed out by the image output means 58 in FIG. 25.

Even when the operator must manually edit the layout, the required operation can be minimized after the automatic compensation, and the operation amount of the operator is reduced.

According to the fourth embodiment above, any layout imbalance is detected by comparing the ratio of inter-frame intervals in each of the upper, lower, right, and left directions of the frame, whose aspect ratio or the like is changed, with a predetermined value or by comparing the interval with that up to the edge of the printable area, and the layout is compensated by automatically changing the frame size. In this way, a print of the layout with good balance and appearance can be obtained without requiring any operations of the operator.

Fifth Embodiment

The "layout change" operation of an automatic image edit device according to the fifth embodiment of the present invention will be described below with reference to the flow chart in FIG. 35. Note that the circuit arrangement of the device and the "layout change" operation are the same as those in the fourth embodiment, and a detailed description thereof will be omitted.

Upon automatically changing the layout, various methods may be used. In the fifth embodiment, the layout is changed by position assignment.

Figure 35:
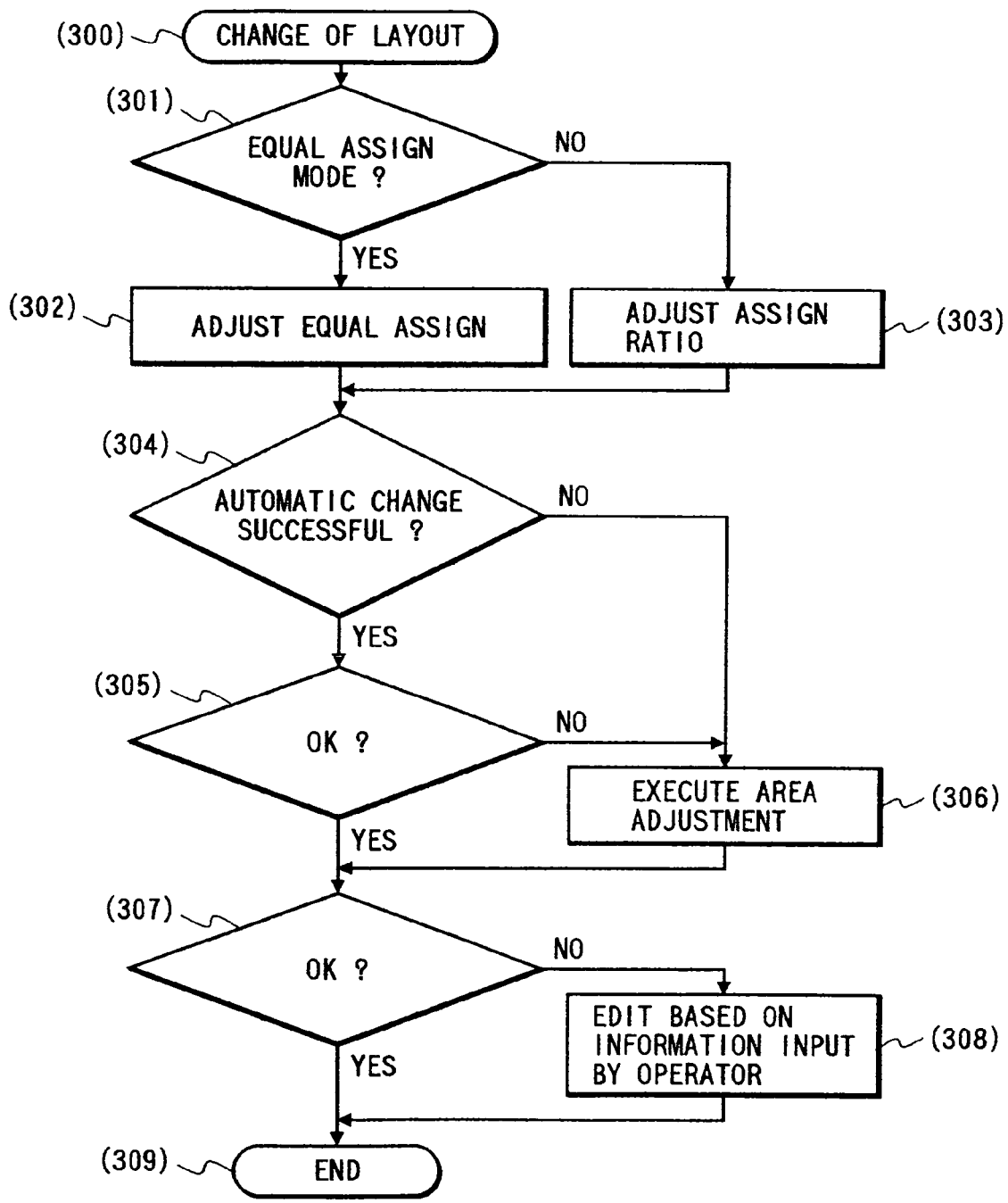
FIG. 35 is a flow chart showing the layout change operation of an automatic image edit device according to the fifth embodiment of the present invention.

Referring to FIG. 35, it is checked in step (301) if the assign mode is an equal assign mode or a ratio assign mode. If the assign mode is the equal assign mode, the flow advances to step (302); otherwise, the flow advances to step (303).

Figure 36A:
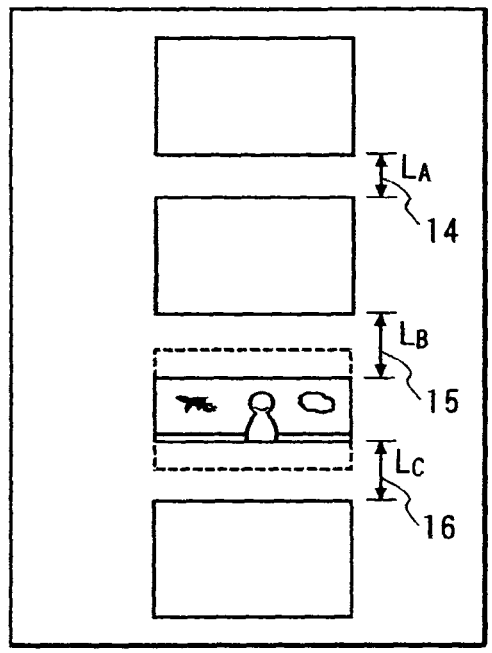
FIGS. 36A, 36B, 36C and 36D are views for helping understanding the layout change operation in FIG. 35.
Figure 36B:
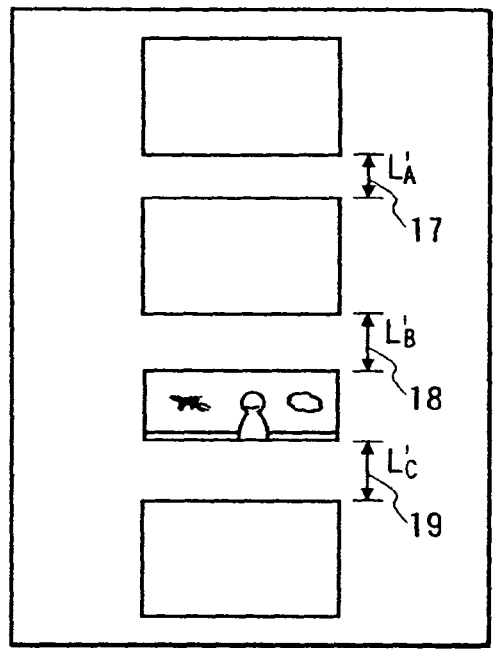

In the equal assign mode in step (302), the layout is adjusted by equally assigning the intervals between adjacent ones of all the frames. For example, in inter-frame intervals 14, 15, and 16 (respectively defined as $L_A$, $L_B$, and $L_C$), when unwanted blank portions are formed in the portions $L_B$ and $L_C$, as shown in FIG. 36A, the frame intervals of the frames are equally assigned to balance the layout, so that inter-frame intervals 17, 18, and 19 (respectively defined as $L_A'$, $L_B'$, and $L_C'$) satisfy $L_A' = L_B' = L_C'$ as shown in FIG. 36B.

Figure 36C:
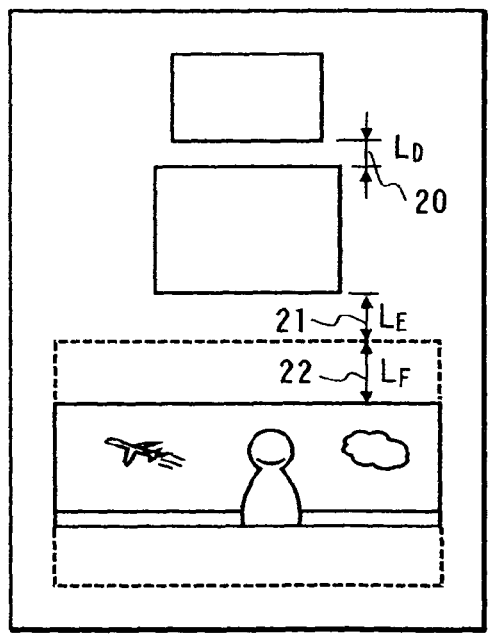
Figure 36D:
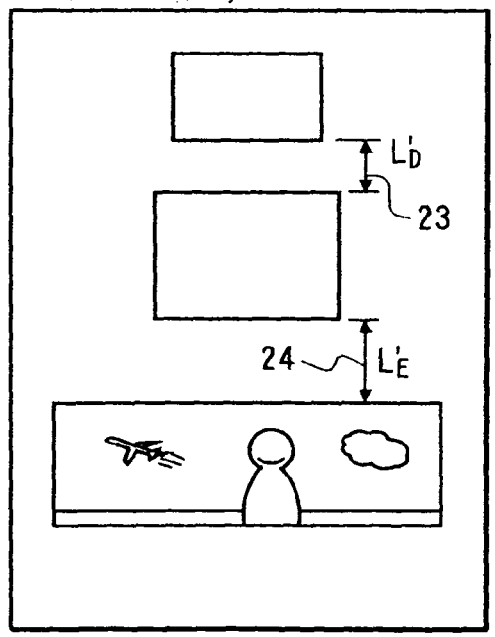

In the ratio assign mode in step (303), the layout is adjusted by assigning the frame positions while preserving the ratios of the inter-frame intervals set in the template. For example, in inter-frame intervals 20, 21, and 22 (respectively defined as $L_D$, $L_E$, and $L_F$), when an unwanted blank portion is formed in the portion $L_F$, as shown in FIG. 36C, the frame intervals of the frames are adjusted to balance the layout, so that inter-frame intervals 23 and 24 (respectively defined as $L_D'$ and $L_E'$) satisfy "$L_D' : L_E' = L_D : L_E$", as shown in FIG. 36D.

In steps (304) and (305), whether or not the automatically changed layout is satisfactory is automatically checked and inquired of the operator.

For example, when frames overlap each other, as shown in FIG. 34C above, the layout can no longer be adjusted unless a blank space remains.

When the system detects in this manner that the layout cannot be adjusted by automatic position assignment, the flow advances to the area adjustment mode in step (306).

Even when the layout adjustment is completed, as shown in FIG. 36D, if the operator determines that the interval is too large and the balance is poor, he or she inputs an edit instruction in response to the confirmation message in step (305). Hence, the area adjustment mode is executed in accordance with the input information in step (306).

Figure 33:
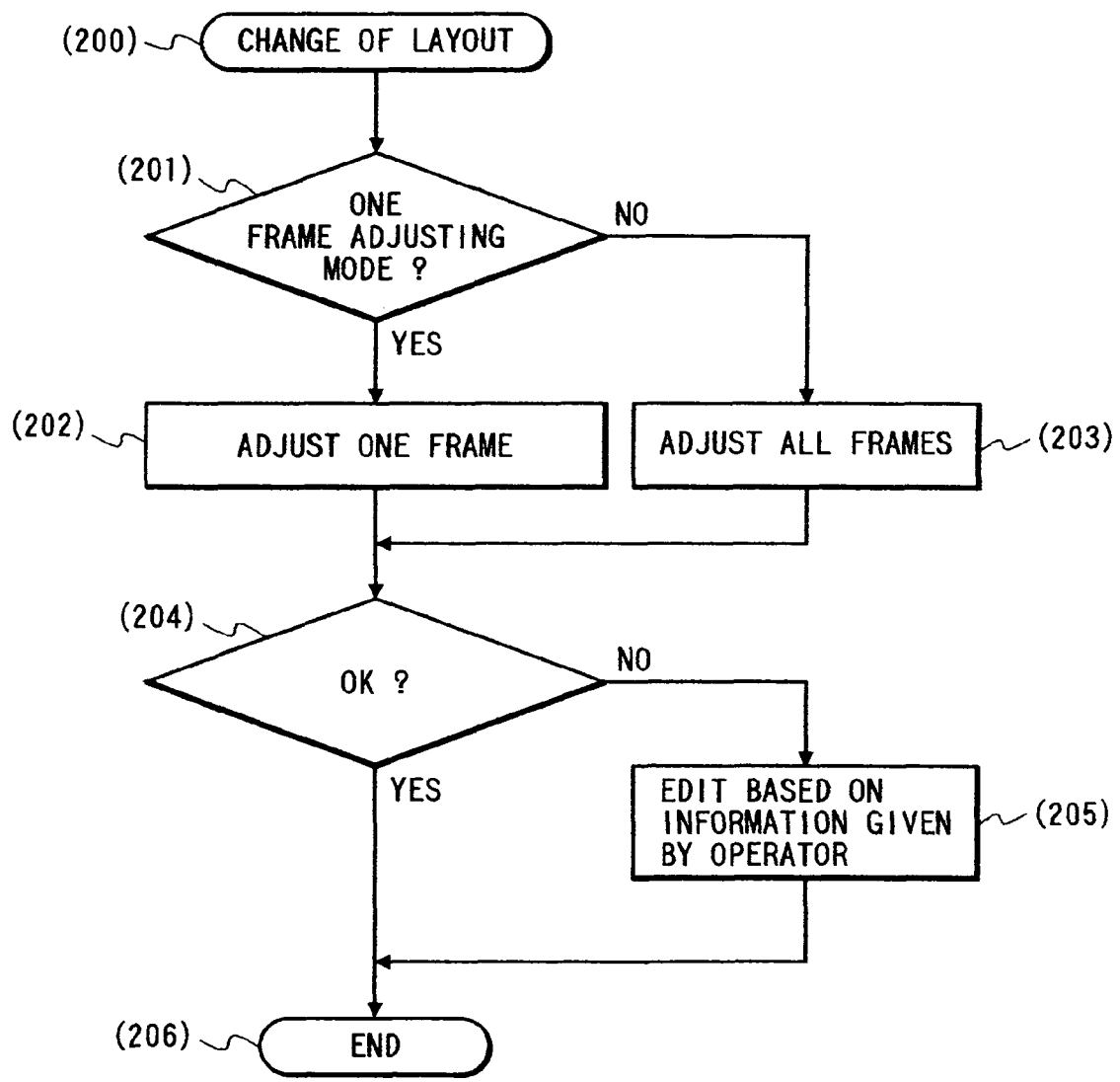
FIG. 33 is a flow chart showing in detail the operation in step (107) in FIG. 26.

The contents of adjustment executed in the area adjustment mode in step (306) are the same as those described in the fourth embodiment with reference to FIG. 33, and a detailed description thereof will be omitted.

In step (307), whether or not the automatically changed layout is satisfactory as a result of the automatic adjustment in the area adjustment mode is inquired of the operator. When a signal "OK" is input via the input means 57, the "layout change" operation ends in step (309), and thereafter, the result is printed out by the image output means 58.

When the automatically changed layout includes an undesired portion, the flow advances to step (308), and the operator manually edits the layout. In step (309), the "layout change" operation ends, and thereafter, the result is printed out by the image output means 58 in FIG. 25.

Even when the operator must manually edit the layout, the required operation can be minimized after the automatic compensation, and the operation amount of the operator is reduced.

According to the fifth embodiment above, any layout imbalance is detected by comparing the ratio of inter-frame intervals in each of the upper, lower, right, and left directions of the frame, whose aspect ratio or the like is changed, with a predetermined value, and the layout is compensated by automatically changing the frame intervals and changing the frame size if required. In this way, a print of the layout with good balance and appearance can be obtained without requiring any operations of the operator.

Sixth Embodiment

The "layout change" operation of an automatic image edit device according to the sixth embodiment of the present invention will be described below with reference to the flow chart in FIG. 37. Note that the circuit arrangement of the device and the "layout change" operation are the same as those in the fourth embodiment, and a detailed description thereof will be omitted.

Upon automatically changing the layout, various methods may be used. In the sixth embodiment, the ratio of the size change to the position change of a frame is set in advance to be "$r_{size}$:$r_{pos}$ (for $0<r_{size}<1$, $0<r_{pos}<1$, $r_{size}+r_{pos}=1$)", and the layout is re-set on the basis of this ratio.

Figure 37:
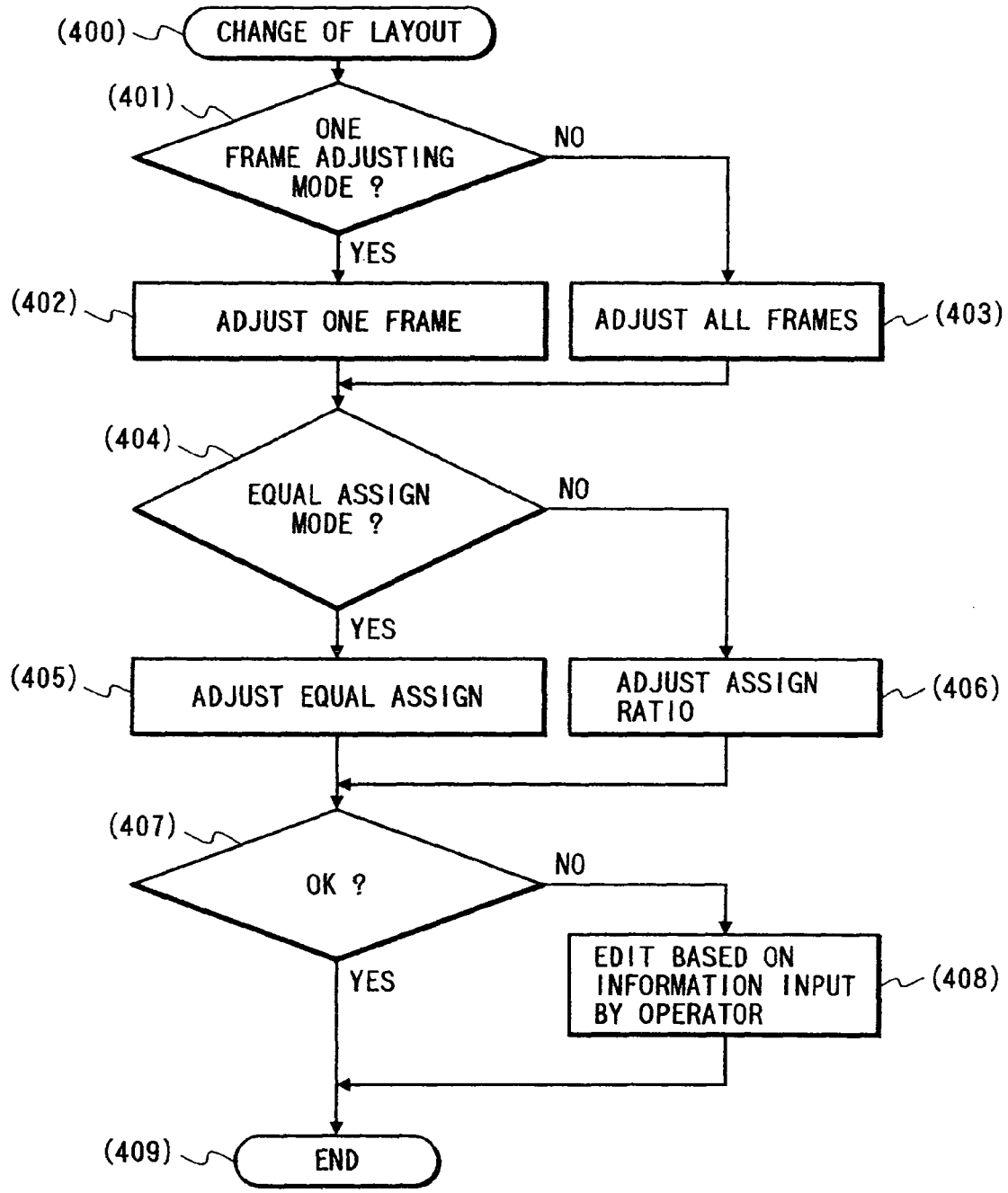
FIG. 37 is a flow chart showing the layout change operation of an automatic image edit device according to the sixth embodiment of the present invention.

Referring to FIG. 37, it is checked in step (401) if the change mode is a one-frame adjusting mode or all-frame adjusting mode. If the change mode is the one-frame adjusting mode, the flow advances to step (402); otherwise, the flow advances to step (403).

In the one-frame adjusting mode in step (402), the layout is changed by adjusting the size of the assigned frame.

In the fourth embodiment above, for example, in the case of "$L/L_0>k_1$", as shown in FIG. 34A, the size of the assigned frame is magnified until the interval to the neighboring frame has reached $k_1L_0$ (or the layout default interval). However, in the sixth embodiment, the size of the assigned frame is magnified based on the pre-set ratio until the interval to the neighboring frame has reached $k_1L_0r_{size}$ (or the layout default interval×$r_{size}$).

On the other hand, in the case of "$L/L_0<k_2$", as shown in FIG. 34C, the size of the assigned frame is reduced until the interval to the neighboring frame becomes equal to or smaller than $k_2L_0$ (or the layout default interval) or until the size falls within the printable area, as shown in FIG. 34D, as in the fourth embodiment.

In the all-frame adjusting mode in step (403), the layout is changed by changing the sizes of all the frames. For example, as in the case of "$L/L_0>k_1$" shown in FIG. 36A, all the frame sizes are magnified. In this case, each size is magnified until the interval to the neighboring frame has reached $k_1L_0r_{size}$ (or the layout default interval×$r_{size}$).

On the other hand, in the case of "$L/L_0<k_2$", as shown in FIG. 36C, the size of the assigned frame is reduced, as in the fourth embodiment.

In step (404), it is checked if the assign mode is an equal assign mode or a ratio assign mode. If the assign mode is the equal assign mode, the flow advances to step (405); otherwise, the flow advances to step (406).

In the equal assign mode in step (405), the layout is adjusted by assigning equal intervals to all the frames. In this case, the layout is balanced so that the intervals between adjacent frames set in step (402) or (403) equal each other.

In the ratio assign mode in step (406), the layout is adjusted by assigning the frame positions while preserving the ratios of the inter-frame intervals set in the template. In this case, the layout is balanced so that the intervals of the frames set in step (402) or (403) have the same ratio as that of the template setting value.

In step (407), whether or not the automatically changed layout is satisfactory is inquired of the operator. When a signal "OK" is input via the input means 57, the "layout change" operation ends in step (409), and thereafter, the result is printed out by the image output means 58 in FIG. 25.

When the automatically changed layout includes an undesired portion, the flow advances to step (408), and the operator manually edits the layout. In step (409), the "layout change" operation ends, and thereafter, the result is printed out by the image output means 58 in FIG. 25.

Even when the operator must manually edit the layout, the required operation can be minimized after the automatic compensation, and the operation amount of the operator is reduced.

According to the sixth embodiment above, any layout imbalance is detected by comparing the ratio of inter-frame intervals in each of the upper, lower, right, and left directions of the frame, whose aspect ratio or the like is changed, with a predetermined value or by comparing the interval with that up to the edge of the printable area, and the layout is compensated by automatically changing the frame size and the frame interval on the basis of the predetermined ratio. In this way, a print of the layout with good balance and appearance can be obtained without requiring any operations of the operator.

According to the embodiments described above, when a photographed frame with a different aspect ratio is assigned to a certain frame, the intervals, in the upper, lower, right, and left directions, between the frame of interest and the nearest neighboring frames are checked, and the ratio of each interval to the corresponding template default interval is calculated. When the calculated ratio exceeds a first predetermined ratio that has a value exceeding 1 in at least one direction, when the calculated ratio is smaller than a second predetermined ratio that has a value less than 1 in at least one direction, or when there is no neighboring frame, the intervals, in the in the upper, lower, right, and left directions, between the frame and the corresponding edges of the printable area are calculated. When the calculated interval is smaller than a predetermined value that has a value equal to or larger than 0 in at least one direction, the layout compensation mode is started. In the layout compensation mode, the size or position of the photographed frame to be adjusted or the size or position of a frame included in the layout is compensated on the basis of a predetermined algorithm.

Accordingly, the operability of the operator can be improved, generation of a layout with poor appearance can be avoided, and a beautiful print can be obtained.

(Modification)

According to the embodiments described above, when a photographed frame with a different aspect ratio is assigned to a certain frame, the intervals, in the upper, lower, right, and left directions, between the frame of interest and the nearest neighboring frames are checked, and the ratio of each interval to the corresponding template default interval is calculated. When the calculated ratio exceeds a first predetermined ratio that has a value exceeding 1 in at least one direction, or when the calculated ratio is smaller than a predetermined ratio that has a value less than 1 in at least one direction, the layout imbalance is detected. However, the present invention is not limited to this. For example, the intervals, in the upper, lower, right, and left directions, between the frame of interest and the nearest neighboring frames are checked, and the difference between each interval and the corresponding template default interval is calculated. When the difference exceeds a first predetermined value having a value exceeding 0 in at least one direction, or when the difference is smaller than a second predetermined value having a value less than 0 in at least one direction, the layout imbalance may be detected.

The present invention may be attained by appropriately combining the above embodiments or their techniques.

As described above, a device comprises layout compensation detection means for detecting necessity of layout compensation when image data having an aspect ratio different from that of a frame is to be assigned upon assigning image data to each frame in a printable area, and layout change means for automatically compensating the layout when the layout compensation detection means detects the necessity of layout compensation due to layout imbalance, and the layout imbalance is automatically detected, and the size or interval of image data with respect to the frame is automatically changed.

Accordingly, even when image data with a different aspect ratio is assigned to a frame with a predetermined aspect ratio, a print of the layout with good balance and appearance can be obtained without requiring any operations of the operator.

When image data having an aspect ratio different from that of a frame is to be assigned, the layout compensation detection means detects the interval between the image data and the nearest neighboring frame or the interval between the image data and the edge of the printable area, and detects layout imbalance on the basis of the relationship between the obtained interval and the layout default interval, thus performing layout compensation if required.

In this way, the inter-frame interval or the interval to the edge of the printable area can be prevented from becoming too large or too small, or the frames can be prevented from overlapping each other, and a print of the layout with good balance and appearance can be obtained.

When image data having an aspect ratio different from that of a frame is to be assigned, the layout compensation detection means checks the intervals, in the upper, lower, right, and left directions, between the assigned image data and the nearest neighboring frames, and detects layout imbalance when the ratio of each interval to the nearest neighboring frame and the layout default interval is larger than a first predetermined ratio having a value larger than 1 or is smaller than a second predetermined ratio having a value smaller than 1 in at least one direction. In such case, layout compensation is performed.

Accordingly, the inter-frame interval or the interval to the edge of the printable area can be prevented from becoming too large or too small, or the frames can be prevented from overlapping each other, and a print of the layout with good balance and appearance can be obtained, as in the above-mentioned case.

According to the present invention, the first and second predetermined ratios used for detecting layout imbalance can be independently set in each of the upper, lower, right, and left directions, so that the degree of judgement of layout imbalance can be arbitrarily set in each of the upper, lower, right, and left directions.

In this way, the layout imbalance detection can be made in correspondence with various requirements.

According to the present invention, when image data having an aspect ratio different from that of a frame is to be assigned, the layout compensation detection means checks the intervals, in the upper, lower, right, and left directions, between the assigned image data and the nearest neighboring frames, and detects layout imbalance when the difference between each interval to the nearest neighboring frame and the layout default interval is larger than a first predetermined value having a value larger than 1 or is smaller than a second predetermined value having a value smaller than 1 in at least one direction. In such case, layout compensation is performed.

Accordingly, the inter-frame interval or the interval to the edge of the printable area can be prevented from becoming too large or too small, or the frames can be prevented from overlapping each other, and a print of the layout with good balance and appearance can be obtained, as in the above-mentioned case.

Also, according to the present invention, the first and second predetermined values used for detecting layout imbalance can be independently set in each of the upper, lower, right, and left directions, so that the degree of judgement of layout imbalance can be arbitrarily set in each of the upper, lower, right, and left directions.

As in the above-mentioned case, the layout imbalance detection can be made in correspondence with various requirements.

On the other hand, the layout compensation detection means checks the intervals, in the upper, lower, right, and left directions, between the assigned image data and the corresponding edges of the printable area when no nearest neighboring frames are present, and detects layout imbalance when each interval is smaller than a predetermined value having a value equal to or larger than 0 in at least one direction. In such case, layout compensation is performed.

In this way, upon assigning image data having an aspect ratio different from that of the frame, the image data can be prevented from extending outside the edge of the printable area.

The predetermined value used for detecting layout imbalance can be independently set in each of the upper, lower, right, and left directions, so that the degree of judgement of layout imbalance can be arbitrarily set in each of the upper, lower, right, and left directions.

Accordingly, the layout imbalance detection can be made with respect to the edges of the printable area in correspondence with various requirements.

The layout change means magnifies or reduces the size of a frame subjected to changes in layout until the interval between the frame of interest and its nearest neighboring frame has reached a predetermined value or the interval between the frame of interest and the corresponding edge of the printable area has reached a predetermined value, thereby compensating the layout.

In this way, the size of only a frame that has caused the layout imbalance can be solely changed to eliminate the layout imbalance.

Also, the layout change means magnifies or reduces the sizes of all the frames included in the predetermined printable area until the interval between each frame and its nearest neighboring frame has reached a predetermined value or the interval between each frame and the corresponding edge of the printable area has reached a predetermined value, thereby compensating the layout.

Accordingly, the sizes of all the frames are changed to eliminate layout imbalance.

Furthermore, the layout change means sets the positions of all the frames included in the predetermined printable area, so that the intervals between neighboring frames equal each other, thereby compensating the layout.

Hence, the intervals between adjacent ones of all the frames can be equally set, and layout imbalance can be eliminated.

Moreover, the layout change means sets the positions of all the frames included in the predetermined printable area, so that the ratio between the intervals of adjacent frames equals the ratio of the intervals as a layout default value, thereby compensating the layout.

In this way, all the frames can be set at the same interval ratios as those of the original layout, and layout imbalance can be eliminated.

In addition, the layout change means magnifies or reduces the size of a frame subjected to changes in layout until the interval between the frame of interest and its nearest neighboring frame has reached a predetermined value or the interval between the frame of interest and the corresponding edge of the printable area has reached a predetermined value, and equally sets the positions of all the frames, thereby compensating the layout.

Therefore, since the size of only the frame that causes layout imbalance is changed, and all the frame positions are equally set, layout compensation can be attained more satisfactorily.

The layout change means magnifies or reduces the sizes of all the frames included in the predetermined printable area until the interval between each frame and its nearest neighboring frame has reached a predetermined value or the interval between each frame and the corresponding edge of the printable area has reached a predetermined value, and equally sets the positions of all the frames, thereby compensating the layout.

Therefore, since the sizes of all the frames are changed and the positions of all the frames are equally set, layout compensation can be attained more satisfactorily.

Also, the layout change means magnifies or reduces the size of a frame subjected to changes in layout until the interval between the frame of interest and its nearest neighboring frame has reached a predetermined value or the interval between the frame of interest and the corresponding edge of the printable area has reached a predetermined value, and sets the positions of all the frames so that the ratio between the intervals of adjacent frames equals the ratio of the intervals as a layout default value, thereby compensating the layout.

Therefore, since the size of only the frame that causes layout imbalance is changed, and all the frame positions are set so that the ratio of the intervals of all the frames equals the interval ratio of the original layout, layout compensation can be attained more satisfactorily.

Furthermore, the layout change means magnifies or reduces the sizes of all the frames included in the predetermined printable area until the interval between each frame and its nearest neighboring frame has reached a predetermined value or the interval between each frame and the corresponding edge of the printable area has reached a predetermined value, and sets the positions of all the frames so that the ratio between the intervals of adjacent frames equals the ratio of the intervals as a layout default value, thereby compensating the layout.

In this way, since the sizes of all the frames are changed, and all the frame positions are set so that the ratio of the intervals of all the frames equals the interval ratio of the original layout, layout compensation can be attained more satisfactorily.

What is claimed is:

1. An image edit device which stores a plurality of layouts, arranges a plurality of images in accordance with a first layout from the plurality of layouts, and displays the arranged plurality of images on a display device in accordance with the first layout, the image edit device comprising:
   an instruction input unit which inputs a deleting instruction for deleting at least one of the arranged images in the first layout, in response to an operation of a user;
   a detection unit which detects how many of the arranged images remain after deleting the at least one of the arranged images;
   a rearrangement unit which newly lays out the remaining images in accordance with a second layout from the plurality of layouts, which is directed to the number of remaining images detected by the detection unit;
   a selecting unit which permits the user to select a position where a user comment is to be inserted into the second layout; and
   a warning unit which generates a warning message if the user comment cannot be inserted into the second layout at the selected position and there is no other layout in the stored plurality of layouts that is capable of being used for inserting the user comment into the selected position.

2. An image edit device according to claim 1, wherein:
   the detection unit detects the number of remaining images in accordance with a size of the images, and
   the second layout is in conformity with the number of images for respective size.

3. An image edit method for editing images, comprising:
   storing a plurality of layout patterns;
   arranging a plurality of images in accordance with a first layout from the plurality of layouts;
   displaying the arranged plurality of images on a display device in accordance with the first layout;
   inputting an instruction for deleting at least one of the arranged images in the first layout, in response to an operation of a user;
   detecting how many of the arranged images remain after deleting the at least one of the arranged images;
   newly laying out the remaining images in accordance with a second layout from the plurality of layouts, which is directed to the number of remaining images detected by the detection unit;
   permitting the user to select a position where a user comment is to be inserted into the second layout; and
   generating a warning message if the user comment cannot be inserted into the second layout at the selected position and there is no other layout in the stored plurality of layouts that is capable of being used for inserting the user comment into the selected position.

4. An image edit device which stores a plurality of layouts, arranges a plurality of images in accordance with a first layout from the plurality of layouts, and displays the arranged plurality of images on a display device in accordance with the first layout, the image edit device comprising:
   a display unit which displays, on the display device, an index of images which are not currently displayed in the first layout;
   an instruction input unit which adds at least one of the indexed images into the arranged images, in response to an operation of a user;
   a detection unit which detects a total number of images after adding the at least one indexed image into the arranged images;
   a rearrangement unit which newly lays out all of the arranged images in accordance with a second layout from the plurality of layouts, which is directed to the total number of images detected by the detection unit;
   permitting the user to select a position where a user comment is to be inserted into the second layout; and
   generating a warning message if the user comment cannot be inserted into the second layout at the selected position and there is no other layout in the stored plurality of layouts that is capable of being used for inserting the user comment into the selected position.

5. An image edit device according to claim 4, wherein:
   the detection unit detects the total number of images in accordance with a size of the images, and the second layout is in conformity with the total number of images for respective size.

6. An image edit method for editing images, comprising:

storing a plurality of layout patterns;

arranging a plurality of images in accordance with a first layout from the plurality of layouts;

displaying the arranged plurality of images on a display device in accordance with the first layout;

displaying, on the display device, an index of images which are not currently displayed in the first layout;

inputting adds at least one of the indexed images into the arranged images, in response to an operation of a user;

detecting a total number of images after adding the at least one indexed image into the arranged images;

newly laying out all of the arranged images, after adding, on the sheet in accordance with a second layout from the plurality of layouts, which is different from the first layout and is directed to the total number of images detected;

permitting the user to select a position on the sheet where a user comment is to be inserted into the second layout; and generating a warning message if the user comment cannot be inserted into the second layout at the selected position and there is no other layout in the stored plurality of layouts that is capable of being used for inserting the user comment into the selected position.

\* \* \* \* \*